US012326498B2

(12) United States Patent
Kishigami

(10) Patent No.: US 12,326,498 B2
(45) Date of Patent: Jun. 10, 2025

(54) RADAR APPARATUS

(71) Applicant: Panasonic Intellectual Property Management Co., Ltd., Osaka (JP)

(72) Inventor: Takaaki Kishigami, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 723 days.

(21) Appl. No.: 17/553,370

(22) Filed: Dec. 16, 2021

(65) Prior Publication Data

US 2022/0107402 A1 Apr. 7, 2022

Related U.S. Application Data

(63) Continuation of application No. PCT/JP2020/023064, filed on Jun. 11, 2020.

(30) Foreign Application Priority Data

Jun. 21, 2019 (JP) ................................ 2019-115492

(51) Int. Cl.
*G01S 13/58* (2006.01)

(52) U.S. Cl.
CPC .................................. *G01S 13/584* (2013.01)

(58) Field of Classification Search
CPC ...... G01S 13/42; G01S 13/583; G01S 13/584; G01S 7/0234; G01S 7/032; H01Q 21/06
See application file for complete search history.

(56) References Cited

U.S. PATENT DOCUMENTS

2003/0218565 A1* 11/2003 Budic .................. G01S 13/878 342/162
2008/0303711 A1 12/2008 Matsuoka
2011/0074620 A1 3/2011 Wintermantel
2016/0285172 A1 9/2016 Kishigami et al.
2017/0254879 A1 9/2017 Tokieda, I et al.
2019/0227157 A1* 7/2019 Culkin .................... G01S 7/292
2020/0049812 A1* 2/2020 Jansen .................. G01S 13/343
2020/0209380 A1 7/2020 Takayama
2020/0284874 A1* 9/2020 Narayana Moorthy ..................... G01S 13/343
2020/0300965 A1* 9/2020 Wu ....................... G01S 13/505
2021/0278501 A1 9/2021 Sturm et al.
2021/0293946 A1* 9/2021 Kishigami ............ G01S 7/0234

FOREIGN PATENT DOCUMENTS

CN 106019238 A 10/2016
CN 106796280 A 5/2017
JP 2008-304417 A 12/2008
(Continued)

OTHER PUBLICATIONS

Cadzow, James, "Direction-of-Arrival Estimation Using Signal Subspace Modeling," IEEE Transactions on Aerospace and Electronic Systems 28(1):64-79, Jan. 1992.
(Continued)

*Primary Examiner* — Timothy A Brainard
(74) *Attorney, Agent, or Firm* — Seed IP Law Group LLP

(57) ABSTRACT

A radar apparatus includes: a plurality of transmission antennas that each transmit a transmission signal; and a radar transmitter that applies a Doppler shift amount to the transmission signal transmitted from each of the plurality of transmission antennas. A plurality of the Doppler shift amounts have intervals set by unequally dividing a Doppler frequency range subject to Doppler analysis.

16 Claims, 15 Drawing Sheets

(56) References Cited

FOREIGN PATENT DOCUMENTS

| | | | |
|---|---|---|---|
| JP | 2011-526371 | A | 10/2011 |
| JP | 2014-119344 | A | 6/2014 |
| JP | 2016-180720 | A | 10/2016 |
| JP | 2019-52952 | A | 4/2019 |
| JP | 2020-56589 | A | 4/2020 |
| JP | 2020-56772 | A | 4/2020 |
| WO | 2016/031882 | A1 | 3/2016 |
| WO | 2020/007573 | A1 | 1/2020 |

OTHER PUBLICATIONS

International Search Report, mailed Sep. 8, 2020, for International Application No. PCT/JP2020/023064. (with English translation). (6 pages).

Li et al., "MIMO Radar with Colocated Antennas," IEEE Signal Processing Magazine, 24(5):106-114, Sep. 2007.

Kronauge et al., "Fast Two-Dimensional CFAR Procedure," IEEE Transactions on Aerospace and Electronic Systems, 49(3):1817-1823, Jul. 2013.

English Translation of Japanese Office Action, issued Dec. 13, 2022, for Japanese Patent Application No. 2019-115492. (7 pages).

Japanese Notice of Reasons for Refusal, dated May 16, 2023, for Japanese Patent Application No. 2019-115492. (6 pages) (English translation).

Chinese Notification of First Office Action dated Sep. 11, 2024, for the corresponding Chinese Patent Application No. 202080042704.9, 21 pages. (With English Translation).

* cited by examiner (a) Output of Doppler analyzer 209 for beat frequency response per odd-numbered transmission period Tr (b) Output of Doppler analyzer 209 for beat frequency response per even-numbered transmission period Tr (a) Output of Doppler analyzer 209 for beat frequency response per odd-numbered transmission period Tr (b) Output of Doppler analyzer 209 for beat frequency response per even-numbered transmission period Tr

RADAR APPARATUS

TECHNICAL FIELD

The present disclosure relates to a radar apparatus.

BACKGROUND ART

Studies have been developed recently on radar apparatuses using radar transmission signals with short wavelength including microwaves or millimeter waves that achieve high resolution. To improve the outdoor safety, it has been demanded to develop a radar apparatus that senses not only vehicles but also small objects such as pedestrians or fallen objects in a wider range of angles (wide-angle radar apparatus).

A configuration of the radar apparatus having a wide-angle detection range includes a configuration using a technique of receiving a reflected wave by an array antenna composed of a plurality of antennas (antenna elements), and estimating the angle of arrival (direction of arrival) of the reflected wave using signal processing algorithms based on reception phase differences with respect to element spacings (antenna spacings) (Direction of Arrival (DOA) estimation). Examples of the DOA estimation include a Fourier method (Fourier method) and methods achieving high resolution, such as a Capon method, Multiple Signal Classification (MUSIC), and Estimation of Signal Parameters via Rotational Invariance Techniques (ESPRIT).

A radar apparatus with a plurality of antennas (array antenna) on a transmission side as well as a reception side, for example, has been proposed, and the radar apparatus (also referred to as a Multiple Input Multiple Output (MIMO) radar) includes a configuration of performing beam scanning through signal processing using the transmission and reception array antennas (see, for example, Non-Patent Literature (hereinafter referred to as "NPL") 1).

CITATION LIST

Patent Literature

PTL 1
Japanese Patent Application Laid-Open No. 2008-304417
PTL 2
Japanese Unexamined Patent Application Publication (Translation of PCT Application) No. 2011-526371
PTL 3
Japanese Patent Application Laid-Open No. 2014-119344

Non Patent Literature

NPL 1
J. Li, and P. Stoica, "MIMO Radar with Colocated Antennas", Signal Processing Magazine, IEEE Vol. 24, Issue: 5, pp. 106-114, 2007
NPL 2
M. Kronauge, H.Rohling, "Fast two-dimensional CFAR procedure", IEEE Trans. Aerosp. Electron. Syst., 2013, 49, (3), pp. 1817-1823
NPL 3
Direction-of-arrival estimation using signal subspace modeling Cadzow, J. A.; Aerospace and Electronic Systems, IEEE Transactions on Volume: 28, Issue: 1 Publication Year: 1992, Page(s): 64-79

SUMMARY OF INVENTION

There is scope for further study, however, on a method of sensing a target by a radar apparatus (e.g., MIMO radar).

One non-limiting and exemplary embodiment facilitates providing a radar apparatus capable of sensing a target accurately.

A terminal according to an exemplary embodiment of the present disclosure includes: a plurality of transmission antennas, which in operation, each transmit a transmission signal; and circuitry, which, in operation, applies a Doppler shift amount to the transmission signal transmitted from each of the plurality of transmission antennas, wherein, a plurality of the Doppler shift amounts have intervals set by unequally dividing a Doppler frequency range subject to Doppler analysis.

It should be noted that general or specific embodiments may be implemented as a system, an apparatus, a method, an integrated circuit, a computer program, a storage medium, or any selective combination thereof.

According to an exemplary embodiment of the present disclosure, it is possible to sense a target accurately by a radar apparatus.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
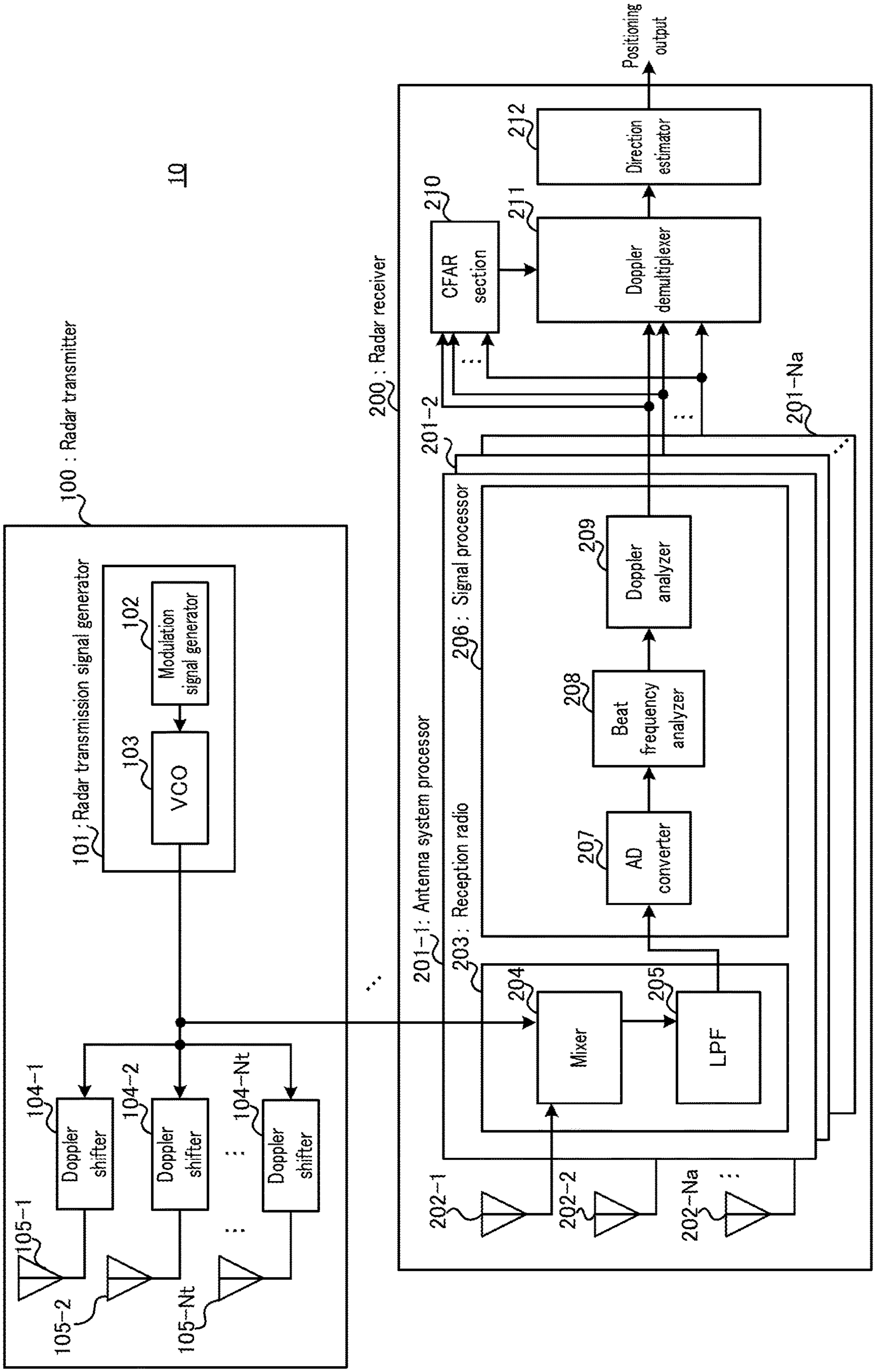
FIG. 1 is a block diagram illustrating an exemplary configuration of a radar apparatus according to Embodiment 1.

A MIMO radar transmits, from a plurality of transmission antennas (also referred to as a "transmission array antenna"), signals (radar transmission waves) that are time-division, frequency-division, or code-division multiplexed, for example. The MIMO radar then receives signals (radar reflected waves) reflected by an object around the radar using a plurality of reception antennas (also referred to as a "reception array antenna") to demultiplex and receive multiplexed transmission signals from the respective reception signals. With such processing, the MIMO radar can extract a propagation path response indicated by the product of the number of transmission antennas and the number of reception antennas, and performs array signal processing using these reception signals as a virtual reception array.

Further, in the MIMO radar, it is possible to enlarge the antenna aperture virtually so as to enhance the angular resolution by appropriately arranging element spacings in transmission and reception array antennas.

For example, PTL 1 discloses a MIMO radar (hereinafter referred to as a "time-division multiplexing MIMO radar") that uses, as a multiplexing transmission method for the MIMO radar, time-division multiplexing transmission by which signals are transmitted at transmission times shifted per transmission antenna. Time-division multiplexing transmission can be implemented with a simpler configuration than frequency multiplexing transmission or code multiplexing transmission. Further, the time-division multiplexing transmission can maintain proper orthogonality between the transmission signals with sufficiently large intervals between the transmission times. The time-division multiplexing MIMO radar outputs transmission pulses, which are an example of transmission signals, while sequentially switching the transmission antennas in a predetermined period. The time-division multiplexing MIMO radar receives, at a plurality of reception antennas, signals that are the transmission pulses reflected by an object, performs processing of correlating the reception signals with the transmission pulses, and then performs, for example, spatial fast Fourier transform (FFT) processing (processing for estimation of the directions of arrival of the reflected waves).

The time-division multiplexing MIMO radar sequentially switches the transmission antennas, from which the transmission signals (for example, the transmission pulses or radar transmission waves) are to be transmitted, at predetermined periods. Accordingly, in the time-division multiplexing transmission, transmission of the transmission signals from all the transmission antennas possibly takes a longer time to be completed than in frequency-division transmission or code-division transmission. Thus, in a case where transmission signals are transmitted respectively from transmission antennas and Doppler frequencies (i.e., the relative velocities of a target) are detected from their reception phase changes as in PTL 2, for example, the time interval for observing the reception phase changes (for example, sampling interval) for application of Fourier frequency analysis to detect the Doppler frequencies is extended. This reduces the Doppler frequency range where the Doppler frequency can be detected without aliasing (i.e., the range of detectable relative velocities of the target).

When it is assumed to receive a reflected wave signal from a target outside the Doppler frequency range in which the Doppler frequency can be detected without aliasing (in other words, the range of relative velocities), the radar apparatus is unable to identify whether the reflected wave signal is an aliasing component. This causes ambiguity (uncertainty) of the Doppler frequency (in other words, the relative velocity of the target).

For example, when the radar apparatus transmits transmission signals (transmission pulses) while sequentially switching Nt transmission antennas at predetermined periods Tr, it requires a transmission time given by Tr×Nt to complete the transmission of the transmission signals from all the transmission antennas. In a case where such a time-division multiplexing transmission operation is repeated $N_c$ times and Fourier frequency analysis is applied for detection of the Doppler frequency, the Doppler frequency range in which the Doppler frequency can be detected without aliasing is ±1/(2Tr×Nt) according to the sampling theorem. Accordingly, the Doppler frequency range in which the Doppler frequency can be detected without aliasing decreases as number Nt of transmission antennas increases, and the ambiguity of the Doppler frequency is likely to occur even for lower relative velocities.

The time-division multiplexing MIMO radar is likely to cause the ambiguity of the Doppler frequency described above, and thus the following description will focus on a method for simultaneously multiplexing and transmitting transmission signals from a plurality of transmission antennas, as an example.

Examples of the method for simultaneously multiplexing and transmitting transmission signals from a plurality of transmission antennas include, for example, a method of transmitting signals such that a plurality of transmission signals can be demultiplexed on the Doppler frequency axis on the reception side (see, for example, NPL 3), which is referred to as Doppler multiplexing transmission in the following.

In the Doppler multiplexing transmission, on the transmission side, transmission signals are simultaneously transmitted from a plurality of transmission antennas in such a manner that, for example, with respect to a transmission signal to be transmitted from a reference transmission antenna, transmission signals to be transmitted from transmission antennas different from the reference transmission antenna are given Doppler shift amounts greater than the Doppler frequency bandwidth of reception signals. In the Doppler multiplexing transmission, on the reception side, filtering is performed on the Doppler frequency axis to demultiplex and receive the transmission signals transmitted from the respective transmission antennas.

In the Doppler multiplexing transmission as compared with time-division multiplexing transmission, simultaneous transmission of transmission signals from a plurality of transmission antennas can reduce the time interval for observing the reception phase changes for application of Fourier frequency analysis to detect the Doppler frequencies (or relative velocities). In the Doppler multiplexing transmission, however, since filtering is performed on the Doppler frequency axis to demultiplex the transmission signals from the respective transmission antennas, the effective Doppler frequency bandwidth per transmission signal is restricted.

For example, Doppler multiplexing transmission in which a radar apparatus transmits transmission signals from Nt transmission antennas at periods Tr will be described. When such a Doppler multiplexing transmission operation is repeated $N_c$ times and Fourier frequency analysis is applied for detection of the Doppler frequency (or relative velocity), the Doppler frequency range in which the Doppler frequency can be detected without aliasing is ±1/(2×Tr) according to the sampling theorem. That is, in the Doppler multiplexing transmission, the Doppler frequency range in which the Doppler frequency can be detected without aliasing is increased by Nt times in comparison with time-division multiplexing transmission (for example, ±1/(2Tr×Nt)).

Note that, in the Doppler multiplexing transmission, filtering is performed on the Doppler frequency axis to demultiplex transmission signals, as described above. Accordingly, the effective Doppler frequency bandwidth per transmission signal is restricted to 1/(Tr×Nt), and this results in a Doppler frequency range similar to that in time-division multiplexing transmission. Further, in the Doppler multiplexing transmission, in a Doppler frequency band exceeding the effective Doppler frequency range per transmission signal, the transmission signal intermingles with a signal in a Doppler frequency band of another transmission signal different from the transmission signal. Thus, the transmission signals may fail to be demultiplexed correctly.

In this regard, an exemplary embodiment of the present disclosure describes a method for extending the Doppler frequency range in which no aliasing (in other words, no ambiguity) occurs in the Doppler multiplexing transmission. With this method, a radar apparatus according to an exemplary embodiment of the present disclosure can sense a target accurately in a wider Doppler frequency range.

Hereinafter, embodiments of the present disclosure will be described in detail with reference to the accompanying drawings. In the embodiments, the same components are denoted by the same reference signs, and the descriptions thereof are omitted to avoid redundancy.

The following describes a configuration of a radar apparatus (in other words, MIMO radar configuration) having a transmission branch where different multiplexed transmission signals are simultaneously transmitted from a plurality of transmission antennas, and a reception branch where the transmission signals are demultiplexed and subjected to reception processing.

Further, by way of example, a description will be given below of a configuration of a radar system using a frequency-modulated pulse wave such as a chirp pulse (e.g., also referred to as chirp pulse transmission (fast chirp modulation)). The modulation scheme is not limited to frequency modulation, however. For example, an exemplary embodiment of the present disclosure is also applicable to a radar system that uses a pulse compression radar configured to transmit a pulse train after performing phase modulation or amplitude modulation on the pulse train.

[Configuration of Radar Apparatus]

FIG. 1 is a block diagram illustrating a configuration of radar apparatus 10 according to the present embodiment.

Radar apparatus 10 includes radar transmitter (transmission branch) 100 and radar receiver (reception branch) 200.

Radar transmitter 100 generates radar signals (radar transmission signals) and transmits the radar transmission signals at predetermined transmission periods using a transmission array antenna composed of a plurality of transmission antennas 105-1 to 105-Nt.

Radar receiver 200 receives reflected wave signals, which are radar transmission signals reflected by a target (not illustrated), using a reception array antenna composed of a plurality of reception antennas 202-1 to 202-Na. Radar receiver 200 performs signal processing on the reflected wave signals received at respective reception antennas 202 to detect the presence or absence of a target, or to estimate the directions of arrival of the reflected wave signals, for example.

Note that the target is a target object to be detected by radar apparatus 10. Examples of the target include a vehicle (including four-wheel and two-wheel vehicles), a person, a block, and a curb.

[Configuration of Radar Transmitter 100]

Radar transmitter 100 includes radar transmission signal generator 101, Doppler shifters 104-1 to 104-Nt, and transmission antennas 105-1 to 105-Nt. That is, radar transmitter 100 includes Nt transmission antennas 105, and transmission antennas 105 are individually connected to respective Doppler shifters 104.

Radar transmission signal generator 101 generates a radar transmission signal. Radar transmission signal generator 101 includes, for example, modulation signal generator 102 and Voltage Controlled Oscillator (VCO) 103. The components of radar transmission signal generator 101 will be described below.

Figure 2:
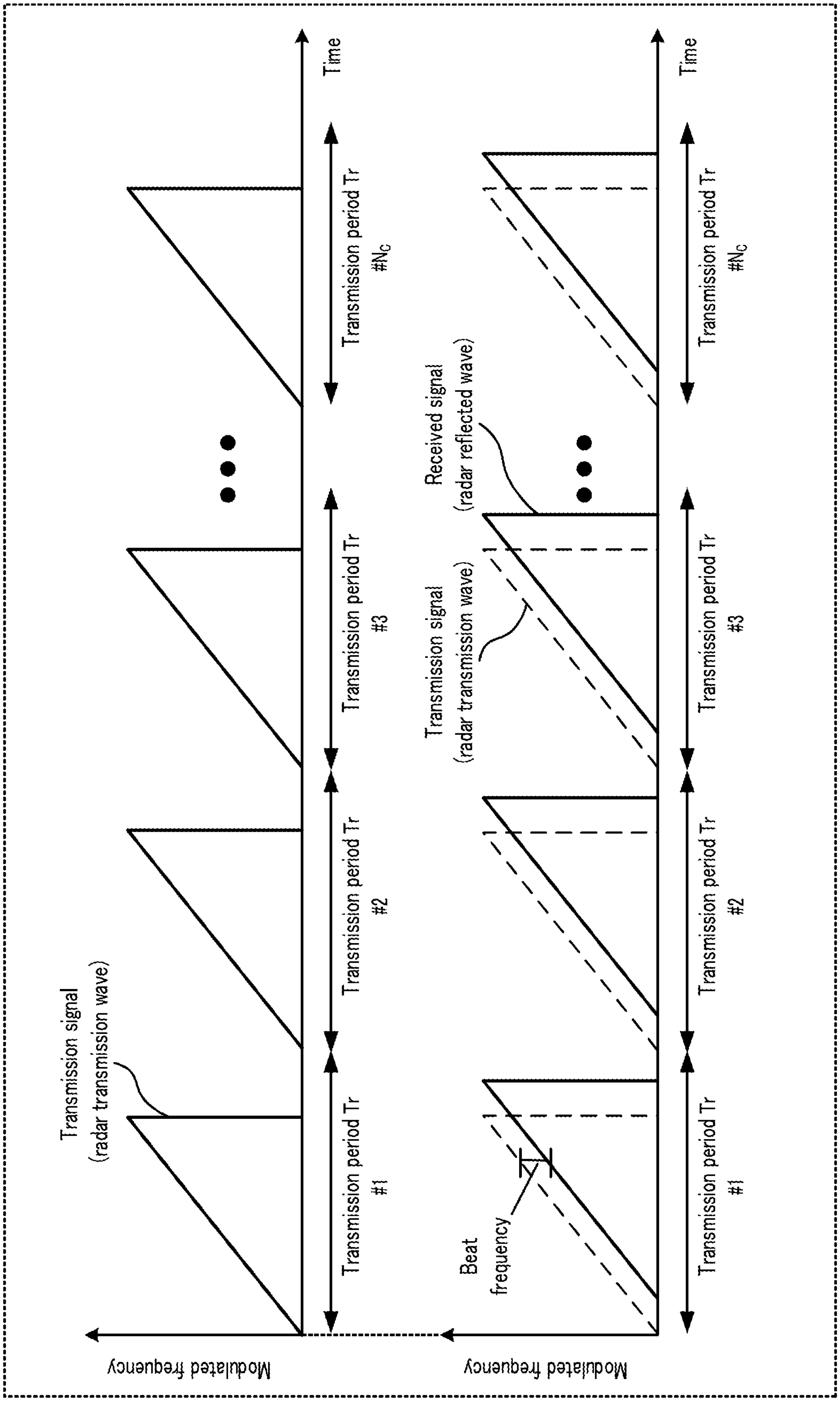
FIG. 2 illustrates exemplary transmission signals and reflected wave signals in a case of using a chirp pulse.

Modulation signal generator 102 periodically generates saw-tooth modulated signals as illustrated in FIG. 2, for example. Here, the radar transmission period is represented by Tr.

VCO 103 outputs, based on the radar transmission signals outputted from modulation signal generator 103, frequency-modulated signals (hereinafter referred to as, for example, frequency chirp signals or chirp signals) to Doppler shifters 104-1 to 104-Nt and radar receiver 200 (mixer 204 to be described later).

Doppler shifter 104 applies phase rotation $\varphi_n$ to the chirp signal inputted from VCO 103 in order to apply Doppler shift amount $DOP_n$, and outputs the signal after the Doppler shift to transmission antenna 105. Here, n=1, . . . , Nt. Note that an exemplary method of applying Doppler shift amount $DOP_n$ (in other words, phase rotation $\varphi_n$) in Doppler shifter 104 will be described later.

The output signals of Doppler shifters 104-1 to 104-Nt are amplified to a predetermined transmission power and are radiated respectively from transmission antennas 105 to space.

[Configuration of Radar Receiver 200]

In FIG. 1, radar receiver 200 includes Na reception antennas 202, which compose an array antenna. Radar receiver 200 further includes Na antenna system processors 201-1 to 201-Na, constant false alarm rate (CFAR) section 210, Doppler demultiplexer 211, and direction estimator 212.

Each of reception antennas 202 receives a reflected wave signal that is a radar transmission signal reflected from a target, and outputs the received reflected wave signal to the corresponding one of antenna system processors 201 as a received signal.

Each of antenna system processors 201 includes reception radio 203 and signal processor 206.

Reception radio 203 includes mixer 204 and low pass filter (LPF) 205. Reception radio 203 mixes, at mixer 204, a chirp signal, which is a transmission signal, with the received reflected wave signal, and passes the resulting mixed signal through LPF 205. As a result, a beat signal having a frequency corresponding to the delay time of the reflected wave signal is acquired. For example, as illustrated in FIG. 2, the difference frequency between the frequency of a transmission signal (transmission frequency-modulated wave) and the frequency of a received signal (reception frequency-modulated wave) is obtained as a beat frequency.

In each antenna system processor 201-*z* (where z is any of 1 to Na), signal processor 206 includes AD converter 207, beat frequency analyzer 208, and Doppler analyzer 209.

The signal (e.g., beat signal) outputted from LPF 205 is converted into discretely sampled data by AD converter 207 in signal processor 206.

Beat frequency analyzer 208 performs, in each transmission period Tr, FFT processing on $N_{data}$ pieces of discretely sampled data obtained in a predetermined time range (range gate). This outputs, in signal processor 206, frequency spectrum in which a peak appears at a beat frequency dependent on the delay time of the reflected wave signal (radar reflected wave). Note that, in the FFT processing, beat frequency analyzer 208 may perform multiplication by a window function coefficient such as the Han window or the Hamming window, for example. The use of the window function coefficient can suppress sidelobes generated around the beat frequency peak.

Here, a beat frequency response that is obtained from the m-th chirp pulse transmission and outputted from beat frequency analyzer 208 in z-th signal processor 206 is represented by $RFT_z(f_b, m)$. Here, $f_b$ denotes the beat frequency index and corresponds to an FFT index (bin number). For example, $f_b=0, \ldots, N_{data}/2$, $z=0, \ldots, Na$, and $m=1, \ldots, N_C$. Note that, in the following, $N_C$ times of chirp pulse transmissions is referred to as a transmission frame unit. A beat frequency having smaller beat frequency index $f_b$ indicates a shorter delay time of the reflected wave signal (in other words, a shorter distance to the target).

In addition, beat frequency index $f_b$ may be converted into distance information $R(f_b)$ using the following expression. Thus, in the following, beat frequency index $f_b$ is also referred to as "distance index $f_b$".

[1] (Expression 1)

$$R(f_b) = \frac{C_0}{2B_w} f_b$$

Here, $B_w$ denotes a frequency-modulation bandwidth within the range gate for a chirp signal, and $C_0$ denotes the speed of light.

Doppler analyzer 209 performs Doppler analysis for each distance index $f_b$ using beat frequency responses $RFT_z(f_b, 1), RFT_z(f_b, 2), \ldots, RFT_z(f_b, N_C)$, which are obtained from $N_C$ times of chirp pulse transmissions and outputted from beat frequency analyzer 208.

For example, when $N_c$ is a power of 2, FFT processing is applicable in the Doppler analysis. In this case, the FFT size is $N_c$, and a maximum Doppler frequency that is derived from the sampling theorem and involves no aliasing is $\pm 1/(2Tr)$. Further, the Doppler frequency interval of Doppler frequency indices $f_s$ is $1/(N_c \times Tr)$, and the range of Doppler frequency index $f_s$ is given by $f_s = -N_c/2, \ldots, 0, \ldots, N_c/2-1$.

A description will be given below of a case where $N_c$ is a power of 2, as an example. Note that, when $N_c$ is not a power of 2, zero-padded data is included, for example, to allow FFT processing with the data size treated as a power of 2. In the FFT processing, Doppler analyzer 209 may perform multiplication by a window function coefficient such as the Han window or the Hamming window. The application of a window function can suppress sidelobes generated around the beat frequency peak.

For example, output $VFT_z(f_b, f_s)$ of Doppler analyzer 209 of z-th signal processor 206 is given by the following expression. Note that j is the imaginary unit and z=1 to Na.

[2] (Expression 2)

$$VFT_z(f_b, f_s) = \sum_{m=1}^{N_c} RFT_z(f_b, m) \exp\left[-j\frac{2\pi(m-1)f_s}{N_c}\right]$$

The processing by the components of signal processor 206 has been described, thus far.

In FIG. 1, CFAR section 210 performs CFAR processing (in other words, adaptive threshold determination) using the outputs of Doppler analyzers 209 in first to Na-th signal processors 206, and extracts distance indices $f_{b\_cfar}$ and Doppler frequency indices $f_{s\_cfar}$ that provide peak signals.

CFAR section 210 performs power addition of outputs $VFT_1(f_b, f_s), VFT_2(f_b, f_s), \ldots, VFT_{Na}(f_b, f_s)$ of Doppler analyzers 209 in first to Na-th signal processors 206, for example, as given by the following expression, so as to perform two-dimensional CFAR processing in two dimensions formed by the distance axis and the Doppler frequency axis (corresponding to the relative velocity) or CFAR processing using one-dimensional CFAR processing in combination. For example, processing disclosed in NPL 2 may be applied as the two-dimensional CFAR processing or the CFAR processing using one-dimensional CFAR processing in combination.

[3] (Expression 3)

$$PowerFT(f_b, f_s) = \sum_{z=1}^{N_a} |VFT_z(f_b, f_s)|^2$$

CFAR section 210 adaptively sets a threshold and outputs, to Doppler demultiplexer 211, distance index $f_{b\_cfar}$ and Doppler frequency index $f_{s\_cfar}$ that provide received power greater than the threshold, and received power information $PowerFT(f_{b\_cfar}, f_{s\_cfar})$.

Doppler demultiplexer 211 performs demultiplexing processing using the outputs of Doppler analyzers 209 based on the information inputted from CFAR section 210 (e.g., distance index $f_{b\_cfar}$, Doppler frequency index $f_{s\_cfar}$, and received power information $PowerFT(f_{b\_cfar}, f_{s\_cfar})$). The demultiplexing processing is performed in order to demultiplex the transmission signals (in other words, the reflected wave signals for the transmission signals) transmitted from respective transmission antennas 105 from signals transmitted with Doppler multiplexing (hereinafter, referred to as Doppler multiplexed signals). Doppler demultiplexer 211 outputs, for example, information on the demultiplexed signals to direction estimator 212. The information on the demultiplexed signals may include, for example, distance indices $f_{b\_cfar}$ and Doppler frequency indices, which are sometimes referred to as demultiplexing index information, $(f_{demul\_Tx\#1}, f_{demul\_Tx\#2}, \ldots, f_{demul\_Tx\#Nt})$ corresponding to the demultiplexed signals. In addition, Doppler demultiplexer 211 outputs the outputs of respective Doppler analyzers 209 to direction estimator 212.

In the following, exemplary operations of Doppler demultiplexer 211 will be described along with operations of Doppler shifter 104.

[Doppler Shift Amount Setting Method]

First, exemplary methods of setting Doppler shift amounts applied in Doppler shifters 104 will be described.

Doppler shifters 104-1 to 104-Nt apply different Doppler shift amounts DOPE to chirp signals inputted to respective Doppler shifters. In an exemplary embodiment of the present disclosure, intervals of Doppler shift amounts $DOP_n$ (Doppler shift intervals) are not equal among Doppler shifters 104-1 to 104-Nt (in other words, among transmission antennas 105-1 to 105-Nt), and at least one of the Doppler intervals is different.

In other words, Doppler shift amounts $DOP_n$ do not divide the Doppler frequency range (−1/(2Tr) to 1/(2Tr)) that satisfies the sampling theorem at equal intervals, but divide the Doppler frequency range so that at least one of the intervals is different. Here, the sampling theorem is satisfied when phase rotations for respective transmission periods Tr range from −π to π. Thus, Doppler shift amounts DOPE use phase rotations $\varphi_n(m)$ that divide the range of −π to π, in other words, the phase range of 2π, not at equal intervals but at intervals at least one of which is different.

In a case where Nt=2, for example, the setting in which $\varphi_1(m)=\pi/2\pi m$ and $\varphi_2(m)=-\pi/2\times m$ leads to $|\varphi_1(m)-\varphi_2(m)|=\pi$, and the phase range of 2π is divided at equal intervals. In an exemplary embodiment of the present disclosure, such phase rotations that equally divide the phase range of 2π are not used as the Doppler shift amounts. In an exemplary embodiment of the present disclosure, phase rotations $\varphi_1(m)$ and $\varphi_2(m)$ where $|\varphi_1(m)-\varphi_2(m)|\neq\pi$ are used as Doppler shift amounts $DOP_1$ and $DOP_2$. Further, in a case where Nt≥2, an exemplary embodiment of the present disclosure includes phase rotations where $|\varphi_n(m)-\varphi_{adjacent(n)}(m)|2\pi/Nt$ as Doppler shift amounts $DOP_n$. Here, n is an integer value in a range of 1 to Nt. Further, adjacent(n) denotes an index of a phase rotation adjacent to $\varphi_n(m)$, and the difference $(\varphi_n(m)-\varphi_{n1}(m))$ of the phase rotations from $\varphi_n(m)$ denotes smallest index n1 with a modulo operation for 2π.

For example, n-th Doppler shifter 104 applies phase rotation $\varphi_n(m)$ to the inputted m-th chirp signal such that Doppler shift amounts $DOP_n$ are different from each other, and outputs the chirp signal. This processing applies different Doppler shift amounts respectively to the transmission signals to be transmitted from a plurality of transmission antennas 105. That is, number $N_{DM}$ of Doppler multiplexing=Nt in an exemplary embodiment. Here, m=1, . . . , $N_C$, and n=1, . . . Nt.

Further, in Doppler analyzer 209, a range of Doppler frequency $f_d$ that is derived from the sampling theorem and involves no aliasing is $-1/(2Tr)\leq f_d<1/(2Tr)$.

From the above, phase rotation $\varphi_n(m)$ that provides equal Doppler shift interval 1/(Nt×Tr) to each of the transmission signals transmitted from Nt transmission antennas 105 is, for example, given by the following expression.

[4]

$$\phi_n(m) = \left\{\frac{2\pi}{N_c}\mathrm{round}\left(\frac{N_c}{Nt}\right)(n-1) + \Delta\phi_0\right\}(m-1) + \phi_0 \quad \text{(Expression 4)}$$

Here, $\varphi_0$ is an initial phase and $\Delta\varphi_0$ is a reference Doppler shift phase. Additionally, round(x) is a round function that outputs a rounded integer value for real number x. Note that the term round($N_C/N_t$) is introduced in order to set the phase rotation amount to an integer multiple of the Doppler frequency interval in Doppler analyzer 209.

If, for example, phase rotation $\varphi_n(m)$ given by Expression 4 is used, the intervals of the phase rotations applied to the m-th chirp signal are all equal among the transmission signals, and the interval would be 2π round($N_C/N_t$)/$N_C$.

By way of example, when phase rotation $\varphi_n(m)$ is applied where Nt=2, $\Delta\varphi_0=0$, $\varphi_0=0$, and $N_C$ is an even number in Expression 4, the Doppler shift amounts are represented by $DOP_1=0$ and $DOP_2=1/(2Tr)$.

In other words, intervals of the Doppler shift amounts applied to the transmission signals transmitted from the plurality of transmission antennas 105 are set to be equal in the range of the Doppler frequency (e.g., Doppler frequency range in which no aliasing occurs) in radar apparatus 10 (radar receiver 200). For example, the interval of the Doppler shift amounts applied to the transmission signals transmitted from 2 (=Nt) transmission antennas 105 is set to the interval obtained by dividing the Doppler frequency range in which no aliasing occurs (e.g., $-1/(2Tr)\leq f_d<1/(2Tr)$) by the number of transmission antennas 105 (e.g., Nt=2). The interval will result in 1/(2Tr) in this example.

Figure 3:
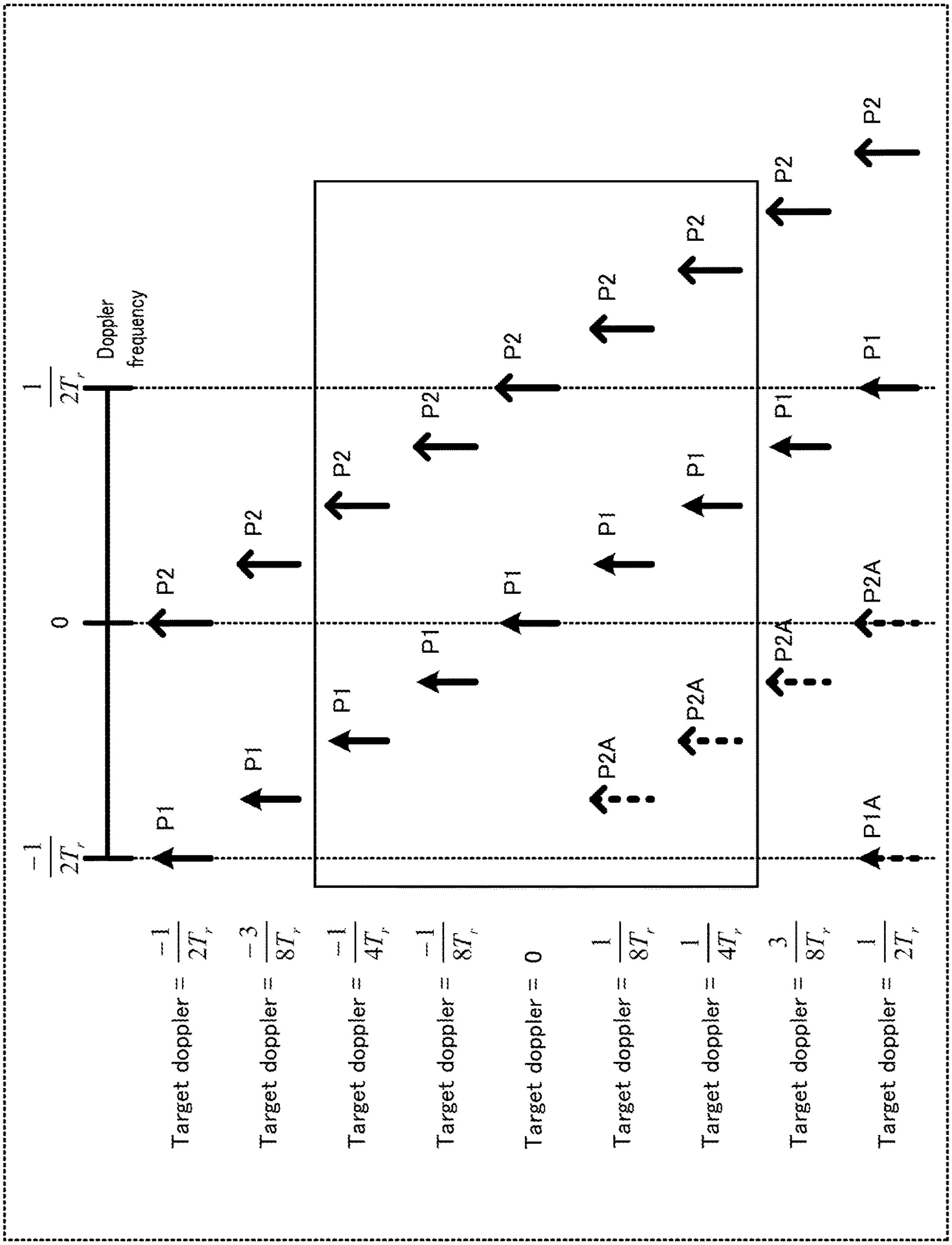
FIG. 3 illustrates exemplary Doppler peaks.

FIG. 3 illustrates exemplary Doppler peaks obtained by Doppler analysis at Doppler analyzer 209 in a case where Doppler shift amounts of $DOP_1=0$ and $DOP_2=1/(2Tr)$ are used for the transmission signals transmitted from 2 (=Nt) transmission antennas 105 (hereinafter, referred to as Tx #1 and Tx #2), for example.

As illustrated in FIG. 3, Nt Doppler peaks (Nt=2 in FIG. 3) are generated for the Doppler frequency of a single target to be measured (target doppler $f_{d\_TargetDoppler}$).

By way of example, in the following, position relations between the Doppler peaks generated in receiving reflected wave signals for transmission signals respectively transmitted from transmission antennas Tx #1 and Tx #2 are compared in FIG. 3 in a case where Doppler frequency of a measurement target $f_{d\_TargetDoppler}=-1/(4Tr)$ and in a case where $f_{d\_TargetDoppler}=1/(4Tr)$.

<Case where Target Doppler Frequency $f_{d\_TargetDoppler}=1/(4Tr)$>

In the case where $f_{d\_TargetDoppler}=-1/(4Tr)$, the position relation between the Doppler peak (P1) generated in receiving the reflected wave signal for the transmission signal from transmission antenna Tx #1 and the Doppler peak (P2) generated in receiving the reflected wave signal for the transmission signal from transmission antenna Tx #2 will be as illustrated in FIG. 3. The Doppler interval between Doppler peak P1 and Doppler peak P2 is 1/(2Tr).

<Case where Target Doppler Frequency $f_{d\_TargetDoppler}=1/(4Tr)$>

In the case where $f_{d\_TargetDoppler}=1/(4Tr)$, the Doppler peak generated in receiving the reflected wave signal for the transmission signal from transmission antenna Tx #2 is FFT-outputted as the peak (P2A) of an aliased signal as illustrated in FIG. 3. Thus, in the case where $f_{d\_TargetDoppler}=1/(4Tr)$, the position relation between the Doppler peak (P1) generated in receiving the reflected wave signal for the transmission signal from transmission antenna Tx #1 and the Doppler peak (P2A) of the aliased signal will be as illustrated in FIG. 3. The Doppler interval between the Doppler peak (P1) and the Doppler peak (P2A) is 1/(2Tr).

As described above, in both of the cases where $f_{d\_TargetDoppler}=-1/(4Tr)$ and $f_{d\_TargetDoppler}=1/(4Tr)$, the Doppler interval between the Doppler peak (P1) corresponding to transmission antenna Tx #1 and the Doppler peak (P2 or P2A) corresponding to transmission antenna Tx #2 is 1/(2Tr). Accordingly, the position relation between the Doppler peaks respectively corresponding to Tx #1 and Tx #2 is unable to be distinguished between the cases where $f_{d\_TargetDoppler}=-1/(4Tr)$ and 1/(4Tr), and this causes ambiguity. Thus, in the example illustrated in FIG. 3, the target Doppler frequency range in which no ambiguity occurs is, for example, $-1/(4Tr)\leq f_{d\_TargetDoppler}<1/(4Tr)$.

In contrast, in Doppler shifters 104 according to an exemplary embodiment of the present disclosure, at least one of the intervals of Doppler shift amounts $DOP_n$ (or phase rotations $\varphi_n(m)$) applied to the transmission signals transmitted from transmission antennas 105 is different, as described above.

Further, for example, Doppler shifters 104 apply Doppler shift amounts $DOP_n$ such that at least one of the intervals of phase rotations $\varphi_n(m)$ is different while keeping as much intervals of the Doppler shift amounts applied to the transmission signals transmitted from Nt transmission antennas 105 as possible. This improves a performance of demultiplexing Doppler multiplexing.

For example, n-th Doppler shifter 104 applies phase rotation $\varphi_n(m)$ as in the following expression to the inputted m-th chirp signal such that Doppler shift amounts DOPE are different from each other.

[5]

$$\phi_n(m) = \left\{A\frac{2\pi}{N_c}\text{round}\left(\frac{N_c}{Nt+\delta}\right)(n-1)+\Delta\phi_0\right\}(m-1)+\phi_0 \quad \text{(Expression 5)}$$

Here, A is a coefficient giving positive or negative polarity, which is 1 or −1. In addition, δ is a positive number greater than or equal to 1. Note that the term round($N_C$/(Nt+δ)) is introduced in order to set the phase rotation amount to an integer multiple of the Doppler frequency interval in Doppler analyzer 209.

By way of example, when phase rotation $\varphi_n(m)$ is applied where Nt=2, $\Delta\varphi_0=0$, $\varphi_0=0$, A=1, δ=1, and $N_C$ is a multiple of 3 in Expression 5, the Doppler shift amounts are represented by $DOP_1=0$ and $DOP_2=1/(3Tr)$.

Figure 4:
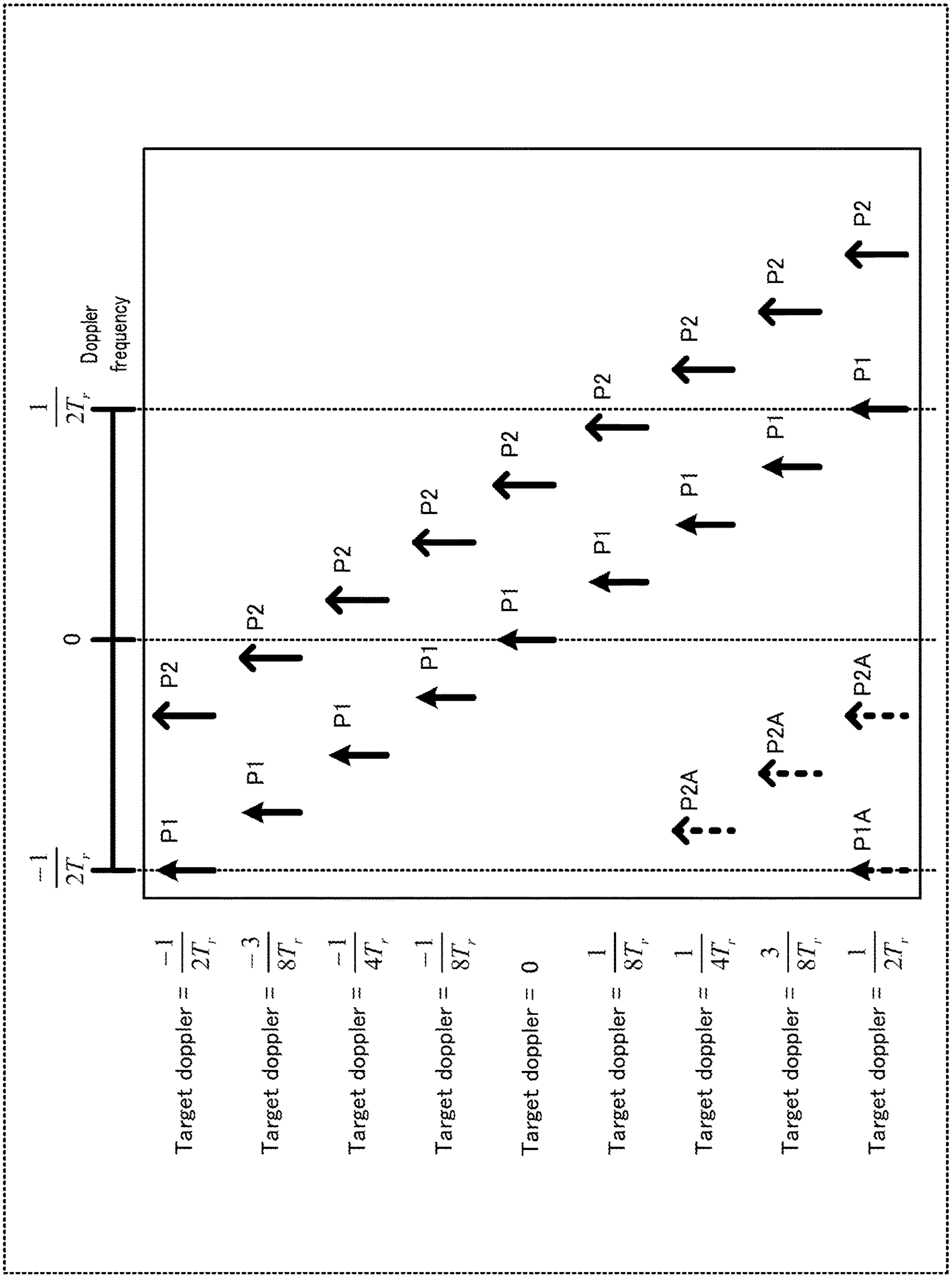
FIG. 4 illustrates exemplary Doppler peaks according to Embodiment 1.

FIG. 4 illustrates exemplary Doppler peaks obtained by Doppler analysis at Doppler analyzer 209 in a case where Doppler shift amounts of $DOP_1=0$ and $DOP_2=1/(3Tr)$ are used for the transmission signals transmitted from 2 (=Nt) transmission antennas 105 (hereinafter, referred to as Tx #1 and Tx #2).

As illustrated in FIG. 4, Nt Doppler peaks (Nt=2 in FIG. 4) are generated for the Doppler frequency of a single target to be measured (target doppler $f_{d\_TargetDoppler}$).

By way of example, in the following, position relations between the Doppler peaks generated in receiving reflected wave signals for transmission signals respectively transmitted from transmission antennas Tx #1 and Tx #2 are compared in FIG. 4 in a case where Doppler frequency of a measurement target $f_{d\_TargetDoppler}=-1/(4Tr)$ and in a case where $f_{d\_TargetDoppler}=1/(4Tr)$.

<Case where Target Doppler Frequency $f_{d\_TargetDoppler}=1/(4Tr)$>

In the case where $f_{d\_TargetDoppler}=-1/(4Tr)$, the position relation between the Doppler peak (P1) generated in receiving the reflected wave signal for the transmission signal from transmission antenna Tx #1 and the Doppler peak (P2) generated in receiving the reflected wave signal for the transmission signal from transmission antenna Tx #2 will be as illustrated in FIG. 4. The Doppler interval between Doppler peak P1 and Doppler peak P2 is 1/(3Tr).

<Case where Target Doppler Frequency $f_{d\_TargetDoppler}=1/(4Tr)$>

In the case where $f_{d\_TargetDoppler}=1/(4Tr)$, the Doppler peak generated in receiving the reflected wave signal for the transmission signal from transmission antenna Tx #2 is FFT-outputted as the peak (P2A) of an aliased signal. Thus, the case where $f_{d\_TargetDoppler}=1/(4Tr)$ results in the position relation between the Doppler peak (P1) generated in receiving the reflected wave signal for the transmission signal from transmission antenna Tx #1 and the Doppler peak (P2A) of the aliased signal. The Doppler interval between the Doppler peak (P1) and the peak (P2A) is 2/(3Tr).

As illustrated in FIG. 4, the position relations between the Doppler peak (P1) corresponding to transmission antenna Tx #1 and the Doppler peak (P2 or P2A) corresponding to transmission antenna Tx #2 are different from each other between the cases where target Doppler frequency $f_{d\_TargetDoppler}=-1/(4Tr)$ and $f_{d\_TargetDoppler}=1/(4Tr)$.

As described above, intervals of the Doppler shift amounts applied to the transmission signals transmitted from the plurality of transmission antennas 105 are set to be unequal in the range of the Doppler frequency to be subjected to the Doppler analysis (e.g., Doppler frequency range in which no aliasing occurs). For example, the interval of the Doppler shift amounts applied to the transmission signals transmitted from 2 (=Nt) transmission antennas 105 is set to the interval obtained by dividing the Doppler frequency range in which no aliasing occurs (e.g., $-1/(2Tr)\le f_d<1/(2Tr)$) by the number of transmission antennas 105 (e.g., Nt=2) with 1 (=δ) added. The interval will result in 1/(3Tr) in this example.

Accordingly, as illustrated in FIG. 4, for example, the Doppler interval (1/(3Tr)) without aliasing (e.g., Doppler peak (P1) and Doppler peak (P2)) is different from the Doppler interval (2/(3Tr)) with aliasing (e.g., Doppler peak (P1) and Doppler peak (P2A)).

Thus, in the example illustrated in FIG. 4, Doppler demultiplexer 211 can distinguish between the case where target Doppler frequency $f_{d\_TargetDoppler}=-1/(4Tr)$ (in other words, the case without aliasing) and the case where $f_{d\_TargetDoppler}=1/(4Tr)$ (in other words, the case with aliasing).

For example, in a case where $-1/(2Tr)\le$assumed target Doppler frequency $f_{d\_TargetDoppler}<1/(2Tr)$, Doppler demultiplexer 211 can determine that no aliased signal is included when target Doppler frequency $f_{d\_TargetDoppler}=-1/(4Tr)$. Thus, for example, in the case where $f_{d\_TargetDoppler}=-1/(4Tr)$ illustrated in FIG. 4, Doppler demultiplexer 211 can determine that no aliased signal is included and that the Doppler peak with lower frequency is for the reflected wave signal for the transmission signal from transmission antenna Tx #1 and the Doppler peak with higher frequency is for the reflected wave signal for the transmission signal from transmission antenna Tx #2.

For example, in the case where $-1/(2Tr)\le$assumed target Doppler frequency $f_{d\_TargetDoppler}<1/(2Tr)$, Doppler demultiplexer 211 can determine that an aliased Doppler peak (e.g., P2A) is included and that Doppler frequency $f_{d\_TargetDoppler}=1/(4Tr)$ when target Doppler frequency $f_{d\_TargetDoppler}=1/(4Tr)$. In the case where $f_{d\_TargetDoppler}=1/(4Tr)$ illustrated in FIG. 4, for example, an aliased signal (P2A) is included, and thus Doppler demultiplexer 211 can determine that the higher Doppler peak is for the reflected wave signal corresponding to transmission antenna Tx #1 and the lower Doppler peak is for the reflected wave signal corresponding to transmission antenna Tx #2 among the Doppler peaks having the Doppler peak interval of 2/(3Tr).

Next, as another example, position relations between the Doppler peaks generated in receiving reflected wave signals for transmission signals respectively transmitted from transmission antennas Tx #1 and Tx #2 are compared in FIG. 4 in a case where Doppler frequency of a measurement target $f_{d\_TargetDoppler}=-1/(2Tr)$ and in a case where $f_{d\_TargetDoppler}=1/(2Tr)$.

<Case where Target Doppler Frequency $f_{d\_TargetDoppler}=-1/(2Tr)$>

In the case where $f_{d\_TargetDoppler}=-1/(2Tr)$, the position relation between the Doppler peak (P1) generated in receiving the reflected wave signal for the transmission signal from transmission antenna Tx #1 and the Doppler peak (P2) generated in receiving the reflected wave signal for the transmission signal from transmission antenna Tx #2 will be as illustrated in FIG. 4. The Doppler interval between the Doppler peak (P1) and the Doppler peak (P2) is 1/(3Tr).

<Case where Target Doppler Frequency $f_{d\_TargetDoppler}=1/(2Tr)$>

In the case where $f_{d\_TargetDoppler}=1/(2Tr)$, the Doppler peak generated in receiving the reflected wave signal for the transmission signal from transmission antenna Tx #2 is FFT-outputted as the Doppler peak (P2A) of an aliased signal as illustrated in FIG. 4. This results in the position relation between the Doppler peak (P1) generated in receiving the reflected wave signal for the transmission signal from transmission antenna Tx #1 and the Doppler peak (P2A) of the aliased signal. The Doppler interval between the Doppler peak (P1) and the Doppler peak (P2A) is 1/(3Tr).

As described above, in both of the cases where target Dopller frequency $f_{d\_TargetDoppler}=-1/(2Tr)$ and $f_{d\_TargetDoppler}=1/(2Tr)$, the Doppler interval between the Doppler peak (P1) corresponding to transmission antenna Tx #1 and the Doppler peak (P2 or P2A) corresponding to transmission antenna Tx #2 is 1/(3Tr). Accordingly, the position relation between the Doppler peaks respectively corresponding to Tx #1 and Tx #2 is unable to be distinguished between the cases where $f_{d\_TargetDoppler}=-1/(2Tr)$ and $f_{d\_TargetDoppler}=1/(2Tr)$, and this causes ambiguity. Thus, in the example illustrated in FIG. 4, the target Doppler frequency range in which no ambiguity occurs is, for example, $-1/(2Tr)\leq f_{d\_TargetDoppler}<1/(2Tr)$.

Therefore, the present embodiment makes it possible to extend the target Doppler frequency range in which no ambiguity occurs by a factor of Nt (e.g., by a factor of 2 in FIG. 4) in comparison with the Doppler multiplexing using time division multiplexing or setting the Doppler shift amounts at equal intervals (see, for example, FIG. 3).

Next, an exemplary method for Doppler demultiplexer 211 to demultiplex signals corresponding to respective transmission antennas 105 will be described.

By way of example, the operations of Doppler demultiplexer 211 will be described in a case where Nt=2.

The following description is based on a case where phase rotation $\varphi_n(m)$ given in Expression 5 is applied in Doppler shifters 104, by way of example. Note that, as an example, $\Delta\varphi_0=0$, $\varphi_0=0$, $\delta=1$, and $N_C$ is a multiple of 3 in the following. In a case where A=1, the Doppler shift amounts for transmission antennas 105 are $DOP_1=0$ and $DOP_2=1/(3Tr)$. In a case where A=−1, the Doppler shift amounts for transmission antennas 105 are $DOP_1=0$ and $DOP_2=-1/(3Tr)$.

In this case, Doppler demultiplexer 211 demultiplexes Doppler multiplexed signals using a peak (distance index $f_{b\_cfar}$ and Doppler frequency index $f_{s\_cfar}$) that is inputted from CFAR section 210 and provides received power greater than a threshold.

For example, Doppler demultiplexer 211 determines, for a plurality of Doppler frequency indices $f_{s\_cfar}$ with the same distance index $f_{b\_cfar}$, which of the transmission signals transmitted from transmission antennas Tx #1 to Tx #Nt the reflected wave signals each correspond to. Doppler demultiplexer 211 demultiplexes and outputs the determined reflected wave signals respectively corresponding to transmission antennas Tx #1 to Tx #Nt.

The following describes the operations in a case where there are a plurality (Ns) of Doppler frequency indices $f_{s\_cfar}$ with the same distance index $f_{b\_cfar}$. For example, $f_{s\_cfar}\in\{fd_{\#1}, fd_{\#2}, \ldots, fd_{\#Ns}\}$.

Doppler demultiplexer 211 calculates Doppler index intervals, for example, for the plurality of Doppler frequency indices $f_{s\_cfar}\in\{fd_{\#1}, fd_{\#2}, \ldots, fd_{\#Ns}\}$ with the same distance index $f_{b\_cfar}$.

Here, 2 (=Nt) Doppler peaks are generated for single target Doppler frequency $f_{d\_TargetDoppler}$ by Doppler shift amounts $DOP_1$ and $DOP_2$ applied to the transmission signals respectively transmitted from transmission antennas Tx #1 and Tx #2. The Doppler index interval corresponding to the Doppler interval between the Doppler peaks is represented as $round(N_c/(Nt+1))$ from the difference between phase rotation $\varphi_1(m)$ for transmission antenna Tx #1 and phase rotation $\varphi_2(m)$ for transmission antenna Tx #2 given in the following expression. In a case where an aliased signal is included, the Doppler index interval corresponding to the Doppler interval between the Doppler peaks is represented as $N_c-round(N_c/(Nt+1))$.

[6]

$$\phi_2(m)-\phi_1(m)=A\frac{2\pi}{N_c}\text{round}\left(\frac{N_c}{Nt+1}\right) \quad \text{(Expression 6)}$$

Then, Doppler demultiplexer 211 searches for the Doppler frequency indices that match Doppler index interval $round(N_c/(Nt+1))$ corresponding to the interval of the Doppler shift amounts with no aliased signal included, or the Doppler frequency indices that match Doppler index interval $(N_c-round(N_c/(Nt+1)))$ corresponding to the interval of the Doppler shift amounts with an aliased signal included.

Doppler demultiplexer 211 performs the following processing based on the result of the search described above.

1. In a case where there are the Doppler frequency indices that match index interval $round(N_c/(Nt+1))$ corresponding to the interval of the Doppler shift amounts with no aliased signal included, Doppler demultiplexer 211 outputs a pair of the Doppler frequency indices (for example, represented as $fd_{\#p}$, $fd_{\#q}$) as demultiplexing index information ($f_{demul\_Tx\ \#1}$, $f_{demul\_Tx\ \#2}$) of Doppler multiplexed signals.

Here, when the Doppler shift amounts for transmission antennas Tx #1 and Tx #2 have a relationship where $DOP_1<DOP_2$, Doppler demultiplexer 211 determines the higher one of $fd_{\#p}$ and $fd_{\#q}$ as Doppler frequency index $f_{demul\_Tx\ \#2}$ corresponding to Tx #2, and determines the lower one as Doppler frequency index $f_{demul\_Tx\ \#1}$ corresponding to Tx #1. Meanwhile, when the Doppler shift amounts for transmission antennas Tx #1 and Tx #2 have a relationship where $DOP_1>DOP_2$, Doppler demultiplexer 211 determines the higher one of $fd_{\#p}$ and $fd_{\#q}$ as Doppler frequency index $f_{demul\_Tx\ \#1}$ corresponding to Tx #1, and determines the lower one as Doppler frequency index $f_{demul\_Tx\ \#2}$ corresponding to Tx #2.

2. In a case where there are the Doppler frequency indices that match index interval $N_c-round(N_c/(Nt+1))$ corresponding to the interval of the Doppler shift amounts with an aliased signal included, Doppler demultiplexer 211 outputs a pair of the Doppler frequency indices (e.g., $fd_{\#p}$, $fd_{\#q}$) as demultiplexing index information ($f_{demul\_Tx\ \#1}$, $f_{demul\_Tx\ \#2}$) of Doppler multiplexed signals.

Here, when the Doppler shift amounts for transmission antennas Tx #1 and Tx #2 have a relationship where $DOP_1<DOP_2$, Doppler demultiplexer 211 determines the higher one of $fd_{\#p}$ and $fd_{\#q}$ as Doppler frequency index $f_{demul\_Tx\ \#1}$ corresponding to Tx #1, and determines the lower one as Doppler frequency index $f_{demul\_Tx\ \#2}$ corresponding to Tx #2. Meanwhile, when the Doppler shift amounts for transmission antennas Tx #1 and Tx #2 have a relationship where $DOP_1 > DOP_2$, Doppler demultiplexer 211 determines the higher one of $fd_{\#p}$ and $fd_{\#q}$ as Doppler frequency index $f_{demul\_Tx\ \#2}$ corresponding to Tx #2, and determines the lower one as Doppler frequency index $f_{demul\_Tx\ \#1}$ corresponding to Tx #1.

3. In a case where there are neither the Doppler frequency indices that match index interval round($N_c$/(Nt+1)) corresponding to the interval of the Doppler shift amounts with no aliased signal included nor the Doppler frequency indices that match index interval $N_c$−round($N_c$/(Nt+1)) corresponding to the interval of the Doppler shift amounts with an aliased signal included, Doppler demultiplexer 211 determines that the generated Doppler peaks are noise components. In this case, Doppler demultiplexer 211 need not output demultiplexing index information ($f_{demul\_Tx\ \#1}$, $f_{demul\_Tx\ \#2}$) of Doppler multiplexed signals.

4. In a case where there are the Doppler frequency indices that match index interval round($N_c$/(Nt+1)) corresponding to the interval of the Doppler shift amounts with no aliased signal included and that also match index interval $N_c$−round ($N_c$/(Nt+1)) corresponding to the interval of the Doppler shift amounts with an aliased signal included, Doppler demultiplexer 211 performs, for example, the following deduplication processing.

For example, the pair of the Doppler frequency indices that match index interval round($N_c$/(Nt+1)) corresponding to the interval of the Doppler shift amounts with no aliased signal included is represented as ($fd_{\#p}$, $fd_{\#q1}$). Meanwhile, the pair of the Doppler frequency indices that match index interval $N_c$−round($N_c$/(Nt+1)) corresponding to the interval of the Doppler shift amounts with an aliased signal included is represented as ($fd_{\#p}$, $fd_{\#q2}$).

Doppler demultiplexer 211 calculates, for example, power difference $|PowerFT(f_{b\_cfar}, fd_{\#q1}) - PowerFT(f_{b\_cfar}, fd_{\#p})|$ in the pair of Doppler frequency indices ($fd_{\#p}$, $fd_{\#q1}$) and power difference $|PowerFT(f_{b\_cfar}, fd_{\#q2}) - PowerFT(f_{b\_cfar}, fd_{\#p})|$ in the pair of Doppler frequency indices ($fd_{\#p}$, $fd_{\#q2}$). When the power (in other words, difference) between the power differences is greater than predetermined power threshold TPL, Doppler demultiplexer 211 adopts the pair with smaller power difference within the pair of the Doppler frequency indices.

For example, when the following expression is satisfied, Doppler demultiplexer 211 adopts the pair of Doppler frequency indices ($fd_{\#p}$, $fd_{\#q2}$), and performs processing 2 described above.

$$|\mathrm{Power}FT(f_{b\_cfar},fd_{\#q1})-\mathrm{Power}FT(f_{b\_cfar},fd_{\#p})|-|\mathrm{Power}FT(f_{b\_cfar},fd_{\#q2})-\mathrm{Power}FT(f_{b\_cfar},fd_{\#p})|>TPL \quad \text{(Expression 7)}$$

For example, when the following expression is satisfied, Doppler demultiplexer 211 adopts the pair of Doppler frequency indices ($fd_{\#p}$, $fd_{\#q1}$), and performs processing 1 described above.

$$|\mathrm{Power}FT(f_{b\_cfar},fd_{\#q2})-\mathrm{Power}FT(f_{b\_cfar},fd_{\#p})|-|\mathrm{Power}FT(f_{b\_cfar},fd_{\#q1})-\mathrm{Power}FT(f_{b\_cfar},\mathrm{fd}_{\#p})|>TPL \quad \text{(Expression 8)}$$

When neither Expression 7 nor Expression 8 is satisfied, Doppler demultiplexer 211 performs above-described processing 3 without adopting either pair of the Doppler frequency indices.

Doppler demultiplexer 211 can demultiplex Doppler multiplexed signals in the above-described manner.

The exemplary operations of Doppler demultiplexer 211 have been described, thus far.

In FIG. 1, direction estimator 212 performs target direction estimation processing based on the information inputted from Doppler demultiplexer 211 (e.g., distance index $f_{b\_cfar}$ and demultiplexing index information ($f_{demul\_Tx\ \#1}$, $f_{demul\_Tx\ \#2}$, . . . , $f_{demul\_Tx\ \#Nt}$)).

For example, direction estimator 212 extracts the output corresponding to distance index $f_{b\_cfar}$ and demultiplexing index information ($f_{demul\_Tx\ \#1}$, $f_{demul\_Tx\ \#2}$, . . . , $f_{demul\_Tx\ \#Nt}$) from the output of Doppler demultiplexer 211, and generates virtual reception array correlation vector $h(f_{b\_cfar}, f_{demul\_Tx\ \#1}, \ldots f_{demul\_Tx\ \#2}, \ldots, f_{demul\_Tx\ \#Nt})$ given by the following expression to perform the direction estimation processing.

Virtual reception array correlation vector $h(f_{b\_cfar}, f_{demul\_Tx\ \#1}, f_{demul\_Tx\ \#2}, \ldots, f_{demul\_Tx\ \#Nt})$ includes Nt×Na elements, the number of which is the product of number Nt of transmission antennas and number Na of reception antennas. Virtual reception array correlation vector $h(f_{b\_cfar}, f_{demul\_Tx\ \#1}, f_{demul\_Tx\ \#2}, \ldots, f_{demul\_Tx\ \#Nt})$ is used for processing of performing, on reflected wave signals from a target, direction estimation based on phase differences between reception antennas 202. Here, z=1, . . . , Na

[7]

(Expression 9)

$$h(f_{b\_cfar}, f_{demul\_Tx\#1}, f_{demul\_Tx\#2}, \ldots, f_{demul\_Tx\#Nt}) = \begin{bmatrix} h_{cal[1]}VFT_1(f_{b\_cfar}, f_{demal\_Tx\#1}) \\ h_{cal[2]}VFT_2(f_{b\_cfar}, f_{demal\_Tx\#1}) \\ \vdots \\ h_{cal[Na]}VFT_{Na}(f_{b\_cfar}, f_{demal\_Tx\#1}) \\ h_{cal[1Na+1]}VFT_1(f_{b\_cfar}, f_{demal\_Tx\#2}) \\ h_{cal[1Na+2]}VFT_2(f_{b\_cfar}, f_{demal\_Tx\#2}) \\ \vdots \\ h_{cal[2Na]}VFT_{Na}(f_{b\_cfar}, f_{demal\_Tx\#2}) \\ \vdots \\ h_{cal[Na(Nt-1)+1]}VFT_1(f_{b\_cfar}, f_{demal\_Tx\#Nt}) \\ h_{cal[Na(Nt-1)+2]}VFT_2(f_{b\_cfar}, f_{demal\_Tx\#Nt}) \\ \vdots \\ h_{cal[NaNt]}VFT_2(f_{b\_cfar}, f_{demal\_Tx\#Nt}) \end{bmatrix}$$

In Expression 9, $h_{cal[b]}$ denotes an array correction value for correcting phase deviations and amplitude deviations in the transmission array antenna and in the reception array antenna. Here, b=1, . . . , (Nt×Na).

For example, direction estimator 212 calculates a spatial profile, with azimuth direction θ in direction estimation evaluation function value $P_H(\theta, f_{b\_cfar}, f_{demul\_Tx\ \#1}, f_{demul\_Tx\ \#2}, \ldots, f_{demul\_Tx\ \#Nt})$ being variable within a predetermined angular range. Direction estimator 212 extracts a predetermined number of local maximum peaks in the calculated spatial profile in descending order, and outputs the azimuth directions of the local maximum peaks as direction-of-arrival estimation values (for example, positioning outputs).

Note that there are various methods with direction estimation evaluation function value $P_H(\theta, f_{b\_cfar}, f_{demul\_Tx\ \#1}, f_{demul\_Tx\ \#2}, \ldots, f_{demul\_Tx\ \#Nt})$ depending on direction-of-arrival estimation algorithms. For example, an estimation method using an array antenna, as disclosed in NPL 3, may be used.

For example, when Nt×Na virtual reception array antennas are linearly arranged at equal intervals $d_H$, a beamformer method can be given by the following expressions. In addition, a technique such as Capon or MUSIC is also applicable.

[8]

$$P_H(\theta_u, f_{b\_cfar}, f_{demal\_Tx\#1}, f_{demal\_Tx\#2}, \ldots, f_{demal\_Tx\#Nt}) = \left|a^H(\theta_u)h(f_{b\_cfar}, f_{demal\_Tx\#1}, f_{demal\_Tx\#2}, \ldots, f_{demal\_Tx\#Nt})\right|^2 \quad \text{(Expression 10)}$$

[9]

$$a(\theta_u) = \begin{bmatrix} 1 \\ \exp\{j2\pi d_H \sin\theta_u / \lambda\} \\ \vdots \\ \exp\{-j2\pi(N_t N_a - 1)d_H \sin\theta_u / \lambda\} \end{bmatrix} \quad \text{(Expression 11)}$$

Here, in Expression 10, superscript H denotes the Hermitian transpose operator. Further, $a(\theta_u)$ denotes the direction vector of the virtual reception array relative to an incoming wave in azimuth direction $\theta_u$.

Further, azimuth direction $\theta_u$ is a vector that is changed at predetermined azimuth interval $\beta_1$ in an azimuth range in which direction-of-arrival estimation is performed. For example, $\theta_u$ is set as follows:

$\theta_u = \theta\text{min} + u\beta_1$, $u=0, \ldots, NU$ $NU = \text{floor}[(\theta\text{max} - \theta\text{min})/\beta_1] + 1$.

Here, floor(x) is a function that returns the largest integer value not greater than real number x.

Note that the Doppler frequency information may be converted into the relative velocity component and then outputted. The following expression may be used to convert Doppler frequency index $f_s$ to relative velocity component $v_d(f_s)$. Here, λ is the wavelength of carrier frequency of an RF signal outputted from a transmission radio (not illustrated). Further, $\Delta_f$ denotes the Doppler frequency interval in FFT processing performed in Doppler analyzer 209. For example, $\Delta_f = 1/(N_c T_r)$ in the present embodiment.

[10]

$$v_d(f_s) = \frac{\lambda}{2} f_s \Delta_f \quad \text{(Expression 12)}$$

As described above, in the present embodiment, radar apparatus 10 includes a plurality of transmission antennas 105 that transmit transmission signals, and Doppler shifters 104 that respectively apply different Doppler shift amounts to the transmission signals of the plurality of transmission antennas 105. Further, in radar apparatus 10, intervals of the Doppler shift amounts applied to the transmission signals to be transmitted from the plurality of transmission antennas 105 are set to be unequal in a range of Doppler frequency.

This causes, in radar apparatus 10, intervals of the Doppler peaks respectively corresponding to the transmission signals to be different between a case with aliasing and a case without aliasing. In other words, radar apparatus 10 can determine the presence or absence of aliasing of the Doppler peaks. Accordingly, radar apparatus 10 can distinguish between the target Doppler frequency (target doppler) with aliasing and the target Doppler frequency without aliasing to demultiplex Doppler multiplexed signals. Thus, radar apparatus 10 can extend the Doppler frequency range (or maximum value of relative velocity) in which the Doppler multiplexed signals can be demultiplexed.

As described above, the present embodiment makes it possible to extend the Doppler frequency range (or maximum value of relative velocity) in which no ambiguity occurs. This allows radar apparatus 10 to accurately sense a target (e.g., direction of arrival) in a wider Doppler frequency range.

(Variation 1)

In the above embodiment, the exemplary operation of Doppler multiplexing has been described in the case where Nt=2. Number Nt of transmission antennas, however, is not limited to two, and may be three or more.

In Variation 1, the operation of radar apparatus 10 will be described in a case where Nt=3, as another example.

The following description is based on a case where phase rotation $\varphi_n(m)$ given in Expression 5 is applied in Doppler shifters 104, by way of example. Note that, as an example, $\Delta\varphi_0=0$, $\varphi_0=0$, $\delta=1$, and $N_C$ is an even number in the following. In a case where A=1, for example, the Doppler shift amounts for transmission antennas 105 are $DOP_1=0$, $DOP_2=1/(4Tr)$, and $DOP_3=1/(2Tr)$. In a case where A=−1, for example, the Doppler shift amounts for transmission antennas 105 are $DOP_1=0$, $DOP_2=-1/(4Tr)$, and $DOP_3=-1/(2Tr)$.

Figure 5:
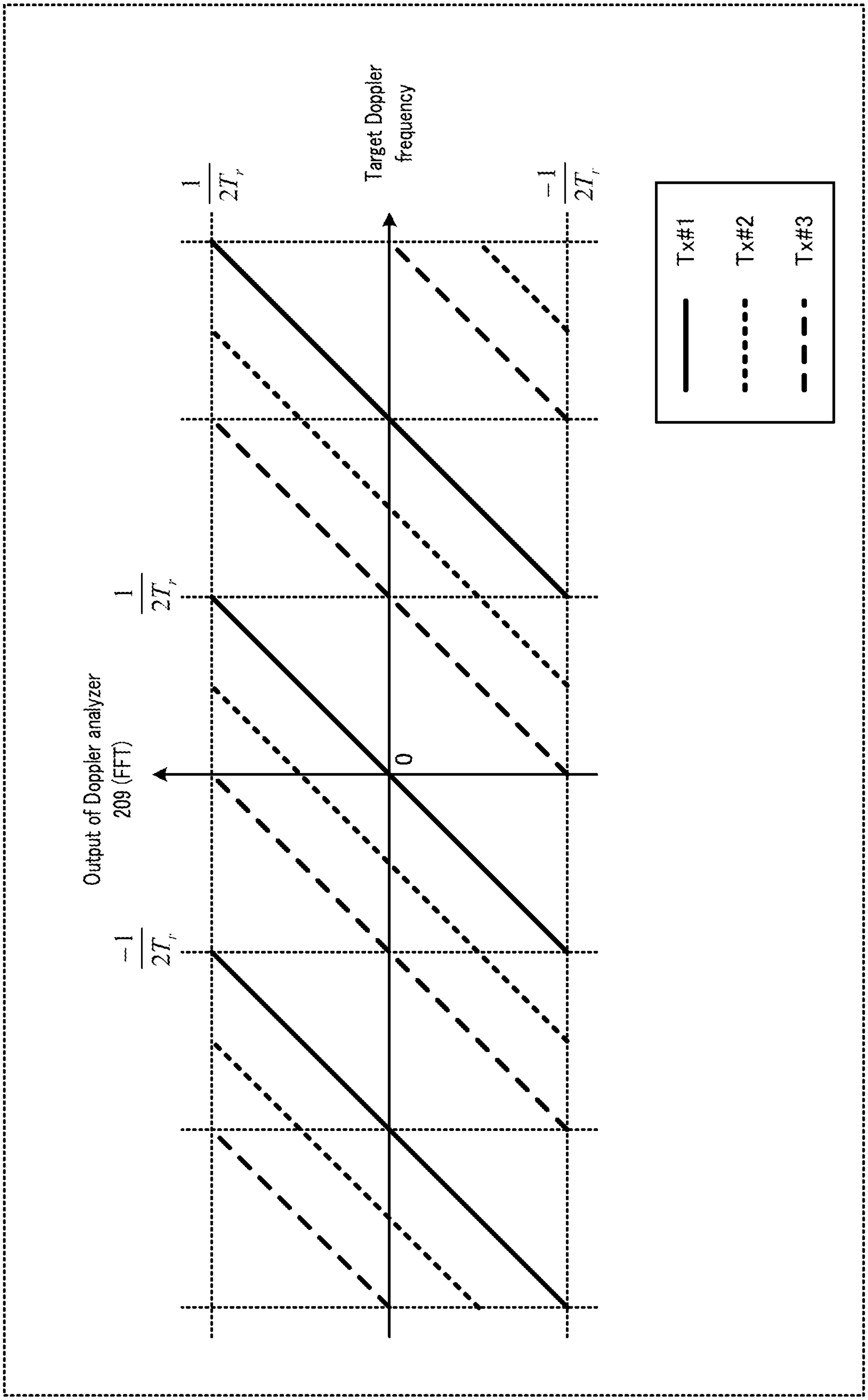
FIG. 5 illustrates exemplary Doppler peaks according to Variation 1.

When such Doppler shift amounts are used, for example, as illustrated in FIG. 5, Nt (three in FIG. 5) Doppler peaks are generated for single target Doppler frequency $f_{d\_TargetDoppler}$ to be measured. Note that FIG. 5 illustrates the change in the Doppler peaks in the case where Nt=3, with the horizontal axis indicating the target Doppler frequency and the vertical axis indicating the output of Doppler analyzer 209 (FFT).

<Case where 0≤Target Doppler Frequency $f_{d\_TargetDoppler}$<1/(2Tr)>

As illustrated in FIG. 5, the Doppler interval is 1/(2Tr) between the Doppler peak (solid line) generated in receiving the reflected wave signal for the transmission signal from transmission antenna Tx #1 and the Doppler peak (broken line) generated in receiving the reflected wave signal for the transmission signal from transmission antenna Tx #3.

Tx #3 includes an aliased signal in this case. Thus, Doppler demultiplexer 211 can determine that, among the Doppler peaks with the Doppler peak interval of 1/(2Tr), the higher Doppler peak is the reflected wave signal corresponding to transmission antenna Tx #1, the lower Doppler peak is the reflected wave signal corresponding to transmission antenna Tx #3, and the remaining Doppler peak is the reflected wave signal from transmission antenna Tx #2.

<Case where −1/(2Tr)≤Target Doppler Frequency $f_{d\_TargetDoppler}$<0>

As illustrated in FIG. 5, the Doppler interval is 1/(4Tr) between the Doppler peak (solid line) generated in receiving the reflected wave signal for the transmission signal from transmission antenna Tx #1 and the Doppler peak (dotted line) generated in receiving the reflected wave signal for the transmission signal from transmission antenna Tx #2. The Doppler interval is also 1/(4Tr) between the Doppler peak (dotted line) generated in receiving the reflected wave signal for the transmission signal from transmission antenna Tx #2 and the Doppler peak (broken line) generated in receiving the reflected wave signal for the transmission signal from transmission antenna Tx #3.

None of transmission antennas Tx #1, Tx #2, and Tx #3 include an aliased signal in this case. Thus, Doppler demultiplexer 211 can determine that the reflected wave signals respectively correspond to the transmission signals from transmission antennas Tx #1, Tx #2, and Tx #3 from the Doppler peak with the lowest frequency.

As described above, intervals of the Doppler shift amounts applied to the transmission signals transmitted from the plurality of transmission antennas 105 are set to be unequal in the Doppler frequency range (e.g., $-1/(2Tr) \le f_d < 1/(2Tr)$ in the example illustrated in FIG. 5). For example, each of the intervals of the Doppler shift amounts applied to the transmission signals transmitted from 3 (=Nt) transmission antennas is set to the interval obtained by dividing the Doppler frequency range in which no aliasing occurs (e.g., $-1/(2Tr) \le f_d < 1/(2Tr)$) by the number of transmission antennas (e.g., Nt=3) with 1 (=δ) added. The interval will result in 1/(4Tr) in this example.

Accordingly, the Doppler interval without aliasing, which is 1/(4Tr), and the Doppler intervals with aliasing, which are 1/(4Tr) and 1/(2Tr), are different from each other as illustrated in FIG. 5, for example.

Thus, in the example illustrated in FIG. 5, Doppler demultiplexer 211 can distinguish between the case where $-1/(2Tr) \le$ target Doppler frequency $f_{d\_TargetDoppler} < 0$ (in other words, the case without aliasing) and the case where $0 \le$ target Doppler frequency $f_{d\_TargetDoppler} < 1/(2Tr)$ (in other words, the case with aliasing).

This results in that the target Doppler frequency range in which no ambiguity occurs is, for example, $-1/(2Tr) \le f_{d\_TargetDoppler} < 1/(2Tr)$ in the example illustrated in FIG. 5.

Therefore, the target Doppler frequency range in which no ambiguity occurs can be extended by a factor of Nt (e.g., a factor of 3 in FIG. 5) in comparison with the Doppler multiplexing using time division multiplexing or setting the Doppler shift amounts at equal intervals (case of 1/(3Tr) in FIG. 5).

Next, an exemplary method for Doppler demultiplexer 211 to demultiplex signals corresponding to respective transmission antennas 105 will be described.

Doppler demultiplexer 211 demultiplexes Doppler multiplexed signals using a peak (distance index $f_{b\_cfar}$ and Doppler frequency index $f_{s\_cfar}$) that is inputted from CFAR section 210 and provides received power greater than a threshold.

For example, Doppler demultiplexer 211 determines, for a plurality of Doppler frequency indices $f_{s\_cfar}$ with the same distance index $f_{b\_cfar}$, which of the transmission signals transmitted from transmission antennas Tx #1 to Tx #Nt the reflected wave signals each correspond to. Doppler demultiplexer 211 demultiplexes and outputs the determined reflected wave signals respectively corresponding to transmission antennas Tx #1 to Tx #Nt.

Doppler demultiplexer 211 calculates Doppler index intervals, for example, for the plurality of Doppler frequency indices $f_{s\_cfar} \in \{fd_{\#1}, fd_{\#2}, \ldots, fd_{\#Ns}\}$ with the same distance index $f_{b\_cfar}$.

Doppler demultiplexer 211 sees three Doppler frequency indices in ascending order, and searches for a set of the Doppler frequency indices with two Doppler index intervals that match index intervals round($N_c$/(Nt+1)) and round($N_c$/(Nt+1)) corresponding to the intervals of the Doppler shift amounts with no aliased signal included. Alternatively, Doppler demultiplexer 211 sees three Doppler frequency indices in ascending order, and searches for a set of the Doppler frequency indices with two Doppler index intervals that match index intervals round($N_c$/(Nt+1)) and $N_c$−round($N_c$/(Nt+1)), or $N_c$−round($N_c$/(Nt+1)) and round($N_c$/(Nt+1)), corresponding to the intervals of the Doppler shift amounts with an aliased signal included.

Doppler demultiplexer 211 performs the following processing based on the result of the search described above.

1. In a case where there is a set of the Doppler frequency indices that match index intervals round($N_c$/(Nt+1)) and round($N_c$/(Nt+1)) corresponding to the intervals of the Doppler shift amounts with no aliased signal included, Doppler demultiplexer 211 outputs the set of the Doppler frequency indices (for example, represented as $fd_{\#p1}$, $fd_{\#p2}$, $fd_{\#p3}$) as demultiplexing index information ($f_{demul\_Tx\ \#1}$, $f_{demul\_Tx\ \#2}$, $f_{demul\_Tx\ \#3}$) of Doppler multiplexed signals.

Here, when the Doppler shift amounts for transmission antennas Tx #1, Tx #2, and Tx #3 have a relationship where $DOP_1 < DOP_2 < DOP_3$, Doppler demultiplexer 211 determines the highest one of $fd_{\#p1}$, $fd_{\#p2}$, and $fd_{\#p3}$ as Doppler frequency index $f_{demul\_Tx\ \#3}$ corresponding to Tx #3, determines the second highest one as Doppler frequency index $f_{demul\_Tx\ \#2}$ corresponding to Tx #2, and determines the lowest one as Doppler frequency index $f_{demul\_Tx\ \#1}$ corresponding to Tx #1. Meanwhile, when the Doppler shift amounts for transmission antennas Tx #1, Tx #2, and Tx #3 have a relationship where $DOP_1 > DOP_2 > DOP_3$, Doppler demultiplexer 211 determines the highest one of $fd_{\#p1}$, $fd_{\#p2}$, and $fd_{\#p3}$ as Doppler frequency index $f_{demul\_Tx\ \#1}$ corresponding to Tx #1, determines the second highest one as Doppler frequency index $f_{demul\_Tx\ \#2}$ corresponding to Tx #2, and determines the lowest one as Doppler frequency index $f_{demul\_Tx\ \#3}$ corresponding to Tx #3.

2. In a case where there is a set of the Doppler frequency indices that match index interval $N_c$−round($N_c$/(Nt+1)) and round($N_c$/(Nt+1)) corresponding to the intervals of the Doppler shift amounts with an aliased signal included, Doppler demultiplexer 211 outputs the set of the Doppler frequency indices (for example, represented as $fd_{\#q1}$, $fd_{\#q2}$, $fd_{\#q3}$) as demultiplexing index information ($f_{demul\_Tx\ \#1}$, $f_{demul\_Tx\ \#2}$, $f_{demul\_Tx\ \#3}$) of Doppler multiplexed signals.

Here, when the Doppler shift amounts for transmission antennas Tx #1, Tx #2, and Tx #3 have a relationship where $DOP_1 < DOP_2 < DOP_3$, Doppler demultiplexer 211 determines the highest one of $fd_{\#q1}$, $fd_{\#q2}$, and $fd_{\#q3}$ as Doppler frequency index $f_{demul\_Tx\ \#2}$ corresponding to Tx #2, determines the second highest one as Doppler frequency index $f_{demul\_Tx\ \#1}$ corresponding to Tx #1, and determines the lowest one as Doppler frequency index $f_{demul\_Tx\ \#3}$ corresponding to Tx #3. Meanwhile, when the Doppler shift amounts for transmission antennas Tx #1, Tx #2, and Tx #3 have a relationship where $DOP_1 > DOP_2 > DOP_3$, Doppler demultiplexer 211 determines the highest one of $fd_{\#q1}$, $fd_{\#q2}$, and $fd_{\#q3}$ as Doppler frequency index $f_{demul\_Tx\ \#2}$ corresponding to Tx #2, determines the second highest one as Doppler frequency index $f_{demul\_Tx\ \#3}$ corresponding to Tx #3, and determines the lowest one as Doppler frequency index $f_{demul\_Tx\ \#1}$ corresponding to Tx #1.

3. In a case where there is a set of the Doppler frequency indices that match index interval round($N_c$/(Nt+1)) and $N_c$−round($N_c$/(Nt+1)) corresponding to the intervals of the Doppler shift amounts with an aliased signal included, Doppler demultiplexer 211 outputs the set of the Doppler frequency indices (for example, represented as $fd_{\#u1}$, $fd_{\#u2}$, $fd_{\#u3}$) as demultiplexing index information ($f_{demul\_Tx\ \#1}$, $f_{demul\_Tx\ \#2}$, $f_{demul\_Tx\ \#3}$) of Doppler multiplexed signals.

Here, when the Doppler shift amounts for transmission antennas Tx #1, Tx #2, and Tx #3 have a relationship where $DOP_1 < DOP_2 < DOP_3$, Doppler demultiplexer 211 determines the highest one of $fd_{\#u1}$, $fd_{\#u2}$, and $fd_{\#u3}$ as Doppler frequency index $f_{demul\_Tx\ \#1}$ corresponding to Tx #1, determines the second highest one as Doppler frequency index $f_{demul\_Tx\ \#3}$ corresponding to Tx #3, and determines the lowest one as Doppler frequency index $f_{demul\_Tx\ \#2}$ corresponding to Tx #2. Meanwhile, when the Doppler shift amounts for transmission antennas Tx #1, Tx #2, and Tx #3 have a relationship where $DOP_1>DOP_2>DOP_3$, Doppler demultiplexer 211 determines the highest one of $fd_{\#u1}$, $fd_{\#u2}$, and $fd_{\#u3}$ as Doppler frequency index $f_{demul\_Tx\ \#3}$ corresponding to Tx #3, determines the second highest one as Doppler frequency index $f_{demul\_Tx\ \#1}$ corresponding to Tx #1, and determines the lowest one as Doppler frequency index $f_{demul\_Tx\ \#2}$ corresponding to Tx #2.

4. Doppler demultiplexer 211 determines Doppler peaks corresponding to the Doppler frequency indices that match none of the above 1, 2, and 3 as noise components. In this case, Doppler demultiplexer 211 need not output demultiplexing index information ($f_{demul\_Tx\ \#1}$, $f_{demul\_Tx\ \#2}$, $f_{demul\_Tx\ \#3}$) of Doppler multiplexed signals.

5. In a case where the Doppler frequency indices corresponding, in an overlapping manner, to the above 1, 2 and 3 are included, Doppler demultiplexer 211 performs, for example, the following deduplication processing.

For example, in a case where sets of the Doppler frequency indices including the Doppler frequency indices corresponding to the above 1 and 2 are ($fd_{\#p1}$, $fd_{\#p2}$, $fd_{\#p3}$) and ($fd_{\#q1}$, $fd_{\#q2}$, $fd_{\#q3}$) respectively, Doppler demultiplexer 211 compares the received power of the Doppler frequency indices in each set, e.g., {PowerFT($f_{b\_cfar}$, $fd_{\#p1}$), PowerFT($f_{b\_cfar}$, $fd_{\#p2}$), PowerFT($f_{b\_cfar}$, $fd_{\#p3}$)} and {PowerFT($f_{b\_cfar}$, $fd_{\#q1}$), PowerFT($f_{b\_cfar}$, $fd_{\#q2}$), PowerFT($f_{b\_cfar}$, $fd_{\#q3}$)}, and extracts the lowest received power from each set. Then, Doppler demultiplexer 211 adopts, for example, a set of the Doppler frequency indices so that the power difference between the lowest powers in respective sets is greater than predetermined power threshold TPL.

For example, when the following expression is satisfied, Doppler demultiplexer 211 adopts the set of Doppler frequency indices ($fd_{\#p1}$, $fd_{\#p2}$, $fd_{\#p3}$), and performs processing 1 described above.

$$\mathrm{Min}(\{\mathrm{Power}FT(f_{b\_cfar}, fd_{\#p1}), \mathrm{Power}FT(f_{b\_cfar}, fd_{\#p2}), \mathrm{Power}FT(f_{b\_cfar}, fd_{\#p3})\})-\mathrm{Min}(\{\mathrm{Power}FT(f_{b\_cfar}, fd_{\#q1}), \mathrm{Power}FT(f_{b\_cfar}, fd_{\#q2}), \mathrm{Power}FT(f_{b\_cfar}, fd_{\#q3})\})>TPL \quad \text{(Expression 13)}$$

For example, when the following expression is satisfied, Doppler demultiplexer 211 adopts the set of Doppler frequency indices ($fd_{\#q1}$, $fd_{\#q2}$, $fd_{\#q3}$), and performs processing 2 described above.

$$\mathrm{Min}(\{\mathrm{Power}FT(f_{b\_cfar},fd_{\#q1}),\mathrm{Power}FT(f_{b\_cfar},fd_{\#q2}), \mathrm{Power}FT(f_{b\_cfar},fd_{\#q3})\})-\mathrm{Min}(\{\mathrm{Power}FT(f_{b\_cfar},fd_{\#p1}),\mathrm{Power}FT(f_{b\_cfar},fd_{\#p2}),\mathrm{Power}FT(f_{b\_cfar},fd_{\#p3})\})>TPL \quad \text{(Expression 14)}$$

When neither Expression 13 nor Expression 14 is satisfied, Doppler demultiplexer 211 performs above-described processing 4 without adopting either set of the Doppler frequency indices. Further, Doppler demultiplexer 211 performs the same duplication determination processing for a combination of overlapping other than 1 and 2.

Doppler demultiplexer 211 can demultiplex Doppler multiplexed signals in the above-described manner.

(Variation 2)

The above embodiment has provided a description of a case using phase rotation $\varphi_n(m)$ given in Expression 5 as an exemplary phase rotation corresponding to the Doppler shift amounts applied to the transmission signals. The phase rotation, however, is not limited to phase rotation (km) given in Expression 5.

As another example, n-th Doppler shifter 104 may apply phase rotation $\varphi_n(m)$ as in the following expression to the inputted m-th chirp signal (transmission signal), so that Doppler shift amounts $DOP_n$ are different from those in the case using Expression 5.

[11]

$$\phi_n(m) = \left\{A\frac{2\pi}{N_c}\mathrm{round}\left(\frac{N_c}{Nt}\right)(n-1) + \Delta\phi_0\right\}(m-1) + dp_n + \phi_0 \quad \text{(Expression 15)}$$

Here, $dp_n$ is a component that causes the phase rotations to have unequal intervals in the Doppler frequency range. For example, $dp_1, dp_2, \ldots dp_{Nt}$ are values in a range where $-\mathrm{round}(N_C/Nt)/2<dp_n<\mathrm{round}(N_C/Nt)/2$. Not all of them are identical values, and at least one of them includes a component of a different value. Note that the term round($N_C$/Nt) is introduced in order to set the phase rotation amount to an integer multiple of the Doppler frequency interval in Doppler analyzer 209.

By way of example, when phase rotation $\varphi_n(m)$ is applied where Nt=2, $\Delta\varphi_0=0$, $\varphi_0=0$, A=1, $dp_1=0$, $dp_2=\pi/5$, and Nc is an even number in Expression 15, the Doppler shift amounts are represented by $DOP_1=0$ and $DOP_2=1/(2Tr)+1/(10Tr)=6/(10Tr)$.

Figure 6:
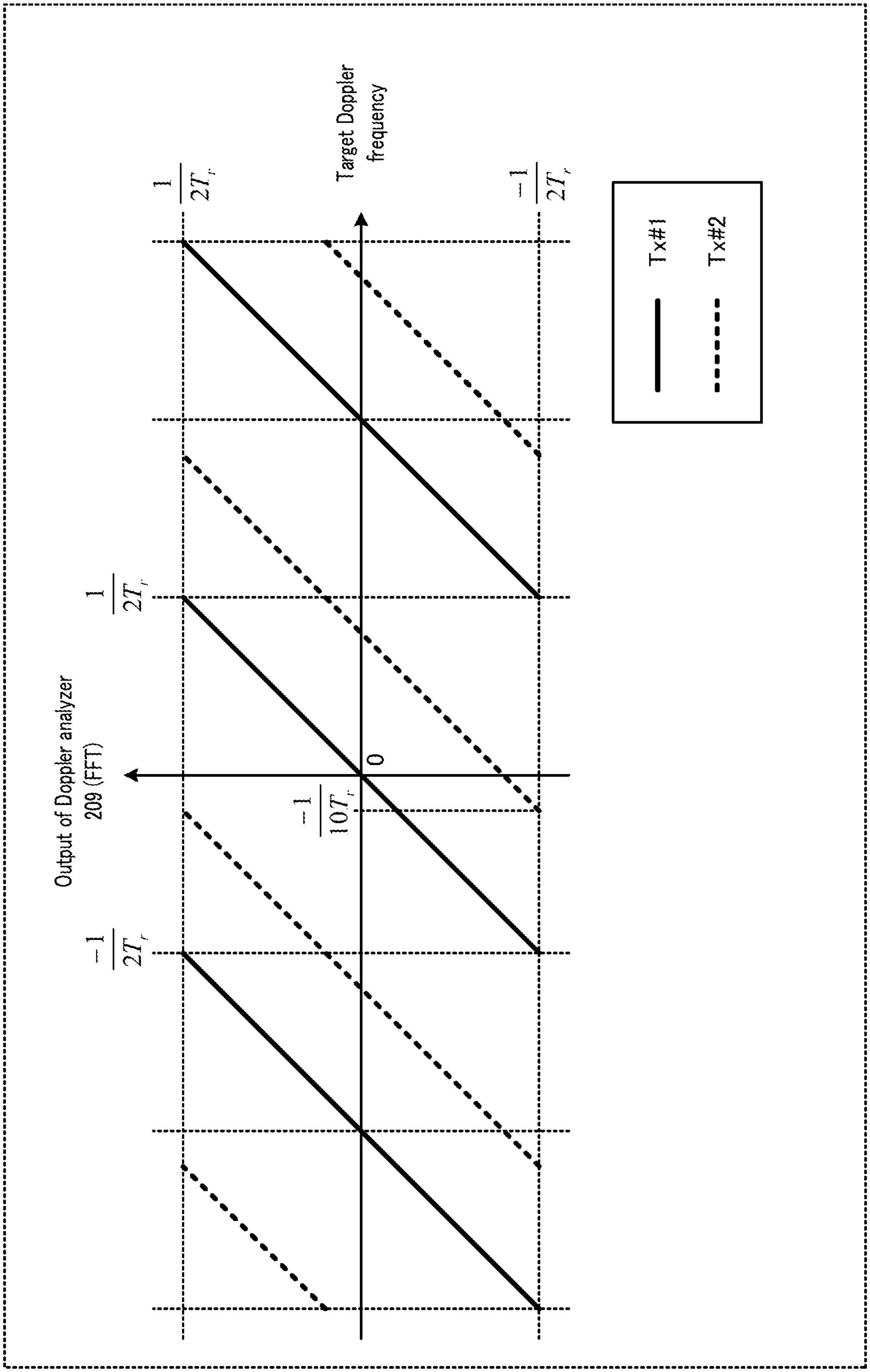
FIG. 6 illustrates exemplary Doppler peaks according to Variation 2.

FIG. 6 illustrates the change in the Doppler peaks in the case where Nt=2, $DOP_1=0$, and $DOP_2=6/(10Tr)$ with the horizontal axis indicating the target Doppler frequency and the vertical axis indicating the output of Doppler analyzer 209 (FFT).

<Case where $-1/(10Tr)\leq$Target Doppler Frequency $f_{d\_TargetDoppler}<1/(2Tr)$>

As illustrated in FIG. 6, the Doppler interval is 4/(10Tr) between the Doppler peak (solid line) generated in receiving the reflected wave signal for the transmission signal from transmission antenna Tx #1 and the Doppler peak (dotted line) generated in receiving the reflected wave signal for the transmission signal from transmission antenna Tx #2.

Tx #2 includes an aliased signal in this case. Thus, Doppler demultiplexer 211 can determine that, among the Doppler peaks with the Doppler peak interval of 4/(10Tr), the higher Doppler peak is the reflected wave signal corresponding to transmission antenna Tx #1, and the lower Doppler peak is the reflected wave signal corresponding to transmission antenna Tx #2.

<Case where $-1/(2Tr)\leq$Target Doppler Frequency $f_{d\_TargetDoppler}<-1/(10Tr)$>

As illustrated in FIG. 6, the Doppler interval is 6/(10Tr) between the Doppler peak (solid line) generated in receiving the reflected wave signal for the transmission signal from transmission antenna Tx #1 and the Doppler peak (dotted line) generated in receiving the reflected wave signal for the transmission signal from transmission antenna Tx #2.

Neither transmission antennas Tx #1 nor Tx #2 includes an aliased signal in this case. Thus, Doppler demultiplexer 211 can determine that the reflected wave signals respectively correspond to the transmission signals from transmission antennas Tx #1 and Tx #2 from the Doppler peak with the lowest frequency, for example.

As described above, in Variation 2, intervals of the Doppler shift amounts of transmission antennas 105 are set to intervals obtained by dividing the Doppler frequency range (e.g., $-1/(2Tr)\leq f_d<1/(2Tr)$ in FIG. 6) by the number of the plurality of transmission antennas 105 (e.g., Nt=2) with the offset of 6/(10Tr) (=$DOP_2$) added.

Accordingly, the Doppler interval without aliasing, which is 6/(10Tr), and the Doppler interval with aliasing, which is 4/(10Tr), are different from each other as illustrated in FIG. 6, for example.

This results in that the target Doppler frequency range in which no ambiguity occurs is, for example, $-1/(2Tr) \leq f_{d\_TargetDoppler} < 1/(2Tr)$ in the example illustrated in FIG. 6.

Thus, Variation 2 makes it possible to extend the target Doppler frequency range in which no ambiguity occurs by a factor of Nt (e.g., by a factor of 2 in FIG. 6) in comparison with time division multiplexing or Doppler multiplexing.

(Variation 3)

In Doppler multiplexing, Doppler demultiplexer 211 possibly fails to perform demultiplexing determination in a case where the reception levels of Doppler peaks of a plurality of targets are approximately equal and an interval of the Doppler peaks matches an interval of Doppler shift amounts.

When Doppler frequencies are different between the plurality of targets, however, the relative motion velocities between the targets and radar apparatus 10 are different from each other. Thus, it may be useful to perform continuous radar observation in radar apparatus 10 because even when the reception levels of the Doppler peaks of the plurality of targets are approximately equal and the interval of the Doppler peaks matches the interval of the Doppler shift amounts in a certain positioning output of the radar apparatus, the distance between the plurality of targets is likely to be measured differently in a positioning output of the radar apparatus that follows the certain output. Accordingly, the following positioning output of the radar apparatus is considered to provide an output in which the plurality of targets are demultiplexed.

In Variation 3, a description will be given of a case where the Doppler shift amount is variably set for each radar observation, for example, in order to more reliably demultiplex a plurality of targets in the positioning outputs of radar apparatus 10. Note that the unit of the radar observation may be, for example, a transmission frame unit, or may be another unit.

For example, in Variation 3, Expression 5 may be used as phase rotation $\varphi_n(m)$ corresponding to Doppler shift amount $DOP_n$.

Radar apparatus 10 can variably set the interval of the Doppler shift amounts for each transmission antenna 105 by variably setting a value of δ in Expression 5 for each radar observation. δ may be varied periodically for each radar observation, for example, in order of 1, 2, 1, and 2.

Further, Expression 15 may be used as phase rotation $\varphi_n(m)$ corresponding to Doppler shift amount DOPE. For example, radar apparatus 10 can variably set the interval of the Doppler shift amounts for each transmission antenna 105 by setting components $dp_1$, $dp_2$, $dp_{Nt}$, which cause the phase rotations to have unequal intervals, to different values for respective radar observations.

According to Variation 3, the interval of the Doppler peaks corresponding to a plurality of transmission antennas 105 for a single target is different in each radar observation, and this makes it easier to demultiplex a plurality of targets.

(Variation 4)

In Variation 4, a description will be given of a case where the transmission antennas of the radar apparatus have a sub-array configuration.

Combining some of the transmission antennas and using as a sub array narrows the beam width of a transmission directivity beam pattern, thereby improving the transmission directivity gain. This increases a detectable distance range while reducing a detectable angular range. In addition, the beam direction can be variably controlled by varying a beam weight coefficient that generates a directional beam.

Figure 7:
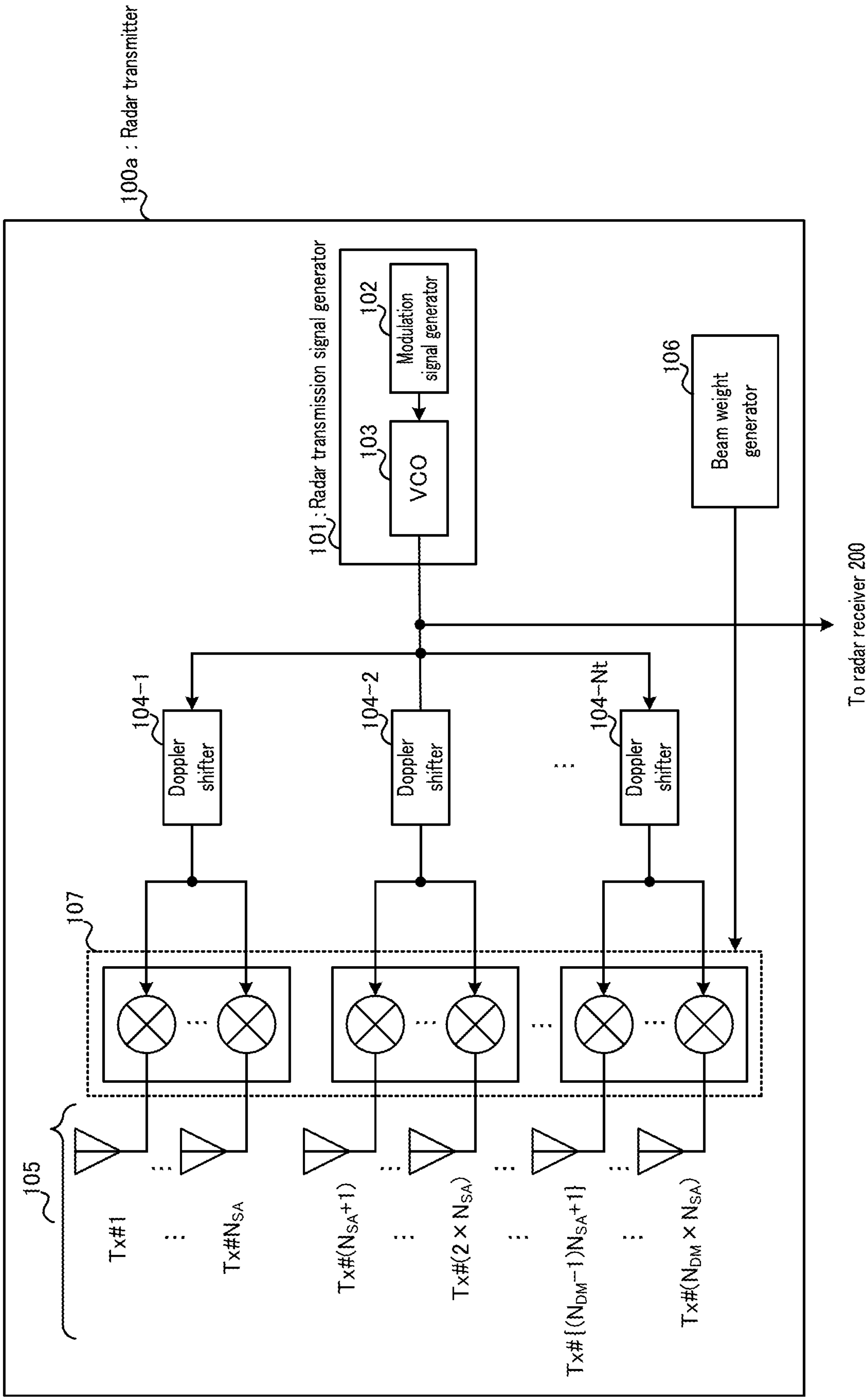
FIG. 7 is a block diagram illustrating an exemplary configuration of a radar transmitter according to Variation 4.

FIG. 7 is a block diagram illustrating an exemplary configuration of radar transmitter 100*a* according to Variation 4. Note that, in FIG. 7, components that operate in the same way as those in radar transmitter 100 in FIG. 1 are denoted by the same reference signs, and the descriptions thereof are omitted.

In addition, the radar receiver according to Variation 4 has the same basic configuration as that of radar receiver 200 illustrated in FIG. 1, and thus FIG. 1 will be used for the description.

In FIG. 7, $N_{DM}$ indicates the number of Doppler multiplexing.

In FIG. 7, a sub array with $N_{SA}$ transmission antennas 105 is configured for the output of each Doppler shifter 104. Number Nt of transmission antennas 105 is thus represented by $N_{SA} \times N_{DM}$. Note that the sub-array configuration of transmission antennas 105 is not limited to the example illustrated in FIG. 7. For example, the number of transmission antennas included in the sub array for the output of each Doppler shifter 104 need not be the same among Doppler shifters 104. Here, NSA is an integer greater than or equal to 1. Note that, when $N_{SA}=1$, the configuration will be the same as in FIG. 1. Note that Doppler shifter 104 applies the same Doppler shift amount to radar transmission signals transmitted from transmission antennas 105 with the sub-array configuration (e.g., NSA transmission antennas 105), for example.

In FIG. 7, beam weight generator 106 generates a beam weight that directs a main beam direction of a transmission beam in a predetermined direction using a sub array. For example, the transmission beam direction is represented as $\theta_{TxBF}$ in a case where the sub arrays each including $N_{SA}$ transmission antennas are linearly arranged at element spacings $d_{SA}$. In this case, beam weight generator 106 generates, for example, beam weight $W_{Tx}(\text{Index\_TxSubArray}, \theta_{TxBF})$ as given in the following expression.

[12]

(Expression 17)

$$W_{Tx}(\text{Index\_TxSubArray}, \theta_{TxBF}) = \begin{bmatrix} 1 \\ \exp\{j2\pi d \sin\theta_{TxBF}/\lambda\} \\ \vdots \\ \exp\left\{ \begin{matrix} j2\pi(\text{Index\_TxSubArray}-1) \\ d_{SA}\sin\theta_{TxBF}/\lambda \end{matrix} \right\} \end{bmatrix}$$

Here, Index_TxSubArray denotes an element index of the sub array, and Index_TxSubArray=1, . . . , $N_{SA}$. In addition, λ denotes the wavelength of a radar transmission signal, and $d_{SA}$ denotes a sub-array antenna spacing.

For example, the ndm-th beam weight multiplier 107 multiplies an output from the ndm-th Doppler shifter 104 by beam weight coefficient $W_{Tx}(\text{Index\_TxSubArray}, \theta_{TxBF})$ inputted from beam weight generator 106. The transmission signal multiplied by beam weight $W_{Tx}(\text{Index\_TxSubArray}, \theta_{TxBF})$ is transmitted from $\{N_{SA} \times (ndm-1) + \text{Index\_TxSubArray}\}$-th transmission antenna 105. Here, Index_TxSubArray=1, . . . , $N_{SA}$, and ndm=1, . . . , NSM.

The above operation allows radar transmitter 100*a* to perform transmission, for the output from Doppler shifter 104, with the transmission directional beam directed in a predetermined direction using the sub array. This improves the transmission directivity gain in the predetermined direction, thereby expanding the detectable distance range.

Further, radar transmitter 100*a* can variably control the beam direction by variably setting the beam weight coefficient that generates the transmission directional beam.

Note that the configuration for performing the sub-array transmission described in Variation 4 is applicable to another variation or embodiment in the same manner.

(Variation 5)

In Variation 5, a description will be given of a method of reducing the effect of interference from a plurality of radar apparatuses that use the same frequency band or that share a part of a frequency band, for example.

Figure 8:
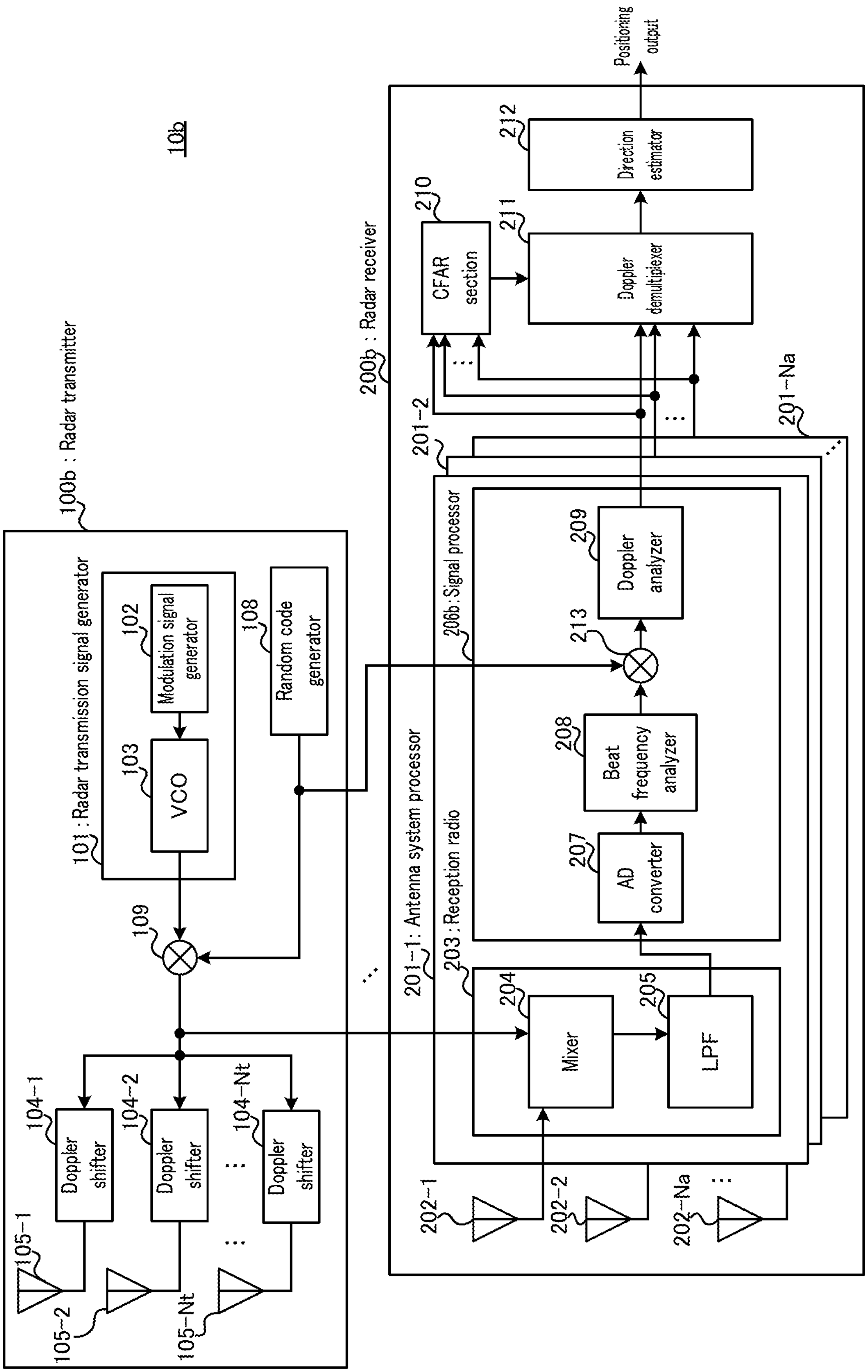
FIG. 8 is a block diagram illustrating an exemplary configuration of a radar apparatus according to Variation 5.

FIG. 8 is a block diagram illustrating an exemplary configuration of radar apparatus 10*b* according to Variation 5. Note that, in FIG. 8, the same components as in FIG. 1 are denoted by the same reference signs, and the descriptions thereof are omitted. For example, radar apparatus 10*b* illustrated in FIG. 8 has a configuration in which random code generator 108 and random code multiplier 109 are added in radar transmitter 100*b* and random code multiplier 213 is added in radar receiver 200*b*, in comparison with radar apparatus 10 illustrated in FIG. 1.

In FIG. 8, random code generator 108 generates, for example, pseudo-random code sequence RCode={RC(1), RC(2), . . . , RC($N_{LRC}$)}. For example, a pseudo random noise (PN) code, an M-sequence code, or a Gold code may be used as the pseudo-random code. In addition, Random code generator 108 generates a signal that applies, for example, phase rotations of {π, −π} to code elements {1, −1} of the pseudo-random code sequence.

Code length $N_{LRC}$ of the pseudo-random code sequence is less than or equal to $N_c$. Further, random code generator 108 varies code element indices of the pseudo-random code sequence for each transmission period m such that RC_INDEX(m)=m, and outputs random code element RC(RC_INDEX(m)) of pseudo-random code sequence RCode to random code multipliers 109 and 213.

Random code multiplier 109 of radar transmitter 100*b* multiplies chirp signal cp(t) in transmission period m by random code element RC(RC_INDEX) inputted from random code generator 108. Random code multiplier 109 outputs signals represented by RC(RC_INDEX(m))×cp(t) to Doppler shifters 104.

Random code multiplier 213 of radar receiver 200*b* multiplies the output signal $RFT_z(f_b, m)$ of beat frequency analyzer 208 in transmission period m by random code element RC (RC_INDEX) inputted from random code generator 108. Random code multiplier 213 outputs a signal represented by RC(RC_INDEX (m))×$RFT_z(f_b, m)$ to Doppler analyzer 209. Here, z=1, . . . , Na.

The above operation allows, in radar apparatus 10*b*, an interference signal to be converted to a pseudo-random signal by random code multiplier 213 before being inputted to Doppler analyzer 209, even in a case of being affected by the interference from a plurality of radar apparatuses that use the same frequency band or that share a part of a frequency band. This provides an effect of spreading signal power of the interference wave into Doppler frequency domain at the output of Doppler analyzer 209. For example, the multiplication by the pseudo-random code sequence reduces peak power of the interference wave to about $1/N_c$. This greatly reduces the probability of accidentally detecting a peak of the interference wave in the subsequent CFAR section 210.

(Variation 6)

For example, in a case of using the phase rotation given in Expression 5 as Doppler shift amount $DOP_n$, with respect to the intervals (ΔFD=round($N_C$/($N_{DM}$+δ)) obtained by equally dividing a Doppler frequency range by a number ($N_{DM}$+δ) greater than number $N_{DM}$ of Doppler multiplexing, the interval of ΔFD and the interval of (δ+1)ΔFD are used for the interval of Doppler shift amounts.

Thus, each of Doppler multiplexed signals is detected in the output of Doppler analyzer 209 (see, for example, FIG. 1) as aliased with the interval of ΔFD in the Doppler frequency domain.

Using such a characteristic, for example, the operations of CFAR section 210 and Doppler demultiplexer 211 can be simplified as follows.

[Operation of CFAR Section 210]

CFAR section 210, for example, detects a Doppler peak using a threshold for a power addition value obtained by adding the received power of reflected wave signals in ranges (e.g., ΔFD), within the Doppler frequency range subject to CFAR processing, respectively corresponding to the intervals of the Doppler shift amounts applied to radar transmission signals.

For example, CFAR section 210 performs the CFAR processing on the outputs from Doppler analyzers 209 of first to Na-th signal processors 206 by calculating a power addition value aliased in the range of ΔFD, as given in the following expression. Here, $f_{s\_shrink}=-N_c, \ldots, -N_c+\Delta FD-1$.

[13]

(Expression 18)

$$\mathrm{PowerFT\_shrink}(f_b, f_{s\_shrink}) = \sum_{ndm=1}^{N_{DM}+\delta} PowerFT(f_b, f_{s\_shrink} + ndm \times \Delta FD)$$

This sets the Doppler frequency range subject to the CFAR processing to 1/($N_{DM}$+δ), thereby reducing computational complexity of the CFAR processing.

CFAR section 210 adaptively sets a threshold and outputs, to Doppler demultiplexer 211, distance index $f_{b\_cfar}$ and Doppler frequency index $f_{shrink\_cfar}$ that provide received power greater than the threshold, and received power information (PowerFT($f_{b\_cfar}$, $f_{shrink\_cfar}$+ndm×ΔFD) where ndm=1, . . . , $N_{DM}$).

[Operation of Doppler Demultiplexer 211]

Doppler Demultiplexer 211 compares received power information (PowerFT($f_{b\_cfar}$, $f_{shrink\_cfar}$+ndm×ΔFD) where ndm=1, . . . , $N_{DM}$) inputted from CFAR section 210. In a case where there is a great difference (e.g., greater than a predetermined threshold) between reception levels of $N_{DM}$ Doppler frequency indices from the one with the highest received power and reception levels of δ Doppler frequency indices other than the highest $N_{DM}$, Doppler Demultiplexer 211 determines that the δ Doppler frequency indices with lower reception levels are included in the interval of (δ+1) ΔFD, and outputs the $N_{DM}$ Doppler frequency indices from the one with the highest received power as demultiplexing index information ($f_{demul\_Tx\ \#1}$, . . . , $f_{demul\_Tx\ \#NDM}$) of Doppler multiplexed signals.

In other words, in a case where there is a difference greater than or equal to a threshold between reception levels corresponding to $N_{DM}$ Doppler peaks from the one with the highest received power among Doppler peaks detected in a Doppler frequency range and reception levels corresponding to Doppler peaks other than the $N_{DM}$ Doppler peaks (for example, δ Doppler peaks), Doppler demultiplexer 211 demultiplexes Doppler multiplexed signals from reflected wave signals based on the $N_{DM}$ Doppler peaks. Note that the difference in the reception levels may be, for example, the difference between the average value of the $N_{DM}$ reception levels and the average value of the δ reception levels. Alternatively, the difference in the reception levels may be the difference between the minimum value in the $N_{DM}$ reception levels and the maximum value in the δ reception levels.

Besides the processing described above, Doppler multiplexed signals may be demultiplexed from reflected wave signals based on, for example, a relation between transmission antenna 105 and a Doppler shift amount applied to a radar transmission signal transmitted from transmission antenna 105. For example, demultiplexing index information of Doppler multiplexed signals may be determined using a relative position relation between Doppler frequency index information with the interval of (δ+1)ΔFD and $N_{DM}$ Doppler frequency indices from the one with the highest received power. For example, in FIG. 5, Doppler shift amounts are applied using the phase rotation given in Expression 5 where $N_{DM}$=3 and δ=1. Thus, the target Doppler frequency includes a Doppler interval of ΔFD and a Doppler interval of (δ+1)ΔFD. In the case of FIG. 5, it is known that the Doppler frequency indices with the Doppler interval of (δ+1)ΔFD are $f_{dermul\_Tx\ \#1}$ and $f_{demul\_Tx\ \#3}$, and Doppler demultiplexer 211 can use this to determine the demultiplexing index information of the Doppler multiplexed signals. That is, in a case where the Doppler interval of (δ+1)ΔFD is in a range of 0 to 1/(2T) in the output of Doppler analyzer 209, the higher one of the Doppler frequency indices with the Doppler interval of (δ+1)ΔFD is $f_{demul\_Tx\ \#1}$, and the lower one is $f_{demul\_Tx\ \#3}$. In a case where the Doppler interval of (δ+1)ΔFD is in a range of −1/(2T) to 0, the higher one of the Doppler frequency indices with the Doppler interval of (δ+1)ΔFD is $f_{demul\_Tx\ \#3}$, and the lower one is $f_{demul\_Tx\ \#1}$, considering that the Doppler frequency index of $f_{demul\_Tx\ \#3}$ is generated with aliasing. The remaining Doppler frequency index among the NDM Doppler frequency indices from the one with the highest received power is $f_{demul\_Tx\ \#2}$. Use of the above result allows Doppler demultiplexer 211 to determine Doppler shift amounts $DOP_n$ and to demultiplex the Doppler multiplexed signals.

As described above, Doppler demultiplexing is possible by the comparison processing of received power information $PowerFT(f_{b\_cfar}, f_{shrink\_cfar}+ndm\times\Delta FD)$ where ndm=1, . . . , $N_{DM}$ in Doppler demultiplexer 211, thereby reducing the Doppler demultiplexing processing.

Embodiment 2

In the present embodiment, a description will be given of a case where Doppler multiplexing transmission and code division multiplexing (CDM) transmission are used in combination.

For example, the increased number of Doppler multiplexing in Embodiment 1 (see, for example, FIG. 1) increases the probability of the presence of Doppler frequency indices for which the interval of Doppler shift amounts with aliasing and the interval of Doppler shift amounts without aliasing are overlapped with each other, in the processing of Doppler demultiplexer 211. Thus, the number of Doppler multiplexing has a suitable range depending on the propagation environment with many reflective objects, and there is an upper limit for the number of Doppler multiplexing.

With this regard, the present embodiment will provide a description of a configuration of using code multiplexing in combination with the configuration of performing Doppler multiplexing described in Embodiment 1. Such a configuration can increase the number of multiplexing by using Doppler domain and code domain even in a case where the number of transmission antennas (e.g., the number of Doppler multiplexing) is increased.

Figure 9:
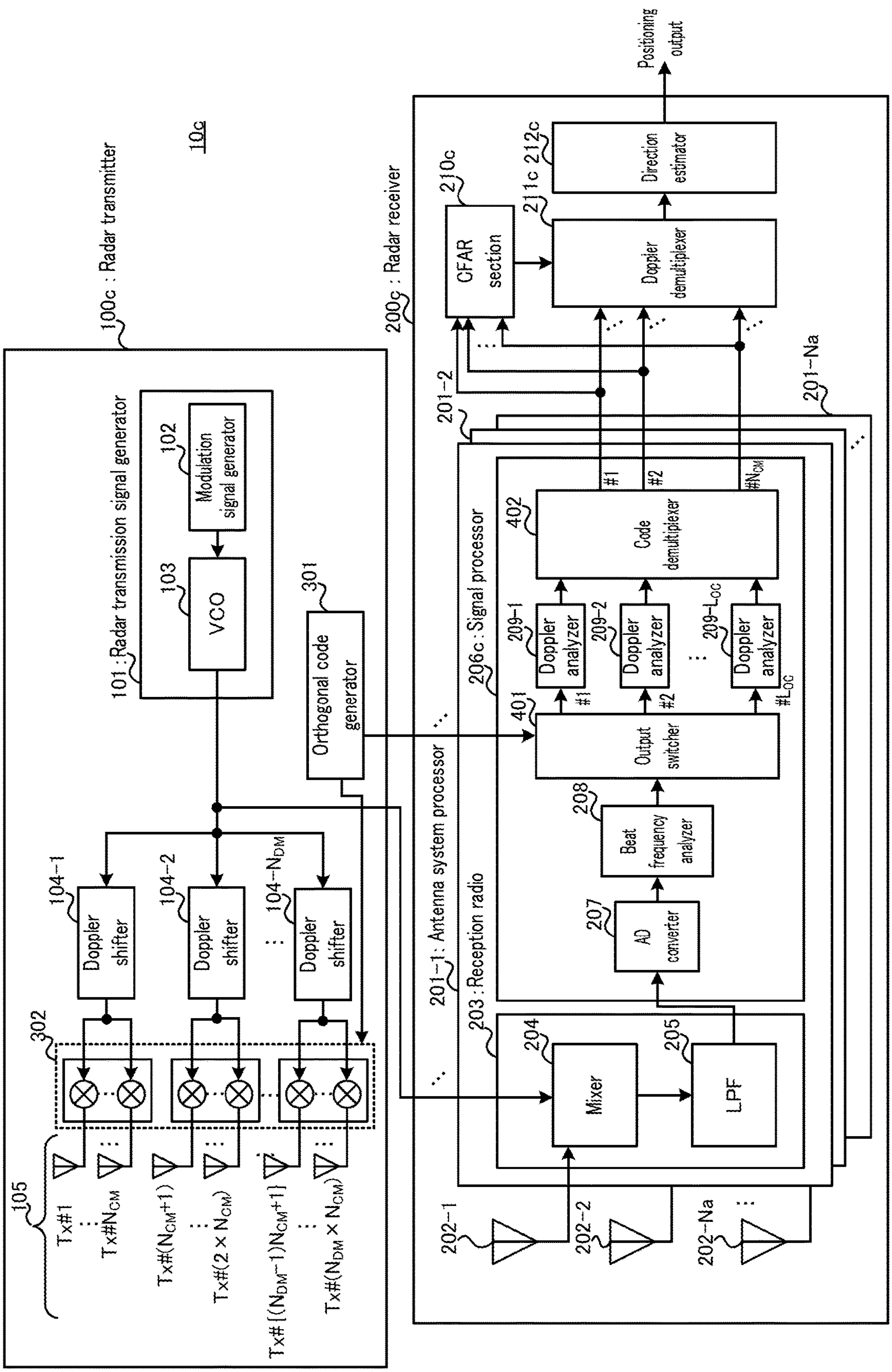
FIG. 9 is a block diagram illustrating an exemplary configuration of a radar apparatus according to Embodiment 2.

FIG. 9 is a block diagram illustrating an exemplary configuration of radar apparatus 10*c* according to the present embodiment. Note that, in FIG. 9, the same components as in Embodiment 1 (e.g., FIG. 1) are denoted by the same reference signs, and the descriptions thereof are omitted. For example, in radar apparatus 10*c* illustrated in FIG. 9, orthogonal code generator 301 and orthogonal code multipliers 302 are added in radar transmitter 100*c* and output switchers 401 and code demultiplexers 402 are added in radar receiver 200*c*, in comparison with radar apparatus 10 illustrated in FIG. 1.

In the following, the number of Doppler multiplexing is represented as $N_{DM}$ and the number of code multiplexing is represented as $N_{CM}$, and a description will be given of a case of using the number of Doppler multiplexing and the number of code multiplexing such that number Nt of transmission antennas 105=$N_{DM}\times N_{CM}$.

[Exemplary Configuration of Radar Transmitter 100*c*]

In radar transmitter 100*c*, orthogonal code generator 301 generates $N_{CM}$ orthogonal code sequences $Code_{ncm}$ with orthogonal code length $L_{oc}$. Orthogonal code sequences $Code_{ncm}$ are represented by $\{OC_{ncm}(1), OC_{ncm}(2), \ldots, OC_{ncm}(L_{oc})\}$. Here, ncm=1, . . . , $N_{CM}$.

For example, in each radar transmission period (Tr), orthogonal code generator 301 variably sets orthogonal code element index OC_INDEX indicating the elements of orthogonal code sequences $Code_1$ to $Code_{Ncm}$ cyclically and outputs elements $OC_1$(OC_INDEX) to $OC_{Ncm}$(OC_INDEX) of orthogonal code sequences $Code_1$ to $Code_{Ncm}$ to first to Nt-th orthogonal code multipliers 302. Further, orthogonal code generator 301 outputs orthogonal code element index OC_INDEX to output switcher 401 in each radar transmission period (Tr).

Here, OC_INDEX=1, 2, . . . , Loc. For example, OC_INDEX=MOD(m−1, $L_{oc}$)+1 in the m-th transmission period. Here, MOD(x, y) denotes a modulo operator and is a function that outputs the remainder after x is divided by y.

Further, the orthogonal code sequences generated in orthogonal code generator 301 are, for example, codes that are uncorrelated to one another. For example, Walsh-Hadamard codes may be used as the orthogonal code sequences.

By way of example, in a case where $N_{CM}$=2, orthogonal code length Loc of Walsh-Hadamard codes is 2, and orthogonal code generator 301 generates orthogonal code sequences represented by $OC_1$={1, 1} and $OC_2$={1, −1}.

As another example, in a case where $N_{CM}$=4, orthogonal code length Loc=4, and orthogonal code generator 301 generates orthogonal code sequences represented by $OC_1$={1, 1, 1, 1}, $OC_2$={1, −1, 1, −1}, $OC_3$={1, 1, −1, −1}, and $OC_4$={1, −1, −1, 1}.

Note that elements composing an orthogonal code sequence are not limited to real numbers. The code elements may include complex number values, and may be an orthogonal code using a phase rotation given by the following expression.

[14]

(Expression 19)

$$Code_{ncm} = \left\{1, \exp\left[j\frac{2\pi}{N_{CM}}(ncm-1)\right], \exp\left[j\frac{2\pi}{N_{CM}}2(ncm-1)\right],\right.$$

-continued $$\ldots, \exp\left[j\frac{2\pi}{N_{CM}}(N_{CM}-1)(ncm-1)\right]\Big\}$$

In Expression 19, in a case where Nt=3, for example, orthogonal code length Loc=Nt, and orthogonal code generator 301 generates orthogonal code sequences represented by $OC_1=\{1, 1, 1\}$, $OC_2=\{1, \exp(j2\pi/3), \exp(j4\pi/3)\}$, and $OC_3=\{1, \exp(-j2\pi/3), \exp(-j4\pi/3)\}$.

As another example, in a case where Nt=4, orthogonal code length Loc=Nt, and orthogonal code generator 301 generates orthogonal code sequences represented by $OC_1=\{1, 1, 1, 1\}$, $OC_2=\{1, j, -1, -j\}$, $OC_3=\{1, -1, 1, -1\}$, $OC_4=\{1, -j, -1, j\}$.

In a case where the number of Doppler multiplexing is $N_{DM}$, for example, radar transmitter 100*c* illustrated in FIG. 9 includes $N_{DM}$ Doppler shifters 104-1 to 104-$N_{DM}$. Radar transmitter 100*c* also includes $N_{DM}$, which is the same as the number of Doppler shifters 104, orthogonal code multipliers 302.

Doppler shifters 104 each apply predetermined phase rotation $\varphi_{ndm}$ to a chirp signal inputted from radar transmission signal generator 101 in order to apply predetermined Doppler shift amount $DOP_{ndm}$, and output the chirp signal with the phase rotation to the corresponding one of orthogonal code multipliers 302. Here, ndm=1, . . . , $N_{DM}$.

Each orthogonal code multiplier 302 includes multipliers the number of which corresponds to number $N_{CM}$ of code multiplexing. Orthogonal code multiplier 302 multiplies the output of Doppler shifter 104 by each of $N_{CM}$ orthogonal code sequences $Code_1$, $Code_2$, . . . , $Code_{Ncm}$, and outputs $N_{CM}$ signals to transmission antennas 105.

By the above-described operations of Doppler shifters 104 and orthogonal code multipliers 302, n-th transmission antenna 105 among Nt transmission antennas 105 outputs a signal obtained by applying Doppler shift $DOP_{floor[(n-1)/NCM]+1}$ to the output of radar transmission signal generator 101 by floor[(n−1)/$N_{CM}$]+1-th Doppler shifter 104 and further multiplying by mod(n−1, $N_{CM}$)+1-th orthogonal code $Code_{mod(n-1,\ NCM)+1}$ by floor[(n−1)/$N_{CM}$]+1-th orthogonal code multiplier 302.

A description will be given of a case where number Nt of transmission antennas 105 is 6, number $N_{DM}$ of Doppler multiplexing is 3, and number $N_{CM}$ of code multiplexing is 2, for example. In this case, 3 (=$N_{DM}$) Doppler shifters 104 respectively apply Doppler shift amounts $DOP_1$, $DOP_2$, and $DOP_3$ to chirp signals. Further, 3 (=$N_{DM}$) orthogonal code multipliers 302 each multiply the output of Doppler shifter 104 by 2 (=$N_{CM}$) orthogonal code sequences $Code_1$ and $Code_2$.

In this case, for example, first transmission antenna 105 outputs the following signals in each transmission period Tr.

[15]

$$OC_1(1)\Lambda_1(1)cp(t),OC_1(2)\Lambda_1(1)cp(t),OC_1(1)\Lambda_1(2)cp(t),OC_1(2)\Lambda_1(2)cp(t),\ OC_1(1)\Lambda_1(3)cp(t),OC_1(2)\Lambda_1(3)cp(t),\ \ldots \quad \text{(Expression 20)}$$

Here, cp(t) denotes a chirp signal in each transmission period Tr. A multiplication value in applying phase rotation $\varphi_{ndm}(m)$ in Doppler shifter 104 is represented by $\Lambda_{ndm}(m)$ given in the following expression.

[16]

$$\Lambda_{ndm}(m)=\exp[j\phi_{ndm}(m)] \quad \text{(Expression 21)}$$

Likewise, second transmission antenna 105 outputs the following signals in each transmission period Tr.

[17]

$$OC_2(1)\Lambda_1(1)cp(t),OC_2(2)\Lambda_1(1)cp(t),OC_2(1)\Lambda_1(2)cp(t),OC_2(2)\Lambda_1(2)cp(t),\ OC_2(1)\Lambda_1(3)cp(t),OC_2(2)\Lambda_1(3)cp(t),\ \ldots \quad \text{(Expression 22)}$$

Likewise, third transmission antenna 105 outputs the following signals in each transmission period Tr.

[18]

$$OC_1(1)\Lambda_2(1)cp(t),OC_1(2)\Lambda_2(1)cp(t),OC_1(1)\Lambda_2(2)cp(t),OC_1(2)\Lambda_2(2)cp(t),\ OC_1(1)\Lambda_2(3)cp(t),OC_1(2)\Lambda_2(3)cp(t),\ \ldots \quad \text{(Expression 23)}$$

Likewise, fourth transmission antenna 105 outputs the following signals in each transmission period Tr.

[19]

$$OC_2(1)\Lambda_2(1)cp(t),OC_2(2)\Lambda_2(1)cp(t),OC_2(1)\Lambda_2(2)cp(t),OC_2(2)\Lambda_2(2)cp(t),\ OC_2(1)\Lambda_2(3)cp(t),OC_2(2)\Lambda_2(3)cp(t),\ \ldots \quad \text{(Expression 24)}$$

Likewise, fifth transmission antenna 105 outputs the following signals in each transmission period Tr.

[20]

$$OC_1(1)\Lambda_3(1)cp(t),OC_1(2)\Lambda_3(1)cp(t),OC_1(1)\Lambda_3(2)cp(t),OC_1(2)\Lambda_3(2)cp(t),\ OC_1(1)\Lambda_3(3)cp(t),OC_1(2)\Lambda_3(3)cp(t),\ \ldots \quad \text{(Expression 25)}$$

Likewise, sixth transmission antenna 105 outputs the following signals in each transmission period Tr.

[21]

$$OC_2(1)\Lambda_3(1)cp(t),OC_2(2)\Lambda_3(1)cp(t),OC_2(1)\Lambda_3(2)cp(t),OC_2(2)\Lambda_3(2)cp(t),\ OC_2(1)\Lambda_3(3)cp(t),OC_2(2)\Lambda_3(3)cp(t),\ \ldots \quad \text{(Expression 26)}$$

In addition, radar transmitter 100*c* transmits signals so that the number of chirp pulse transmissions is an integer multiple (by a factor of Ncode) of orthogonal code length Loc. For example, $N_C=L_{OC}\times$Ncode.

Figure 10:
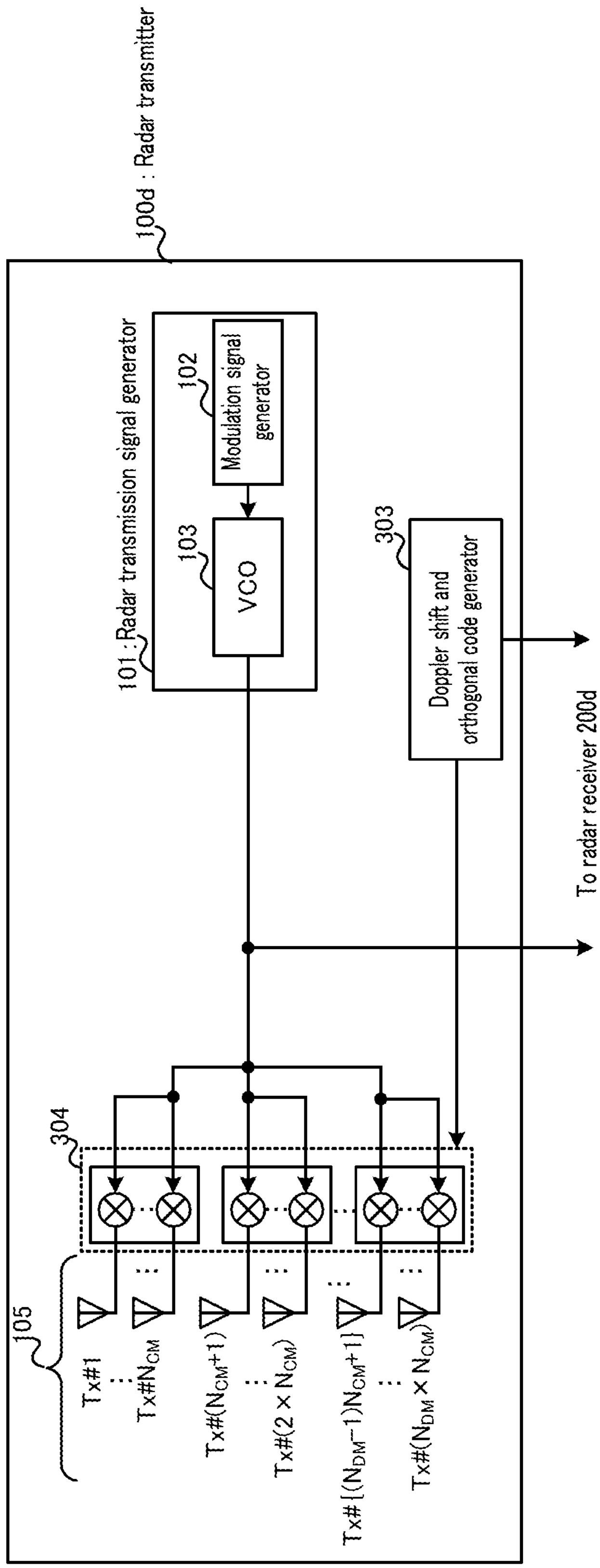
FIG. 10 is a block diagram illustrating another exemplary configuration of a radar transmitter according to Embodiment 2.

Note that the configuration of the radar transmitter in radar apparatus 10*c* is not limited to the configuration illustrated in FIG. 9, and the radar transmitter may have a configuration, as in radar transmitter 100*d* illustrated in FIG. 10, for example, of simultaneously performing the phase rotation application in Doppler shifters 104 and the code multiplication in orthogonal code multipliers 302 illustrated in FIG. 9. Note that radar receiver 200*d* illustrated in FIG. 10 has the same configuration as that of radar receiver 200*c* illustrated in FIG. 9.

For example, in FIG. 10, Doppler shift and orthogonal code generator 303 generates a multiplication factor that performs Doppler shift and orthogonal coding for each transmission period Tr. For example, Doppler shift and orthogonal code generator 303 outputs, to multiplier 304 connected to n-th transmission antenna among Nt transmission antennas 105, a multiplication factor obtained by multiplying a phase rotation to apply floor[(n−1)/$N_{CM}$]+1-th Doppler shift $DOP_{floor[(n-1)/NCM]+1}$ and mod(n−1, $N_{CM}$)+1-th orthogonal code $Code_{mod(n-1,\ NCM)+1}$.

Multiplier 304 multiplies an output signal (chirp signal) of radar transmission signal generator 101 by the multiplication factor inputted from Doppler shift and orthogonal code generator 303.

[Exemplary Configuration of Radar Receiver 200*c*]

Next, an exemplary configuration of radar receiver 200*c* illustrated in FIG. 9 will be described.

In z-th signal processor 206*c*, output switcher 401 selectively switches, based on orthogonal code element index OC_INDEX inputted from orthogonal code generator 301, to OC_INDEX-th Doppler analyzer 209 among Loc Doppler analyzers 209-1 to 209-Loc, and outputs the output of beat frequency analyzer 208 for each transmission period Tr. That is, output switcher 401 selects OC_INDEX-th Doppler analyzer 209 in m-th transmission period Tr.

Z-th signal processor 206*c* includes Loc Doppler analyzers 209.

Data is inputted to nol-th Doppler analyzer 209 in z-th signal processor 206*c* by output switcher 401 every Loc transmission periods ($L_{OC}$×Tr). Thus, nol-th Doppler analyzer 209 performs Doppler analysis using the data in Ncode transmission periods among Nc transmission periods. Here, nol=1, . . . , $L_{OC}$.

When Ncode is a power of 2, Doppler analyzer 209 can apply Fast Fourier Transform (FFT) processing given in the following expression.

[22]

$$VFT_z^{nol}(f_b, f_s) = \sum_{s=0}^{N_{code}-1} RFT_z(f_b, L_{OC} \times s + nol)\exp\left[-j\frac{2\pi s f_s}{N_{code}}\right] \quad \text{(Expression 27)}$$

Here, the FFT size is Ncode, and a maximum Doppler frequency that is derived from the sampling theorem and involves no aliasing is ±1/(2Loc×Tr). Further, the Doppler frequency interval of Doppler frequency indices $f_s$ is 1/(Ncode×Loc×Tr), and the range of Doppler frequency index $f_s$ is given by $f_s$=−Ncode/2, . . . , 0, . . . , Ncode/2−1.

Note that, when Ncode is not a power of 2, zero-padded data is included, for example, to allow FFT processing with the FFT size treated as a power of 2. In the FFT processing, Doppler analyzer 209 may perform multiplication by a window function coefficient such as the Han window or the Hamming window, and the application of a window function can suppress sidelobes generated around the beat frequency peak.

Code demultiplexer 402 demultiplexs signals that are multiplexed with the orthogonal codes and transmitted.

For example, as in the following expression, code demultiplexer 402 complex conjugates (denoted by *) orthogonal code elements $OC_{ncm}$ used at the time of transmission, multiplies by the Doppler analysis result for each orthogonal code element index OC_INDEX, and adds the resultant values. Accordingly, demultiplexed signals can be obtained from signals that are code-multiplexed with orthogonal code $Code_{ncm}$. Here, ncm=1, . . . , $N_{CM}$.

[23]

$$DeMUL_z^{ncm}(f_b, f_s) = \sum_{OC\_INDEX=1}^{Loc} OC_{ncm}^{*}(\text{OC\_INDEX}) VFT_z^{OC\_INDEX}(f_b, f_s) \exp\left(-j\frac{2\pi f_s}{N_{code}}\frac{\text{OC\_INDEX}-1}{Loc}\right) \quad \text{(Expression 28)}$$

CFAR section 210*c* performs CFAR processing (in other words, adaptive threshold determination) using the outputs of code demultiplexers 402, and extracts distance indices $f_{b\_cfar}$ and Doppler frequency indices $f_{s\_cfar}$ that provide peak signals.

CFAR section 210*c* performs power addition of the outputs of code demultiplexers 402, for example, as given by the following expression, so as to perform two-dimensional CFAR processing in two dimensions formed by the distance axis and the Doppler frequency axis (corresponding to the relative velocity) or CFAR processing using one-dimensional CFAR processing in combination. For example, processing disclosed in NPL 2 may be applied as the two-dimensional CFAR processing or the CFAR processing using one-dimensional CFAR processing in combination.

[24]

$$PowerFT(f_b, f_s) = \sum_{z=1}^{N_a}\sum_{ncm=1}^{N_{CM}} |DeMUL_z^{ncm}(f_b, f_s)|^2 \quad \text{(Expression 29)}$$

CFAR section 210*c* adaptively sets a threshold and outputs, to Doppler demultiplexer 211*c*, distance index $f_{b\_cfar}$ and Doppler frequency index $f_{s\_cfar}$ that provide received power greater than the threshold, and received power information PowerFT($f_{b\_cfar}$, $f_{s\_cfar}$).

Note that, in FIG. 9, CFAR section 210*c* has a configuration of using the outputs of code demultiplexers 402, but the configuration is not limited to this. As another configuration, CFAR section 210*c* may perform the CFAR processing using the outputs of Doppler analyzers 209. In this case, CFAR section 210*c* may perform power addition of the outputs of Doppler analyzers 209, for example, as given by the following expression, so as to perform two-dimensional CFAR processing in two dimensions formed by the distance axis and the Doppler frequency axis (corresponding to the relative velocity) or CFAR processing using one-dimensional CFAR processing in combination. For example, processing disclosed in NPL 2 may be applied as the two-dimensional CFAR processing or the CFAR processing using one-dimensional CFAR processing in combination.

[25]

$$PowerFT(f_b, f_s) = \sum_{z=1}^{N_a}\sum_{ncm=1}^{N_{CM}} \left|VFT_z^{nol}(f_b, f_s)\right|^2 \quad \text{(Expression 30)}$$

Further, in the case where CFAR section 210*c* performs the CFAR processing using the outputs of Doppler analyzers 209, code demultiplexer 402 may perform the code demultiplexing operation using the information indicated by CFAR section 210*c*, which are distance index $f_{b\_cfar}$ and Doppler frequency index $f_{s\_cfar}$ providing received power greater than a threshold, and received power information PowerFT ($f_{b\_cfar}$, $f_{s\_cfar}$). This allows a limited code demultiplexing operation for distance index $f_{b\_cfar}$ and Doppler frequency index $f_{s\_cfar}$ that are indicated by CFAR section 210*c* and provide received power greater than the threshold, thereby reducing computational complexity of code demultiplexer 402.

Doppler demultiplexer 211*c* demultiplexes the transmission signals transmitted from transmission antennas 105 using the outputs from code demultiplexers 402 based on the information inputted from CFAR section 210*c* (e.g., distance index $f_{b\_cfar}$, Doppler frequency index $f_{s\_cfar}$, and received power information PowerFT ($f_{b\_cfar}$, $f_{s\_cfar}$)).

In the following, the operation of Doppler demultiplexer 211$c$ will be described along with the operations of Doppler shifters 104.

First to $N_{DM}$-th Doppler shifters 104 respectively apply different Doppler shift amounts $DOP_1$, $DOP_2$, . . . , $DOP_{NDM}$ to inputted chirp signals. Here, as in Embodiment 1, intervals (Doppler shift intervals) of Doppler shift amounts $DOP_1$, $DOP_2$, . . . , $DOP_{NDM}$ are not the intervals obtained by equally dividing a Doppler frequency range in which no aliasing occurs, for example, but the intervals obtained by unequally dividing the Doppler frequency range (e.g., at least one Doppler interval is different). For example, the intervals of Doppler shift amounts $DOP_{ndm}$ may be set to the intervals obtained by dividing a Doppler frequency range (e.g., $-1/(2L_{oc}\times Tr)\leq f_d<1/(2L_{oc}\times Tr)$) by an integer value obtained by adding 1 or more (e.g., δ) to a value obtained by dividing number Nt of a plurality of transmission antennas 105 by number $N_{CM}$ of code multiplexing (in other words, number $N_{DM}$ of Doppler multiplexing).

Note that Embodiment 1 has provided a description of a case where the number of Doppler multiplexing is equal to number Nt of transmission antennas (that is, $Nt=N_{DM}$). Meanwhile, the code multiplexing is used in combination with the Doppler multiplexing in the present embodiment, and thus number $N_{DM}$ of Doppler multiplexing is less than number Nt of transmission antennas (for example, $Nt>N_{DM}$). Accordingly, the intervals of Doppler shift amounts $DOP_{ndm}$ may be set to the intervals obtained by dividing a Doppler frequency range in which no aliasing occurs (e.g., $-1/(2L_{oc}\times Tr)\leq f_d<1/(2L_{oc}\times Tr)$) by number Nt of transmission antennas 105 or less, for example.

Thus, in the present embodiment, Expression 5 or Expression 15 used in Embodiment 1 is used for Doppler shift amount $DOP_{ndm}$ by replacing Nt with $N_{DM}$. The same phase rotation $\varphi_{ndm}(m)$ is repeatedly outputted during the transmission period of orthogonal code length Loc ($L_{OC}\times Tr$) so that the phase rotations are the same in the transmission period ($L_{OC}\times Tr$) for multiplying orthogonal code sequences.

That is, ndm-th Doppler shifter 104 applies phase rotation $\varphi_{ndm}(m)$ given by the following expression to the inputted m-th chirp signal such that Doppler shift amounts $DOP_{ndm}$ are different from each other.

[26]

$$\phi_{ndm}(m) = \left\{A\frac{2\pi}{N_{code}}\,\mathrm{round}\left(\frac{N_{code}}{N_{DM}+\delta}\right)(ndm-1)+\Delta\phi_0\right\}\mathrm{floor}\left[\frac{m-1}{L_{oc}}\right]+\phi_0 \quad \text{(Expression 31)}$$

Here, A is a coefficient giving positive or negative polarity, which is 1 or −1. In addition, δ is a positive number greater than or equal to 1. Further, $\varphi_0$ is an initial phase and $\Delta\varphi_0$ is a reference Doppler shift phase. Note that round(x) is a round function that outputs a rounded integer value for real number x. Floor [x] is an operator that outputs the nearest integer less than or equal to the real number x. Note that the term round($Ncode/(N_{DM}+\delta)$) is introduced in order to set the phase rotation amount to an integer multiple of the Doppler frequency interval in Doppler analyzer 209.

As described above, number $N_{DM}$ of Doppler multiplexing is less than number Nt of transmission antennas in the present embodiment, while the description in Embodiment 1 is about the case where number $N_{DM}$ of Doppler multiplexing is equal to number Nt of transmission antennas. In Doppler demultiplexer 211$c$, parameter Nt used in Doppler demultiplexer 211 according to Embodiment 1 (see, for example, FIG. 1) is replaced with $N_{DM}$.

Further, while the FFT size in Doppler analyzer 209 (see, for example, FIG. 1) is $N_C$ in Embodiment 1, the FFT size is Ncode in the present embodiment. Accordingly, in Doppler demultiplexer 211$c$, parameter $N_C$ used in Doppler demultiplexer 211 according to Embodiment 1 is replaced with Ncode.

Furthermore, while the sampling period of the FFT in Doppler analyzer 209 is Tr in Embodiment 1, the sampling period is $L_{OC}\times Tr$ in the present embodiment. Accordingly, in Doppler demultiplexer 211$c$, parameter Tr used in Doppler demultiplexer 211 according to Embodiment 1 is replaced with $L_{OC}\times Tr$.

By way of example, in a case where phase rotation $\varphi_{ndm}(m)$ (e.g., Expression 31) is applied where $N_{DM}=2$, $\Delta\varphi_0=0$, $\varphi_0=0$, δ=1, and Ncode is a multiple of 3, Doppler shift amounts are represented by $DOP_1=0$ and $DOP_2=1/(3L_{OC}\times Tr)$ when A=1, and $DOP_1=0$ and $DOP_2=-1/(3L_{OC}\times Tr)$ when A=−1.

Doppler demultiplexer 211$c$ demultiplexes Doppler multiplexed signals using a peak (distance index $f_{b\_cfar}$ and Doppler frequency index $f_{s\_cfar}$) that is inputted from CFAR section 210$c$ and provides received power greater than a threshold.

For example, Doppler demultiplexer 211$c$ determines, for a plurality of Doppler frequency indices $f_{s\_cfar}$ with the same distance index $f_{b\_cfar}$, which of the Doppler multiplexed transmission signals #1 to #$N_{DM}$ the reflected wave signals each correspond to. Doppler demultiplexer 211$c$ demultiplexes and outputs the determined reflected wave signals respectively corresponding to the Doppler multiplexed transmission signals.

The following describes the operations in a case where there are a plurality (Ns) of Doppler frequency indices $f_{s\_cfar}$ with the same distance index $f_{b\_cfar}$. For example, $f_{s\_cfar}\in\{fd_{\#1}, fd_{\#2}, \ldots, fd_{\#Ns}\}$.

Doppler demultiplexer 211$c$ calculates Doppler index intervals, for example, for the plurality of Doppler frequency indices $f_{s\_cfar}\in\{fd_{\#1}, fd_{\#2}, \ldots, fd_{\#Ns}\}$ with the same distance index $f_{b\_cfar}$.

Here, $N_{DM}$ (where $N_{DM}<Nt$) Doppler peaks are generated, by Doppler shift amounts $DOP_{ndm}$, in a Doppler spectrum obtained by Doppler analysis of the Doppler analyzer for single target Doppler frequency $f_{d\_TargetDoppler}$. The Doppler index interval corresponding to the Doppler interval between the Doppler peaks is represented as round($Ncode/(N_{DM}+1)$) from the difference between phase rotation $\varphi_1(m)$ and phase rotation $\varphi_2(m)$ given in the following expression. In a case where an aliased signal is included, the Doppler index interval corresponding to the Doppler interval between the Doppler peaks is represented as $N_c$−round($Ncode/(N_{DM}+1)$).

[27]

$$\phi_2(m)-\phi_1(m) = A\frac{2\pi}{N_{code}}\,\mathrm{round}\left(\frac{N_{code}}{N_{DM}+1}\right) \quad \text{(Expression 32)}$$

Then, Doppler demultiplexer 211$c$ searches for the Doppler frequency indices that match index interval round($Ncode/(N_{DM}+1)$) corresponding to the interval of the Doppler shift amounts with no aliased signal included, or the Doppler frequency indices that match index interval $N_c$−round(Ncode/($N_{DM}$+1)) corresponding to the interval of the Doppler shift amounts with an aliased signal included.

Doppler demultiplexer 211$c$ performs the following processing based on the result of the search described above.

1. In a case where there are the Doppler frequency indices that match index interval round(Ncode/($N_{DM}$+1)) corresponding to the interval of the Doppler shift amounts with no aliased signal included, Doppler demultiplexer 211$c$ outputs a pair of the Doppler frequency indices (for example, represented as $fd_{\#p}$, $fd_{\#q}$) as demultiplexing index information ($f_{demul\_DS\ \#1}$, $f_{demul\_DS\ \#2}$) of Doppler multiplexed signals.

Here, when the Doppler shift amounts have a relationship where $DOP_1<DOP_2$, Doppler demultiplexer 211$c$ determines the higher one of $fd_{\#p}$ and $fd_{\#q}$ as the output of second Doppler shifter 104 (DS #2), and determines the lower one as the output of first Doppler shifter 104 (DS #1). Meanwhile, when the Doppler shift amounts have a relationship where $DOP_1>DOP_2$, Doppler demultiplexer 211$c$ determines the higher one of $fd_{\#p}$ and $fd_{\#q}$ as the output of first Doppler shifter 104 (DS #1), and determines the lower one as the output of second Doppler shifter 104 (DS #2).

2. In a case where there are the Doppler frequency indices that match index interval $N_c$−round(Ncode/($N_{DM}$+1)) corresponding to the interval of the Doppler shift amounts with an aliased signal included, Doppler demultiplexer 211$c$ outputs a pair of the Doppler frequency indices (e.g., $fd_{\#p}$, $fd_{\#q}$) as demultiplexing index information ($f_{demul\_DS\ \#1}$, $f_{demul\_DS\ \#2}$) of Doppler multiplexed signals.

Here, when the Doppler shift amounts have a relationship where $DOP_1<DOP_2$, Doppler demultiplexer 211$c$ determines the higher one of $fd_{\#p}$ and $fd_{\#q}$ as the output of first Doppler shifter 104 (DS #1), and determines the lower one as the output of second Doppler shifter 104 (DS #2). Meanwhile, when the Doppler shift amounts have a relationship where $DOP_1>DOP_2$, Doppler demultiplexer 211$c$ determines the higher one of $fd_{\#p}$ and $fd_{\#q}$ as the output of second Doppler shifter 104 (DS #2), and determines the lower one as the output of first Doppler shifter 104 (DS #1).

3. In a case where there are neither the Doppler frequency indices that match index interval round(Ncode/($N_{DM}$+1)) corresponding to the interval of the Doppler shift amounts with no aliased signal included nor the Doppler frequency indices that match index interval $N_c$−round(Ncode/($N_{DM}$+1)) corresponding to the interval of the Doppler shift amounts with an aliased signal included, Doppler demultiplexer 211$c$ determines that the generated Doppler peaks are noise components. In this case, Doppler demultiplexer 211$c$ need not output demultiplexing index information ($f_{demul\_DS\ \#1}$, $f_{demul\_DS\ \#2}$) of Doppler multiplexed signals.

4. In a case where there are the Doppler frequency indices that match index interval round(Ncode/($N_{DM}$+1)) corresponding to the interval of the Doppler shift amounts with no aliased signal included and that also match index interval $N_c$−round(Ncode/($N_{DM}$+1)) corresponding to the interval of the Doppler shift amounts with an aliased signal included, Doppler demultiplexer 211$c$ performs, for example, the following deduplication processing.

For example, the pair of the Doppler frequency indices that match index interval round(Ncode/($N_{DM}$+1)) corresponding to the interval of the Doppler shift amounts with no aliased signal included is represented as ($fd_{\#p}$, $fd_{\#q1}$). Meanwhile, the pair of the Doppler frequency indices that match index interval $N_c$−round(Ncode/($N_{DM}$+1)) corresponding to the interval of the Doppler shift amounts with an aliased signal included is represented as ($fd_{\#p}$, $fd_{\#q2}$).

Doppler demultiplexer 211$c$ calculates, for example, power difference $|\mathrm{PowerFT}(f_{b\_cfar}, fd_{\#q1})-\mathrm{PowerFT}(f_{b\_cfar}, fd_{\#p})|$ in the pair of Doppler frequency indices ($fd_{\#p}$,$fd_{\#q1}$) and power difference $|\mathrm{PowerFT}(f_{b\_cfar}, fd_{\#q2})-\mathrm{PowerFT}(f_{b\_cfar}, fd_{\#p})|$ in the pair of Doppler frequency indices ($fd_{\#p}$,$fd_{\#q2}$). When the power (in other words, difference) between the power differences is greater than predetermined power threshold TPL, Doppler demultiplexer 211$c$ adopts the pair with smaller power difference within the pair of the Doppler frequency indices.

For example, when the following expression is satisfied, Doppler demultiplexer 211$c$ adopts the pair of Doppler frequency indices ($fd_{\#p}$,$fd_{\#q2}$), and performs processing 2 described above.

$$|\mathrm{Power}FT(f_{b\_cfar}, fd_{\#q1})-\mathrm{Power}FT(f_{b\_cfar}, fd_{\#p})|-|\mathrm{Power}FT(f_{b\_cfar}, fd_{\#q2})-\mathrm{Power}FT(f_{b\_cfar}, fd_{\#p})|>TPL \qquad \text{(Expression 33)}$$

For example, when the following expression is satisfied, Doppler demultiplexer 211$c$ adopts the pair of Doppler frequency indices ($fd_{\#p}$,$fd_{\#q1}$), and performs processing 1 described above.

$$|\mathrm{Power}FT(f_{b\_cfar}, fd_{\#q2})-\mathrm{Power}FT(f_{b\_cfar}, fd_{\#p})|-|\mathrm{Power}FT(f_{b\_cfar}, fd_{\#q1})-\mathrm{Power}FT(f_{b\_cfar}, fd_{\#p})|>TPL \qquad \text{(Expression 34)}$$

When neither Expression 33 nor Expression 34 is satisfied, Doppler demultiplexer 211$c$ performs above-described processing 3 without adopting either pair of the Doppler frequency indices.

Doppler demultiplexer 211$c$ can demultiplex Doppler multiplexed signals in the above-described manner.

Note that, in the present embodiment, phase rotation $\varphi_{ndm}(m)$ given by the following expression may be used instead of the phase rotation given by Expression 31.

[28]

$$\phi_{ndm}(m) = \left\{A\frac{2\pi}{N_{code}}\operatorname{round}\left(\frac{N_{code}}{N_{DM}}\right)(ndm-1)+\Delta\phi_0\right\}\operatorname{floor}\left[\frac{m-1}{L_{oc}}\right]+dp_{ndm}+\phi_0 \qquad \text{(Expression 35)}$$

Here, $dp_{ndm}$ is a component that causes the phase rotations to have unequal intervals in the Doppler frequency range. For example, $dp_1, dp_2, \ldots, dp_{DM}$ are values in a range where $-\mathrm{round}(N_{code}/N_{DM})/2<dp_n<\mathrm{round}(N_{code}/N_{DM})/2$. Not all of them are identical values, and at least one of them includes a component of a different value. Note that the term round ($N_{code}/N_{DM}$) is introduced in order to set the phase rotation amount to an integer multiple of the Doppler frequency interval in Doppler analyzer 209.

The exemplary operations of Doppler demultiplexer 211$c$ have been described, thus far.

In FIG. 9, direction estimator 212$c$ performs target direction estimation processing based on the information inputted from Doppler demultiplexer 211$c$ (e.g., distance index $f_{b\_cfar}$ and demultiplexing index information ($f_{demul\_DS\ \#1}$, $f_{demul\_DS\ \#2}$, . . . , $f_{demul\_DS\ \#NDM}$)).

For example, direction estimator 212$c$ extracts the output corresponding to distance index $f_{b\_cfar}$ and demultiplexing index information ($f_{demul\_DS\ \#1}$, $f_{demul\_DS\ \#2}$, . . . , $f_{demul\_DS\ \#NDM}$) from the outputs of code demultiplexers 402, and generates virtual reception array correlation vector $h(f_{b\_cfar}, f_{demul\_DS\ \#1}, f_{demul\_DS\ \#2}, \ldots, f_{demul\_DS\ \#NDM})$ given by the following expression to perform the direction estimation processing.

Virtual reception array correlation vector $h(f_{b\_cfar}, f_{demul\_DS\ \#1}, f_{demul\_DS\ \#2}, \ldots, f_{demul\_DS\ \#NDM})$ includes Nt×Na elements, the number of which is the product of number Nt of transmission antennas and number Na of reception antennas. Virtual reception array correlation vector $h(f_{b\_cfar}, f_{demul\_DS\ \#1}, f_{demul\_DS\ \#2}, \ldots, f_{demul\_\ DS\ \#NDM})$ is used for processing of performing, on reflected wave signals from a target, direction estimation based on phase differences between reception antennas 202. Here, z=1, . . . , Na Note that the same method as in Embodiment 1, for example, may be applied as the direction estimation method.

[29]

$$h(f_{b\_cfar}, f_{demul\_DS\#1}, f_{demul\_DS\#2}, \ldots, f_{demul\_DS\#N_{DM}}) = \begin{bmatrix} h_{cal[1]}DeMUL_1^1(f_{b\_cfar}, f_{demul\_DS\#1}) \\ h_{cal[2]}DeMUL_2^1(f_{b\_cfar}, f_{demul\_DS\#1}) \\ \vdots \\ h_{cal[Na]}DeMUL_{Na}^1(f_{b\_cfar}, f_{demul\_DS\#1}) \\ \vdots \\ h_{cal[(N_{CM}-1)Na+1]}DeMUL_1^{N_{CM}}(f_{b\_cfar}, f_{demul\_DS\#1}) \\ h_{cal[(N_{CM}-1)Na+2]}DeMUL_2^{N_{CM}}(f_{b\_cfar}, f_{demul\_DS\#1}) \\ \vdots \\ h_{cal[N_{CM}Na]}DeMUL_{Na}^{N_{CM}}(f_{b\_cfar}, f_{demul\_DS\#1}) \\ h_{cal[N_{CM}Na+1]}DeMUL_1^1(f_{b\_cfar}, f_{demul\_DS\#2}) \\ h_{cal[N_{CM}Na+2]}DeMUL_2^2(f_{b\_cfar}, f_{demul\_DS\#2}) \\ \vdots \\ h_{cal[N_{DM}(N_{CM}-1)Na+1]}DeMUL_1^{N_{CM}}(f_{b\_cfar}, f_{demul\_DS\#N_{DM}}) \\ h_{cal[N_{DM}(N_{CM}-1)Na+2]}DeMUL_2^{N_{CM}}(f_{b\_cfar}, f_{demul\_DS\#N_{DM}}) \\ \vdots \\ h_{cal[N_{DM}N_{CM}Na]}DeMUL_{Na}^{N_{CM}}(f_{b\_cfar}, f_{demul\_DS\#N_{DM}}) \end{bmatrix} \quad \text{(Expression 36)}$$

In Expression 36, $h_{cal[b]}$ denotes an array correction value for correcting phase deviations and amplitude deviations in the transmission array antenna and in the reception array antenna. Here, b=1, . . . , (Nt×Na).

As described above, in the present embodiment, the configuration in which the Doppler multiplexing and the code multiplexing are used in combination increases the number of signals to be multiplexed and transmitted simultaneously in addition to producing the same effects as in Embodiment 1, thereby enabling adaptation to the MIMO array configuration with an increased number of transmission antennas.

Note that, in the above description, the number of Doppler multiplexing is represented as $N_{DM}$ and the number of code multiplexing is represented as $N_{CM}$, and the number of Doppler multiplexing and the number of code multiplexing are set such that number Nt of transmission antennas 105=$N_{DM}$×$N_{CM}$, but the present disclosure is not limited to this. For example, for $N_{DM}$ Doppler multiplexed signals, different numbers of code multiplexing may be used instead of using the same number of code multiplexing. For example, orthogonal code generator 301 may generate $N_{CM}$ orthogonal code sequences $Code_{ncm}$ with orthogonal code length $L_{oc}$, and orthogonal code multipliers 302 may each include multipliers the number of which is less than or equal to number $N_{CM}$ of code multiplexing. Orthogonal code multiplier 302 may be configured to multiply the outputs of Doppler shifter 104 by each of $N_{CM}$ or less orthogonal code sequences among $N_{CM}$ orthogonal code sequences $Code_1$, $Code_2$, . . . , $Code_{Ncm}$, and output $N_{CM}$ or less signals to transmission antennas 105.

For example, a description will be given of a case where number Nt of transmission antennas 105 is 5, number $N_{DM}$ of Doppler multiplexing is 3, and number $N_{CM}$ of code multiplexing is 2 or less. In this case, 3 (=$N_{DM}$) Doppler shifters 104 respectively apply Doppler shift amounts $DOP_1$, $DOP_2$, and $DOP_3$ to chirp signals. Further, 3 (=$N_{DM}$) orthogonal code multipliers 302 employ a configuration of multiplying the outputs of Doppler shifter 104-1 and Doppler shifter 104-2 by 2 (=$N_{CM}$) orthogonal code sequences $Code_1$ and $Code_2$ and multiplying the output of Doppler shifter 104-3 by 1 (≤$N_{CM}$) orthogonal code sequence $Code_1$. In other words, different numbers $N_{CM}$ of code multiplexing are applied to radar transmission signals transmitted from a plurality of transmission antennas 105. In this case, radar receiver 200*c* can demultiplex the transmission signals from 5 (=Nt) transmission antennas by the same processing described above (the processing in the case where number Nt of transmission antennas 105 is 6, number $N_{DM}$ of Doppler multiplexing is 3, and number $N_{CM}$ of code multiplexing is 2 for all) except that the code demultiplexing is unnecessary for the transmission signal obtained by multiplying the output of Doppler shifter 104-3 by orthogonal code sequence $Code_2$. As described above, using different numbers of code multiplexing for $N_{DM}$ Doppler multiplexed signals instead of the same number of code multiplexing extends the application range of the number of transmission antennas exceeding number $N_{DM}$ of Doppler multiplexing (in other words, the number of simultaneous multiplexed transmissions). For example, in a case where number $N_{DM}$ of Doppler multiplexing is 3 and number $N_{CM}$ of code multiplexing is 2 or less, number Nt of transmission antennas (in other words, the number of simultaneous multiplexed transmissions) can be in the range of 4, 5, and 6. More generally, number Nt of transmission antennas (in other words, the number of simultaneous multiplexed transmissions) in the range where $N_{DM}+1 \leq Nt \leq N_{DM} \times N_{CM}$ is applicable.

Further, orthogonal code multiplier 302 may be configured to multiply the output of at least one Doppler shifter 104 among the outputs of a plurality of Doppler shifters 104 by a single orthogonal code sequence among $N_{CM}$ orthogonal code sequences $Code_1, Code_2, \ldots, Code_{Ncm}$, and output the signal to transmission antenna 105. Radar receiver 200*c* can detect whether a Doppler aliased signal is included in the outputs of Doppler analyzers 209 by using such a configuration in which the transmission antenna outputs a signal obtained by not applying the code multiplexing to the output of at least one Doppler shifter 104 among the outputs of a plurality of Doppler shifters 104. That is, the maximum Doppler frequency that is derived from the sampling theorem by Doppler analyzer 209 and that involves no aliasing can be extended to ±1/(2×Tr) by using such a configuration in which the transmission antenna outputs a signal obtained by not applying the code multiplexing to the output of at least one Doppler shifter 104 among the outputs of a plurality of Doppler shifters 104, although the maximum Doppler frequency that is derived from the sampling theorem by Doppler analyzer 209 and that involves no aliasing is ±1/(2Loc×Tr), thereby achieving an effect of expanding the Doppler frequency range where detection can be performed without ambiguity.

Note that, in the case where the Doppler multiplexing and the code multiplexing are used in combination, the transmission signal may be multiplied by a pseudo-random code sequence as in Variation 5 of Embodiment 1. Code length NLRc of the pseudo-random code sequence may be set to less than or equal to Ncode, and random code element RC(RC_INDEX(m)) of pseudo-random code sequence RCode may be outputted with the random code element indices varied for each code multiplexing period such that $RC\_INDEX(m)=floor[(m-1)/N_{LOC}]+1$.

Embodiment 3

In the present embodiment, a description will be given of a case where Doppler multiplexing transmission and time division multiplexing (TDM) transmission are used in combination.

For example, the increased number of Doppler multiplexing in Embodiment 1 (see, for example, FIG. 1) increases the probability of the presence of Doppler frequency indices for which the interval of Doppler shift amounts with aliasing and the interval of Doppler shift amounts without aliasing are overlapped with each other, in the processing of Doppler demultiplexer 211. Thus, the number of Doppler multiplexing has a suitable range depending on the propagation environment with many reflective objects, and there is an upper limit for the number of Doppler multiplexing.

With this regard, the present embodiment will provide a description of a configuration of using time division multiplexing in combination with the configuration of performing Doppler multiplexing described in Embodiment 1. Such a configuration can increase the number of multiplexing by using Doppler domain and time domain even in a case where the number of transmission antennas (e.g., the number of Doppler multiplexing) is increased.

Figure 11:
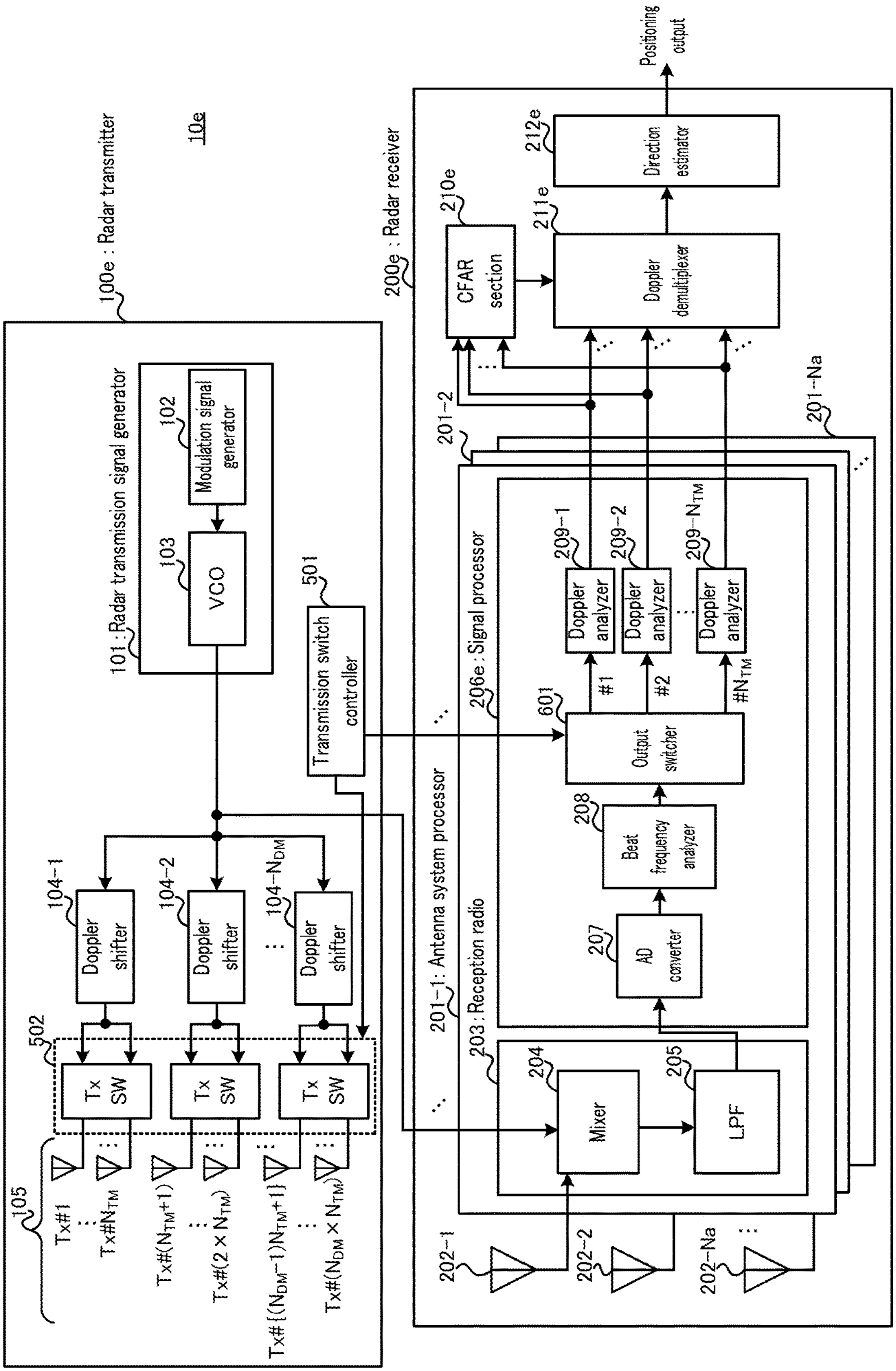
FIG. 11 is a block diagram illustrating an exemplary configuration of a radar apparatus according to Embodiment 3.

FIG. 11 is a block diagram illustrating an exemplary configuration of radar apparatus 10*e* according to the present embodiment. Note that, in FIG. 11, the same components as in Embodiment 1 (e.g., FIG. 1) are denoted by the same reference signs, and the descriptions thereof are omitted. For example, in radar apparatus 10*e* illustrated in FIG. 11, transmission switch controller 501 and transmission switchers 502 are added in radar transmitter 100*e* and output switchers 601 are added in radar receiver 200*e*, in comparison with radar apparatus 10 illustrated in FIG. 1.

In the following, the number of Doppler multiplexing is represented as $N_{DM}$ and the number of time division multiplexing is represented as $N_{TM}$, and a description will be given of a case of using the number of Doppler multiplexing and the number of time division multiplexing such that number Nt of transmission antennas $105=N_{DM} \times N_{TM}$.

[Exemplary Configuration of Radar Transmitter 100*e*]

Transmission switch controller 501 generates, for each radar transmission period (Tr), time division multiplexing index TM_INDEX, which is used in time multiplexing, for indicating the switch of transmission antennas 105, and outputs time division multiplexing index TM_INDEX to transmission switchers 502 and output switchers 601.

Here, TM_INDEX=1, 2, . . . , $N_{TM}$. For example, $TM\_INDEX=MOD(m-1, N_{TM})+1$ in the m-th transmission period. Here, MOD(x, y) denotes a modulo operator and is a function that outputs the remainder after x is divided by y.

In a case where the number of Doppler multiplexing is $N_{DM}$, for example, radar transmitter 100*e* illustrated in FIG. 11 includes NDM Doppler shifters 104-1 to 104-$N_{DM}$. Radar transmitter 100*e* also includes $N_{DM}$, which is the same as the number of Doppler shifters 104, transmission switchers 502.

Doppler shifters 104 each apply predetermined phase rotation $\varphi_{ndm}$ to a chirp signal inputted from radar transmission signal generator 101 in order to apply predetermined Doppler shift amount $DOP_{ndm}$, and output the chirp signal with the phase rotation to the corresponding one of transmission switchers 502. Here, ndm=1, . . . , $N_{DM}$.

According to the indication of time division multiplexing index TM_INDEX, ndm-th transmission switcher 502 switches to $\{(ndm-1)\times N_{TM}+TM\_INDEX\}$-th transmission antenna 105, and outputs the output of ndm-th Doppler shifter 104.

By the above-described operations of Doppler shifters 104 and transmission switchers 502, n-th transmission antenna 105 among Nt transmission antennas 105 outputs a signal obtained by applying Doppler shift $DOP_{floor[(n-1)/NTM]+1}$ to the output of radar transmission signal generator 101 by $floor[(n-1)/N_{TM}]+1$-th Doppler shifter 104 when time division multiplexing index TM_INDEX is $mod(n-1, N_{TM})+1$ by $floor[(n-1)/N_{TM}]+1$-th transmission switcher 502.

A description will be given of a case where number Nt of transmission antennas 105 is 6, number $N_{DM}$ of Doppler multiplexing is 3, and number $N_{TM}$ of time division multiplexing is 2, for example. In this case, 3 ($=N_{DM}$) Doppler shifters 104 respectively apply Doppler shift amounts $DOP_1$, $DOP_2$, and $DOP_3$ to chirp signals. In addition, time division multiplexing index TM_INDEX of each of 3 ($=N_{DM}$) transmission switchers 502 is composed of 2 ($=N_{TM}$) elements.

In this case, for example, first transmission antenna 105 outputs the following signals in each transmission period Tr.

[30]

$$\Lambda_1(1)cp(t),0,\Lambda_1(2)cp(t),0,\Lambda_1(3)cp(t),0,\ \ldots \qquad \text{(Expression 37)}$$

Here, cp(t) denotes a chirp signal in each transmission period Tr. A multiplication value in applying phase rotation $\varphi_{ndm}(m)$ in Doppler shifter 104 is represented by $\Lambda_{ndm}(m)$ given in the following expression, and is represented by 0 when there is no transmission signal.

[31]

$$\Lambda_{ndm}(m)=\exp[j\phi_{ndm}(m)] \quad \text{(Expression 38)}$$

Likewise, second transmission antenna 105, for example, outputs the following signals in each transmission period Tr.

[32]

$$0,\Lambda_1(1)cp(t),0,\Lambda_1(2)cp(t),0,\Lambda_1(3)cp(t), \ldots \quad \text{(Expression 39)}$$

Likewise, third transmission antenna 105, for example, outputs the following signals in each transmission period Tr.

[33]

$$\Lambda_2(1)cp(t),0,\Lambda_2(2)cp(t),0,\Lambda_2(3)cp(t),0, \ldots \quad \text{(Expression 40)}$$

Likewise, fourth transmission antenna 105, for example, outputs the following signals in each transmission period Tr.

[34]

$$0,\Lambda_2(1)cp(t),0,\Lambda_2(2)cp(t),0,\Lambda_2(3)cp(t), \ldots \quad \text{(Expression 41)}$$

Likewise, fifth transmission antenna 105, for example, outputs the following signals in each transmission period Tr.

[35]

$$\Lambda_3(1)cp(t),0,\Lambda_3(2)cp(t),0,\Lambda_3(3)cp(t),0, \ldots \quad \text{(Expression 42)}$$

Likewise, sixth transmission antenna 105, for example, outputs the following signals in each transmission period Tr.

[36]

$$0,\Lambda_3(1)cp(t),0,\Lambda_3(2)cp(t),0,\Lambda_3(3)cp(t), \ldots \quad \text{(Expression 43)}$$

In addition, radar transmitter 100*e* transmits signals so that the number of chirp pulse transmissions is an integer multiple (by a factor of Ncode) of $N_{TM}$. For example, $N_C=N_{TM}\times$Ncode.

[Exemplary Configuration of Radar Receiver 200*e*]

Next, an exemplary configuration of radar receiver 200*e* illustrated in FIG. 11 will be described.

In z-th signal processor 206*e*, output switcher 601 selectively switches, based on time division multiplexing index TM_INDEX inputted from transmission switch controller 501, to TM_INDEX-th Doppler analyzer 209 among $N_{TM}$ Doppler analyzers 209-1 to 209-$N_{TM}$, and outputs the output of beat frequency analyzer 208 for each transmission period Tr. That is, output switcher 601 selects TM_INDEX-th Doppler analyzer 209 in m-th transmission period Tr.

Z-th signal processor 206*e* includes $N_{TM}$ Doppler analyzers 209.

Data is inputted to ntm-th Doppler analyzer 209 in z-th signal processor 206*e* by output switcher 601 every $N_{TM}$ transmission periods ($N_{TM}\times$Tr). Thus, ntm-th Doppler analyzer 209 performs Doppler analysis using the data in Ncode transmission periods among $N_C$ transmission periods. Here, ntm=1, . . . , $N_{TM}$.

When Ncode is a power of 2, Doppler analyzer 209 can apply Fast Fourier Transform (FFT) processing given in the following expression.

[37]

$$VFT_z^{ntm}(f_b, f_s) = \sum_{s=0}^{N_{code}-1} RFT_z(f_b,\ N_{TM}\times s+ntm)\exp\left[-j\frac{2\pi s f_s}{N_{code}}\right] \quad \text{(Expression 44)}$$

Here, the FFT size is Ncode, and a maximum Doppler frequency that is derived from the sampling theorem and involves no aliasing is $\pm 1/(2N_{TM}\times Tr)$. Further, the Doppler frequency interval of Doppler frequency indices $f_s$ is $1/(\text{Ncode}\times N_{TM}\times Tr)$, and the range of Doppler frequency index $f_s$ is given by $f_s$=−Ncode/2, . . . , 0, . . . , Ncode/2−1.

Note that, when Ncode is not a power of 2, zero-padded data is included, for example, to allow FFT processing with the FFT size treated as a power of 2. In the FFT processing, a window function coefficient, such as the Han window or the Hamming window, may be multiplied, and the application of a window function can suppress sidelobes generated around the beat frequency peak.

CFAR section 210*e* performs CFAR processing (in other words, adaptive threshold determination) using the outputs of first to $N_{TM}$-th Doppler analyzers 209 in all signal processors 206*e*, and extracts distance indices $f_{b\_cfar}$ and Doppler frequency indices $f_{s\_cfar}$ that provide peak signals.

CFAR section 210*e* performs power addition of the outputs of Doppler analyzers 209, for example, as given by the following expression, so as to perform two-dimensional CFAR processing in two dimensions formed by the distance axis and the Doppler frequency axis (corresponding to the relative velocity) or CFAR processing using one-dimensional CFAR processing in combination. For example, processing disclosed in NPL 2 may be applied as the two-dimensional CFAR processing or the CFAR processing using one-dimensional CFAR processing in combination.

[38]

$$PowerFT(f_b, f_s) = \sum_{z=1}^{N_a}\sum_{ntm=1}^{N_{TM}} |VFT_z^{ntm}(f_b, f_s)|^2 \quad \text{(Expression 45)}$$

CFAR section 210*e* adaptively sets a threshold and outputs, to Doppler demultiplexer 211*e*, distance index $f_{b\_cfar}$ and Doppler frequency index $f_{s\_cfar}$ that provide received power greater than the threshold, and received power information PowerFT($f_{b\_cfar}$, $f_{s\_cfar}$).

Doppler demultiplexer 211*e* demultiplexes the transmission signals transmitted from transmission antennas 105 using the outputs from Doppler analyzers 209 based on the information inputted from CFAR section 210*e* (e.g., distance index $f_{b\_cfar}$, Doppler frequency index $f_{s\_cfar}$, and received power information PowerFT ($f_{b\_cfar}$, $f_{s\_cfar}$).

In the following, the operation of Doppler demultiplexer 211_e_ will be described along with the operations of Doppler shifters 104.

First to $N_{DM}$-th Doppler shifters 104 respectively apply different Doppler shift amounts $DOP_1$, $DOP_2$, . . . , $DOP_{NDM}$ to inputted chirp signals. Here, as in Embodiment 1, intervals (Doppler shift intervals) of Doppler shift amounts $DOP_1$, $DOP_2$, . . . , $DOP_{NDM}$ are not the intervals obtained by equally dividing a Doppler frequency range in which no aliasing occurs, for example, but the intervals obtained by unequally dividing the Doppler frequency range (e.g., at least one Doppler interval is different). For example, the intervals of Doppler shift amounts $DOP_{ndm}$ may be set to the intervals obtained by dividing a Doppler frequency range (e.g., $-1/(2N_{TM}\times Tr)\le f_d<1/(2N_{TM}\times Tr)$) by an integer value obtained by adding 1 or more (e.g., δ) to a value obtained by dividing number Nt of a plurality of transmission antennas 105 by number $N_{TM}$ of time division multiplexing (in other words, number $N_{DM}$ of Doppler multiplexing).

Note that Embodiment 1 has provided a description of a case where the number of Doppler multiplexing is equal to number Nt of transmission antennas (that is, $Nt=N_{DM}$). Meanwhile, the time division multiplexing is used in combination with the Doppler multiplexing in the present embodiment, and thus number $N_{DM}$ of Doppler multiplexing is less than number Nt of transmission antennas (for example, $Nt>N_{DM}$).

Thus, in the present embodiment, Expression 5 or Expression 15 used in Embodiment 1 is used for Doppler shift amount $DOP_{ndm}$ by replacing Nt with $N_{DM}$. The same phase rotation $\varphi_{ndm}(m)$ is repeatedly outputted during the transmission period in which the time division multiplexing is performed ($N_{TM}\times Tr$) so that the phase rotations are the same in the transmission period ($N_{TM}\times Tr$) in which the time division multiplexing is performed.

That is, ndm-th Doppler shifter 104 applies phase rotation $\varphi_{ndm}(m)$ given by the following expression to the inputted m-th chirp signal such that Doppler shift amounts $DOP_{ndm}$ are different from each other.

[39]

$$\phi_{ndm}(m) = \left\{A\frac{2\pi}{N_{code}}\text{round}\left(\frac{N_{code}}{N_{DM}+\delta}\right)(ndm-1)+\Delta\phi_0\right\}\text{floor}\left[\frac{m-1}{N_{TM}}\right]+\phi_0 \quad \text{(Expression 46)}$$

Here, A is a coefficient giving positive or negative polarity, which is 1 or −1. In addition, δ is a positive number greater than or equal to 1. Further, $\varphi_0$ is an initial phase and $\Delta\varphi_0$ is a reference Doppler shift phase. Note that round(x) is a round function that outputs a rounded integer value for real number x. Floor [x] is an operator that outputs the nearest integer less than or equal to the real number x. Note that the term round(Ncode/($N_{DM}$+δ)) is introduced in order to set the phase rotation amount to an integer multiple of the Doppler frequency interval in Doppler analyzer 209.

Alternatively, in the present embodiment, phase rotation $\varphi_{ndm}(m)$ given by the following expression may be used instead of the phase rotation given by Expression 46.

[40]

$$\phi_{ndm}(m) = \left\{A\frac{2\pi}{N_{code}}\text{round}\left(\frac{N_{code}}{N_{DM}}\right)(ndc-1)+\Delta\phi_0\right\}\text{floor}\left[\frac{m-1}{N_{TM}}\right]+dp_{ndm}+\phi_0 \quad \text{(Expression 47)}$$

Here, $dp_{ndm}$ is a component that causes the phase rotations to have unequal intervals. For example, $dp_1$, $dp_2$, . . . , $dp_{DM}$ are values in a range where $-\text{round}(N_{code}/N_{DM})/2<dp_n<\text{round}(N_{code}/N_{DM})/2$. Not all of them are identical values, and at least one of them includes a component of a different value. Note that the term round($N_{code}/N_{DM}$) is introduced in order to set the phase rotation amount to an integer multiple of the Doppler frequency interval in Doppler analyzer 209.

Note that the operation of Doppler demultiplexer 211_e_ according to the present embodiment is the same as the operation of Doppler demultiplexer 211_c_ (see, for example, FIG. 9) in Embodiment 2, in which the Doppler multiplexing and the code multiplexing are used in combination, replacing $L_{OC}$ with $N_{TM}$, and thus the description of the operation is omitted.

Doppler demultiplexer 211_e_ can demultiplex Doppler multiplexed signals in the above-described manner.

The exemplary operations of Doppler demultiplexer 211_e_ have been described, thus far.

In FIG. 11, direction estimator 212_e_ performs target direction estimation processing based on the information inputted from Doppler demultiplexer 211_e_ (e.g., distance index $f_{b\_cfar}$ and demultiplexing index information ($f_{demul\_DS\ \#1}$, $f_{demul\_DS\ \#2}$, . . . , $f_{demul\_DS\ \#NDM}$)).

For example, direction estimator 212_e_ extracts the output corresponding to distance index $f_{b\_cfar}$ and demultiplexing index information ($f_{demul\_DS\ \#1}$, $f_{demul\_DS\ \#2}$, . . . , $f_{demul\_DS\ \#NDM}$) from the outputs of Doppler analyzers 209, and generates virtual reception array correlation vector $h(f_{b\_cfar}, f_{demul\_DS\ \#1}, f_{demul\_DS\ \#2}, \ldots, f_{demul\_DS\ \#NDM})$ given by the following expression to perform the direction estimation processing.

Virtual reception array correlation vector $h(f_{b\_cfar}, f_{demul\_DS\ \#1}, f_{demul\_DS\ \#2}, \ldots, f_{demul\_DS\ \#NDM})$ includes Nt×Na elements, the number of which is the product of number Nt of transmission antennas and number Na of reception antennas. Virtual reception array correlation vector $h(f_{b\_cfar}, f_{demul\_DS\ \#1}, f_{demul\_DS\ \#2}, \ldots, f_{demul\_DS\ \#NDM})$ is used for processing of performing, on reflected wave signals from a target, direction estimation based on phase differences between reception antennas 202. Here, z=1, . . . , Na. Note that the same method as in Embodiment 1, for example, may be applied as the direction estimation method.

[41]

$$h(f_{b\_cfar}, f_{demul\_DS\#1}, f_{demul\_DS\#2}, \ldots, f_{demul\_DS\#N_{DM}}) = \begin{bmatrix} h_{cal[1]} VFT_1^1(f_{b\_cfar}, f_{demul\_DS\#1}) Txc^1(f_{demul\_DS\#1}) \\ h_{cal[2]} VFT_2^1(f_{b\_cfar}, f_{demul\_DS\#1}) Txc^1(f_{demul\_DS\#1}) \\ \vdots \\ h_{cal[Na]} VFT_{Na}^1(f_{b\_cfar}, f_{demul\_DS\#1}) Txc^1(f_{demul\_DS\#1}) \\ \vdots \\ h_{cal[(N_{TM}-1)Na+1]} VFT_1^{N_{TM}}(f_{b\_cfar}, f_{demul\_DS\#1}) Txc^{N_{TM}}(f_{demul\_DS\#1}) \\ h_{cal[(N_{TM}-1)Na+2]} VFT_2^{N_{TM}}(f_{b\_cfar}, f_{demul\_DS\#1}) Txc^{N_{TM}}(f_{demul\_DS\#1}) \\ \vdots \\ h_{cal[N_{TM}Na]} VFT_{Na}^{N_{TM}}(f_{b\_cfar}, f_{demul\_DS\#1}) Txc^{N_{TM}}(f_{demul\_DS\#1}) \\ h_{cal[N_{TM}Na+1]} VFT_1^1(f_{b\_cfar}, f_{demul\_DS\#2}) Txc^1(f_{demul\_DS\#2}) \\ h_{cal[N_{TM}Na+2]} VFT_2^2(f_{b\_cfar}, f_{demul\_DS\#2}) Txc^2(f_{demul\_DS\#2}) \\ \vdots \\ h_{cal[N_{DM}(N_{TM}-1)Na+1]} VFT_1^{N_{TM}}(f_{b\_cfar}, f_{demul\_DS\#N_{DM}}) Txc^{N_{TM}}(f_{demul\_DS\#N_{DM}}) \\ h_{cal[N_{DM}(N_{TM}-1)Na+2]} VFT_2^{N_{TM}}(f_{b\_cfar}, f_{demul\_DS\#N_{DM}}) Txc^{N_{TM}}(f_{demul\_DS\#N_{DM}}) \\ \vdots \\ h_{cal[N_{DM}N_{TM}Na]} VFT_{Na}^{N_{TM}}(f_{b\_cfar}, f_{demul\_DS\#N_{DM}}) Txc^{N_{TM}}(f_{demul\_DS\#N_{DM}}) \end{bmatrix} \quad \text{(Expression 48)}$$

In Expression 48, $h_{cal[b]}$ denotes an array correction value for correcting phase deviations and amplitude deviations in the transmission array antenna and in the reception array antenna. Here, b=1, . . . , (Nt×Na). Further, time-division switch of the transmission antennas causes different phase rotations depending on Doppler frequency index $f_s$, and $Txc^{ntm}(f_s)$ is a transmission phase correction coefficient that corrects the phase rotation to match the phase of the reference transmission antenna. For example, the following expression is applicable when the first time division multiplexing index (ntm=1) is used as the reference transmission antenna. Here, ntm=1, . . . , $N_{TM}$.

[42]

$$Txc^{ntm}(f_s) = \exp\left(-j\frac{2\pi f_s}{N_{code}}\frac{ntm-1}{N_{TM}}\right) \quad \text{(Expression 49)}$$

As described above, in the present embodiment, the configuration in which the Doppler multiplexing and the time division multiplexing are used in combination increases the number of signals to be multiplexed and transmitted simultaneously in addition to producing the same effects as in Embodiment 1, thereby enabling adaptation to the MIMO array configuration with an increased number of transmission antennas.

Note that, in the above description, the number of Doppler multiplexing is represented as $N_{DM}$ and the number of time division demultiplexing is represented as $N_{TM}$, and the number of Doppler multiplexing and the number of time division multiplexing are set such that number Nt of transmission antennas 105=$N_{DM}$×$N_{TM}$, but the present disclosure is not limited to this. For example, for $N_{DM}$ Doppler multiplexed signals, number $N_{TM}$ or less of time division multiplexing may be used instead of the same number of time division multiplexing.

For example, a description will be given of a case where number Nt of transmission antennas 105 is 5, number $N_{DM}$ of Doppler multiplexing is 3, and number $N_{TM}$ of time division multiplexing is 2. In this case, 3 (=$N_{DM}$) Doppler shifters 104 respectively apply Doppler shift amounts $DOP_1$, $DOP_2$, and $DOP_3$ to chirp signals. Further, 3 (=$N_{DM}$) transmission switchers 502 employ a configuration of outputting the outputs of Doppler shifter 104-1 and Doppler shifter 104-2 by switching 2 (=$N_{TM}$) transmission antennas and outputting the output of Doppler shifter 104-3 from 1 (≤$N_{TM}$) transmission antenna. In other words, different numbers $N_{TM}$ of time division multiplexing are applied to radar transmission signals transmitted from a plurality of transmission antennas 105. In this case, radar receiver 200*e* can demultiplex the transmission signals from 5 (=Nt) transmission antennas by the same processing described above (the processing in the case where number Nt of transmission antennas 105 is 6, number $N_{DM}$ of Doppler multiplexing is 3, and number $N_{TM}$ of time division multiplexing is 2 for all). As described above, using number $N_{TM}$ or less of time division multiplexing for $N_{DM}$ Doppler multiplexed signals instead of the same number of time division multiplexing extends the application range of the number of transmission antennas exceeding number $N_{DM}$ of Doppler multiplexing (in other words, the number of simultaneous multiplexed transmissions). For example, in a case where number $N_{DM}$ of Doppler multiplexing is 3 and number $N_{TM}$ of time division multiplexing is 2 or less, number Nt of transmission antennas (in other words, the number of simultaneous multiplexed transmissions) can be in the range of 4, 5, and 6. More generally, number Nt of transmission antennas (in other words, the number of simultaneous multiplexed transmissions) in the range where $N_{DM}+1 \le Nt \le N_{DM} \times N_{TM}$ is applicable.

Further, a configuration may be used in which the output of at least one Doppler shifter 104 among the outputs of a plurality of Doppler shifters 104 is outputted to transmission antenna 105 without using transmission switcher 502. Radar receiver 200*e* can detect whether a Doppler aliased signal is included in the outputs of Doppler analyzers 209 by using such a configuration in which the transmission antenna outputs a signal obtained by not applying the time division multiplexing to the output of at least one Doppler shifter 104 among the outputs of a plurality of Doppler shifters 104. That is, the maximum Doppler frequency that is derived from the sampling theorem by Doppler analyzer 209 and that involves no aliasing can be extended to ±1/(2×Tr) by using such a configuration in which the transmission antenna outputs a signal obtained by not applying the time division multiplexing to the output of at least one Doppler shifter 104 among the outputs of a plurality of Doppler shifters 104, although the maximum Doppler frequency that is derived from the sampling theorem by Doppler analyzer 209 and that involves no aliasing is $\pm 1/(2N_{TM}\times Tr)$, thereby achieving an effect of expanding the Doppler frequency range where detection can be performed without ambiguity.

Note that, in the case where the Doppler multiplexing and the time division multiplexing are used in combination, the transmission signal may be multiplied by a pseudo-random code sequence as in Variation 5 of Embodiment 1. Code length $N_{LRC}$ of the pseudo-random code sequence may be set to less than or equal to Ncode, and random code element RC(RC_INDEX(m)) of pseudo-random code sequence RCode may be outputted with the random code element indices varied for each time division period such that $RC\_INDEX(m)=floor[(m-1)/N_{TM}]+1$.

Exemplary embodiments according to the present disclosure have been described, thus far.

Other Embodiments (Variation 7)

In Variation 7, for example, a radar apparatus variably sets the interval of Doppler shift amounts for each transmission period, and changes the assignment of Doppler multiplexing for transmission antennas.

Note that the radar apparatus according to Variation 7 has the same basic configuration as that of radar apparatus 10 illustrated in FIG. 1, and thus FIG. 1 will be used for the description. For example, in Variation 7, the operations of Doppler shifters 104, Doppler analyzers 209, CFAR section 210, and Doppler demultiplexer 211 in radar apparatus 10 illustrated in FIG. 1 are different from those in Embodiment 1.

For example, in Doppler multiplexing, Doppler demultiplexer 211 possibly fails to perform demultiplexing determination in a case where the reception levels of Doppler peaks of a plurality of targets are approximately equal and an interval of the Doppler peaks matches an interval of Doppler shift amounts.

For example, in Variation 3, the description has been given of the case where the Doppler shift amount is variably set for each radar observation in order to more reliably demultiplex a plurality of targets in the positioning outputs of radar apparatus 10.

In Variation 7, a description will be given of a case where the interval of Doppler shift amounts is variably set for each transmission period in order to more reliably demultiplex a plurality of targets in the positioning outputs of radar apparatus 10. According to Variation 7, the intervals of the Doppler peaks corresponding to a plurality of transmission antennas 105 for a single target are different in each transmission period, and this makes it easier for radar apparatus 10 to demultiplex a plurality of targets in a single radar observation.

In the following, exemplary methods of setting Doppler shift amounts applied in Doppler shifters 104 according to Variation 7 will be described.

Doppler shifters 104-1 to 104-Nt apply different Doppler shift amounts $DOP_n$ to chirp signals inputted to respective Doppler shifters. Here, n=1, . . . , Nt.

Further, Doppler shifters 104-1 to 104-Nt variably set Doppler shift amounts $DOP_n$ for each transmission period Tr. For example, Doppler shifters 104-1 to 104-Nt respectively set Doppler shift amounts $DOP_n^{odd}$ for each odd-numbered transmission period Tr and Doppler shift amounts $DOP_n^{even}$ for each even-numbered Tr.

For example, n-th Doppler shifter 104 applies, to the inputted m-th chirp signal, phase rotation amount $\varphi_n(m)$ corresponding to Doppler shift amount $DOP_n^{odd}$ for each odd-numbered transmission period Tr and phase rotation amount $\varphi_n(m)$ corresponding to Doppler shift amount $DOP_n^{even}$ for each even-numbered transmission period Tr, according to the following expressions.

[43]

$$\begin{cases} \phi_n(m) = \left\{A\frac{2\pi}{N_c}\mathrm{round}\left(\frac{N_c}{Nt+\delta_{odd}}\right)(n-1)+\Delta\phi_0\right\}\mathrm{floor}\left[\frac{m-1}{2}\right]+\phi_0, & \text{(where } m \text{ is an odd number)} \\ \phi_n(m) = \left\{A\frac{2\pi}{N_c}\mathrm{round}\left(\frac{N_c}{Nt+\delta_{even}}\right)(n-1)+\Delta\phi_0\right\}\mathrm{floor}\left[\frac{m-1}{2}\right]+\phi_0, & \text{(where } m \text{ is an even number)} \end{cases} \quad \text{(Expressions 50)}$$

Here, $\delta_{odd}$ and $\delta_{even}$ are positive numbers equal to or greater than 1, and set to different values from each other. The setting of $\delta_{odd}$ and $\delta_{even}$ causes Doppler shift amount $DOP_n^{odd}$ for each odd-numbered transmission period Tr and Doppler shift amount $DOP_n^{even}$ for each even-numbered transmission period Tr to be different from each other. In other words, the interval of the Doppler shift amounts is variably set for each transmission period Tr.

Note that phase rotation amounts $\varphi_n$ are not limited to the values given by Expressions 50, and may be the phase rotations that cause the interval of Doppler shift amounts $DOP_n^{odd}$ and the interval of Doppler shift amounts $DOP_n^{even}$ to be different from each other.

When Doppler shifter 104 applies the phase rotation amount to a radar transmission signal (e.g., chirp signal), spurious occurs in the Doppler domain in a case where the phase rotation error is included. Here, for example, the spurious level equal to or less than about −20 dB compared to the Doppler peak level does not significantly degrade the radar detection performance in radar apparatus 10. Thus, the phase rotation error may be included in the phase rotation as long as the phase rotation error is within a range where the spurious level is less than or equal to about −20 dB compared to the Doppler peak (e.g., in a range of about 5° to 10°). Note that another embodiment (or variation) may also include the phase rotation error within a range where the spurious level is less than or equal to about −20 dB compared to the Doppler peak (e.g., in a range of about 5° to 10°).

In FIG. 1, Doppler analyzer 209 performs Doppler analysis for each distance index $f_b$ using beat frequency responses $RFT_z(f_b, \mathbf{1})$, $RFT_z(f_b, \mathbf{2})$, . . . , $RFT_z(f_b, N_C)$, which are obtained from $N_C$ times of chirp pulse transmissions and outputted from beat frequency analyzer 208.

In Variation 7, phase rotation $\varphi_n$ is applied to the radar transmission signal (e.g., chirp signal) such that the Doppler shift amount for each odd-numbered transmission period Tr and Doppler shift amount for each even-numbered transmission period Tr are different from each other. Accordingly, Doppler analyzer 209 performs the Doppler analysis for each distance index $f_b$ using, for example, a beat frequency response for each odd-numbered transmission period Tr. Likewise, Doppler analyzer 209 performs the Doppler analysis for each distance index $f_b$ using, for example, a beat frequency response for each even-numbered transmission period Tr.

For example, when $N_c$ is a power of 2, FFT processing is applicable in the Doppler analysis. In this case, the FFT size is $N_c/2$, Doppler analyzer 209 performs the FFT processing based on the data obtained every odd-numbered or even-numbered transmission period Tr (in other words, every 2Tr). Thus, a maximum Doppler frequency that is derived from the sampling theorem and involves no aliasing is ±1/(4Tr). Further, the Doppler frequency interval of Doppler frequency indices $f_s$ is $1/(N_c \times Tr)$, and the range of Doppler frequency index $f_s$ is given by $f_s=-N_c/4, \ldots, 0, \ldots, N_c/4-1$.

A description will be given below of a case where $N_c$ is a power of 2, as an example. Note that, when $N_c$ is not a power of 2, zero-padded data is included, for example, to allow FFT processing treating the data size as a power of 2. In the FFT processing, Doppler analyzer 209 may perform multiplication by a window function coefficient such as the Han window or the Hamming window. The application of a window function can suppress sidelobes generated around the beat frequency peak.

For example, the following expressions represent output $VFT_z^{odd}(f_b, f_s)$ of Doppler analyzer 209 for the beat frequency response for each odd-numbered transmission period Tr and output $VFT_z^{even}(f_b, f_s)$ of Doppler analyzer 209 for the beat frequency response for each even-numbered transmission period Tr, in z-th signal processor 206. Note that j is the imaginary unit and z=1 to Na.

[44]

$$\begin{cases} VFT_z^{odd}(f_b, f_s) = \\ \sum_{q=0}^{N_c/2-1} RFT_z(f_b, 2q+1)\exp\left[-j\frac{2\pi q f_s}{(N_c/2)}\right], \\ \text{(where } m \text{ is an odd number)} \\ VFT_z^{even}(f_b, f_s) = \\ \sum_{q=0}^{N_c/2-1} RFT_z(f_b, 2q+2)\exp\left[-j\frac{2\pi q f_s}{(N_c/2)}\right], \\ \text{(where } m \text{ is an even number)} \end{cases} \quad \text{(Expressions 51)}$$

CFAR section 210 performs CFAR processing (in other words, adaptive threshold determination) using the outputs of Doppler analyzers 209 in first to Na-th signal processors 206, and extracts distance indices $f_{b\_cfar}$ and Doppler frequency indices $f_{s\_cfar}$ that provide peak signals.

CFAR section 210 according to Variation 7 adaptively sets a threshold by performing, for example, the CFAR processing on output $VFT_z^{odd}(f_b, f_s)$ of Doppler analyzer 209 for the beat frequency response for each odd-numbered transmission period Tr, and outputs, to Doppler demultiplexer 211, distance index $f_{b\_cfar}^{odd}$ and Doppler frequency index $f_{s\_cfar}^{odd}$ that provide received power greater than the threshold, and received power information $PowerFT^{odd}(f_{b\_cfar}^{odd}, f_{s\_cfar}^{odd})$.

CFAR section 210 according to Variation 7 also adaptively sets a threshold by performing, for example, the CFAR processing on output $VFT_z^{even}(f_b, f_s)$ of Doppler analyzer 209 for the beat frequency response for each even-numbered transmission period Tr, and outputs, to Doppler demultiplexer 211, distance index $f_{b\_cfar}^{even}$ and Doppler frequency index $f_{s\_cfar}^{even}$ that provide received power greater than the threshold, and received power information $PowerFT^{even}(f_{b\_cfar}^{even}, f_{s\_cfar}^{even})$.

Doppler demultiplexer 211 performs demultiplexing processing using the outputs of Doppler analyzers 209 based on the information inputted from CFAR section 210 (e.g., distance index $f_{b\_cfar}^{odd}$, Doppler frequency index $f_{s\_cfar}^{odd}$, and received power information $PowerFT^{odd}(f_{b\_cfar}^{odd}, f_{s\_cfar}^{odd})$ for the beat frequency response for each odd-numbered transmission period Tr, and distance index $f_{b\_cfar}^{even}$, Doppler frequency index $f_{s\_cfar}^{even}$, and received power information $PowerFT^{even}(f_{b\_cfar}^{even}, f_{s\_cfar}^{even})$ for the beat frequency response for each even-numbered transmission period Tr). The demultiplexing processing is performed in order to demultiplex the transmission signals (in other words, the reflected wave signals for the transmission signals) transmitted from respective transmission antennas 105 from signals transmitted with Doppler multiplexing (hereinafter, referred to as Doppler multiplexed signals).

Doppler demultiplexer 211 outputs, for example, information on the demultiplexed signals to direction estimator 212. The information on the demultiplexed signals may include, for example, distance indices $f_{b\_cfar}$ and Doppler frequency indices, which are sometimes referred to as demultiplexing index information, $(f_{demul\_Tx\ \#1}, f_{demul\_Tx\ \#2}, \ldots, f_{demul\_Tx\ \#Nt})$ corresponding to the demultiplexed signals. In addition, Doppler demultiplexer 211 outputs the outputs of respective Doppler analyzers 209 to direction estimator 212.

By way of example, in a case where Nt=3, $\Delta\varphi_0=0$, $\varphi_0=0$, A=1, $\delta_{odd}=1$, $\delta_{even}=2$, and $N_C$ is a multiple of 4 in Expressions 50, phase rotation amounts $\varphi_n(m)$ given by the following expressions are applied to the radar transmission signals.

[45]

$$\{\phi_1(1), \phi_1(2), \ldots, \phi_1(22), \ldots\} = \{0, 0, 0, 0, 0, 0, 0, 0, 0, 0, 0, 0, 0, 0, 0, 0, 0, 0, 0, 0, 0, 0, \ldots\} \quad \text{(Expression 52)}$$

[46]

$$\{\phi_2(1), \phi_2(2), \ldots, \phi_2(22), \ldots\} = \left\{0, 0, \frac{\pi}{2}, \frac{2\pi}{5}, \pi, \frac{4\pi}{5}, \frac{3\pi}{2}, \frac{6\pi}{5}, 0, \frac{8\pi}{5}, \frac{\pi}{2}, 0, \pi, \frac{2\pi}{5}, \frac{3\pi}{2}, \frac{4\pi}{5}, 0, \frac{6\pi}{5}, \frac{\pi}{2}, \frac{8\pi}{5}, \pi, 0, \ldots\right\} \quad \text{(Expression 53)}$$

[47]

$$\{\phi_3(1), \phi_3(2), \ldots, \phi_3(22), \ldots\} = \left\{0, 0, \pi, \frac{4\pi}{5}, 0, \frac{8\pi}{5}, \pi, \frac{2\pi}{5}, 0, \frac{6\pi}{5}, \pi, 0, 0, \frac{4\pi}{5}, \pi, \frac{8\pi}{5}, 0, \frac{2\pi}{5}, \pi, \frac{6\pi}{5}, \ldots\right\} \quad \text{(Expression 54)}$$

Further, in a case where Doppler analyzer 209 performs the FFT processing given by Expressions 51, the Doppler shift amounts are represented by $DOP_1^{odd}=0$, $DOP_1^{even}=0$, $DOP_2^{odd}=1/(8Tr)$, $DOP_2^{even}=1/(10Tr)$, $DOP_3^{odd}=1/(4Tr)$, and $DOP_3^{even}=1/(5Tr)$.

Figure 12:
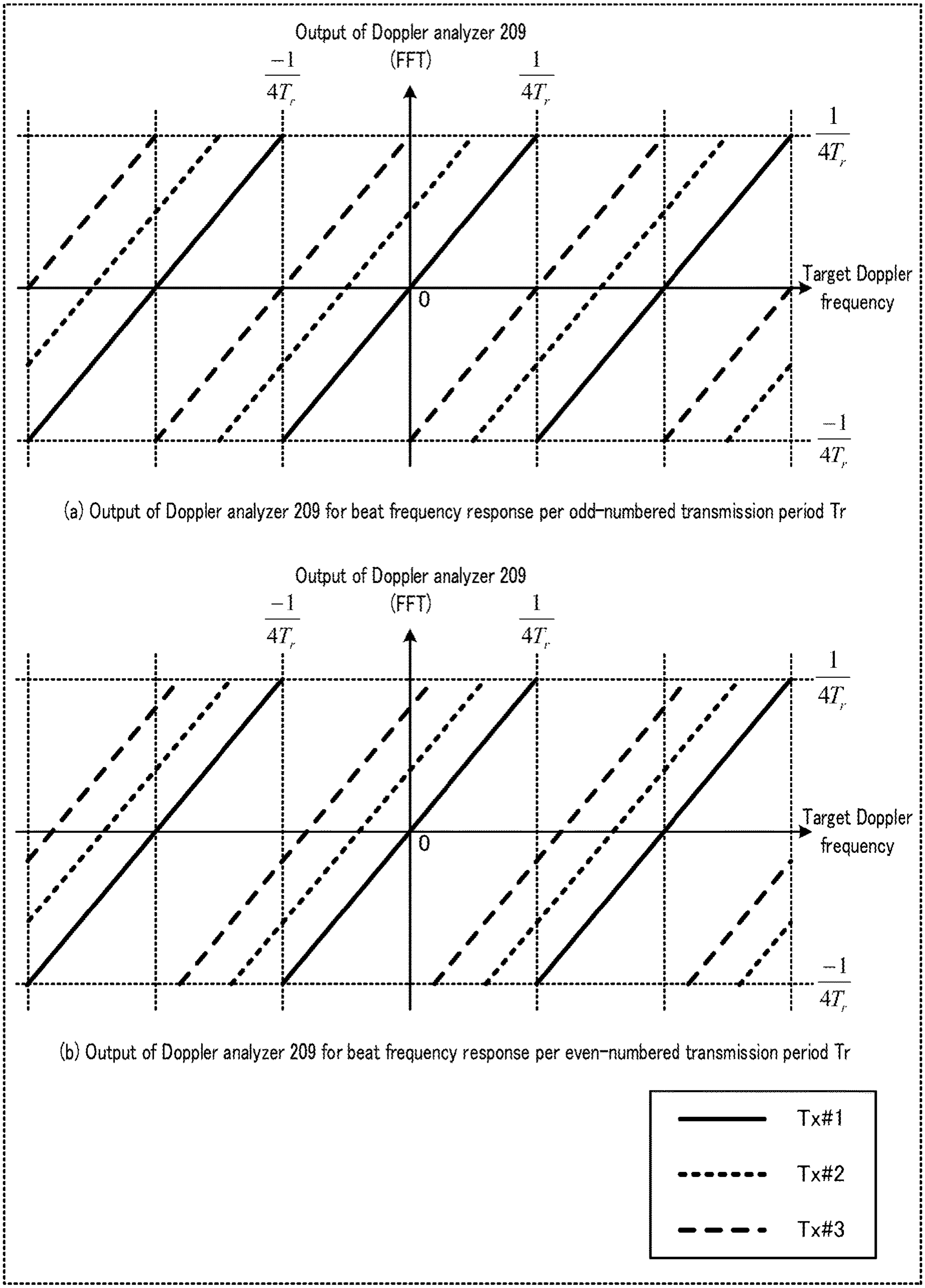
FIG. 12 illustrates exemplary Doppler peaks according to Variation 7.

When such Doppler shift amounts are used, for example, as illustrated in FIG. 12, Nt (three in FIG. 12) Doppler peaks are generated for single target Doppler frequency $f_{d\_TargetDoppler}$ to be measured. Note that FIG. 12 illustrates the change in the Doppler peaks in the case where Nt=3, with the horizontal axis indicating the target Doppler frequency and the vertical axis indicating the output of Doppler analyzer 209 (FFT).

Section (a) of FIG. 12 illustrates an exemplary output of Doppler analyzer 209 for the beat frequency response for each odd-numbered transmission period Tr, and section (b) of FIG. 12 illustrates an exemplary output of Doppler analyzer 209 for the beat frequency response for each even-numbered transmission period Tr.

In (a) and (b) of FIG. 12, Nt Doppler peaks (three in FIG. 12) are generated for single target Doppler frequency $f_{d\_TargetDoppler}$ to be measured, but the intervals of the Doppler peaks are different from each other. For example, the interval of the Doppler peaks is 1/(8Tr) or 1/(4Tr) in (a) of FIG. 12. Meanwhile, the interval of the Doppler peaks is 1/(10Tr) or 3/(10Tr) in (b) of FIG. 12, for example.

Thus, even in a case where there are two targets at the same distance index $f_b$ and the difference between the Doppler frequencies of the two targets matches, for example, the interval of the Doppler shift amounts for each odd-numbered transmission period Tr, the difference does not match the interval of the Doppler shift amounts for each even-numbered transmission period Tr, thereby allowing Doppler demultiplexer 211 to demultiplex and detect signals corresponding to the two targets.

Likewise, even in a case where there are two targets at the same distance index $f_b$ and the difference between the Doppler frequencies of the two targets matches, for example, the interval of the Doppler shift amounts for each even-numbered transmission period Tr, the difference does not match the interval of the Doppler shift amounts for each odd-numbered transmission period Tr, thereby allowing Doppler demultiplexer 211 to demultiplex and detect signals corresponding to the two targets.

This makes it easier for radar apparatus 10 to demultiplex a plurality of targets in a single radar observation.

Figure 13:
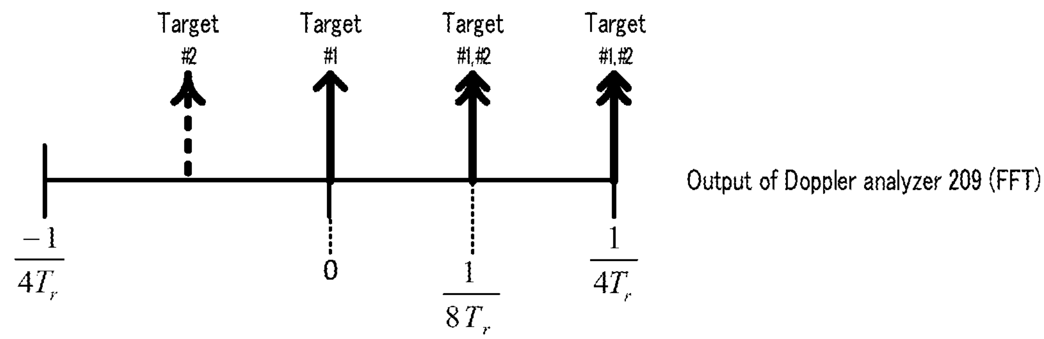
FIG. 13 illustrates exemplary Doppler demultiplexing processing according to Variation 7.
Figure 13:
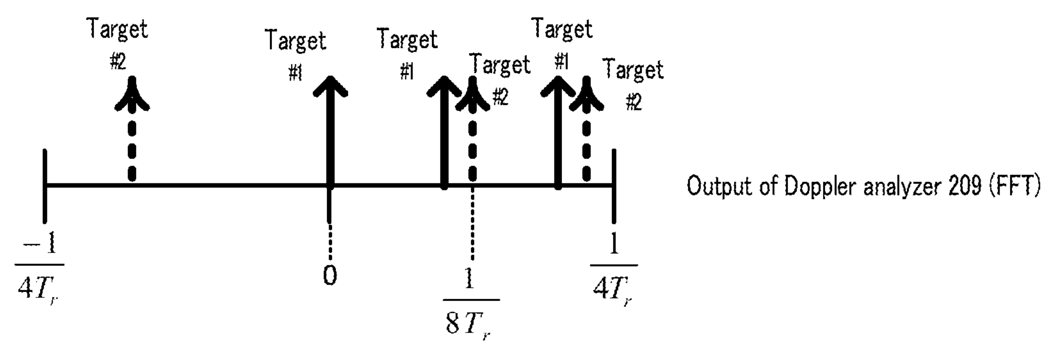

For example, a description will be given of a case where the Doppler frequency of target #1 is 0 and the Doppler frequency of target #2 is 1/(8Tr) at the same distance index $f_b$, as illustrated in FIG. 13.

In this case, as illustrated in (a) of FIG. 13 for example, the difference (in other words, interval) 1/(8Tr) between the Doppler frequencies of the targets #1 and #2 matches the interval (e.g., 1/(8Tr)) of the Doppler shift amounts for each odd-numbered transmission period Tr. Accordingly, as illustrated in (a) of FIG. 13 for example, the Doppler peaks of targets #1 and #2 overlap with each other in the output of Doppler analyzer 209 for the beat frequency response for each odd-numbered transmission period Tr, and this makes it difficult for Doppler demultiplexer 211 to demultiplex the signals of targets #1 and #2.

In contrast, as illustrated in (b) of FIG. 13 for example, the difference (in other words, interval) 1/(8Tr) between the Doppler frequencies of the targets #1 and #2 does not match the interval (e.g., 1/(10Tr)) of the Doppler shift amounts for each even-numbered transmission period Tr. Accordingly, as illustrated in (b) of FIG. 13 for example, the Doppler peaks of targets #1 and #2 do not overlap with each other in the output of Doppler analyzer 209 for the beat frequency response for each even-numbered transmission period Tr, and this makes it easier for Doppler demultiplexer 211 to demultiplex and detect the signals of targets #1 and #2.

As described above, radar apparatus 10 is more likely to be able to demultiplex signals corresponding to a plurality of targets in either one of transmission periods Tr in which the intervals of the Doppler shift amounts are different from each other. This makes it easier for radar apparatus 10 to demultiplex a plurality of targets in a single radar observation.

As described above, in Variation 7, radar apparatus 10 variably sets the interval of the Doppler shift amounts for each transmission period Tr. Accordingly, the intervals of the Doppler peaks corresponding to a plurality of transmission antennas 105 for a single target are different in each transmission period, and this makes it easier for radar apparatus 10 to demultiplex a plurality of targets in a single radar observation.

(Variation 8)

In Variation 8, for example, a radar apparatus variably sets the Doppler shift amount for each transmission period, and changes the assignment of Doppler multiplexing for transmission antennas.

Note that the radar apparatus according to Variation 8 has the same basic configuration as that of radar apparatus 10 illustrated in FIG. 1, and thus FIG. 1 will be used for the description. For example, in Variation 8, the operations of Doppler shifters 104, Doppler analyzers 209, CFAR section 210, and Doppler demultiplexer 211 in radar apparatus 10 illustrated in FIG. 1 are different from those in Embodiment 1. Note that the operations of Doppler analyzers 209, CFAR section 210 and Doppler demultiplexer 211 according to Variation 8 are the same as those in Variation 7, and the descriptions thereof are thus omitted here.

In Variation 8, a description will be given of a case where the Doppler shift amount is variably set for each transmission period in the positioning outputs of radar apparatus 10. According to Variation 8, the positions of Doppler peaks corresponding to a plurality of transmission antennas 105 for a single target are different from each other for each transmission period, and this makes it easier for radar apparatus 10 to demultiplex targets in a single radar observation even when a colored interference component is present in the Doppler domain.

In the following, exemplary methods of setting Doppler shift amounts applied in Doppler shifters 104 according to Variation 8 will be described.

Doppler shifters 104-1 to 104-Nt apply different Doppler shift amounts $DOP_n$ to chirp signals inputted to respective Doppler shifters. Here, n=1, . . . , Nt.

Further, Doppler shifters 104-1 to 104-Nt variably set Doppler shift amounts DOPE for each transmission period Tr. For example, Doppler shifters 104-1 to 104-Nt respectively set Doppler shift amounts $DOP_n^{odd}$ for each odd-numbered transmission period Tr and Doppler shift amounts $DOP_n^{even}$ for each even-numbered transmission period Tr.

For example, n-th Doppler shifter 104 applies, to the inputted m-th chirp signal, phase rotation amount $\varphi_n(m)$ corresponding to Doppler shift amount $DOP_n^{odd}$ for each odd-numbered transmission period Tr and phase rotation amount $\varphi_n(m)$ corresponding to Doppler shift amount $DOP_n^{even}$ for each even-numbered transmission period Tr, according to the following expressions.

[48]

$$\begin{cases} \phi_n(m) = \left\{A\frac{2\pi}{N_c}\mathrm{round}\left(\frac{N_c}{Nt+\delta}\right)(n-1)+\Delta\phi_0\right\}\mathrm{floor}\left[\frac{m-1}{2}\right]+\phi_0, & \text{(where } m \text{ is an odd number)} \\ \phi_n(m) = \left\{A\frac{2\pi}{N_c}\mathrm{round}\left(\frac{N_c}{Nt+\delta}\right)n+\Delta\phi_0\right\}\mathrm{floor}\left[\frac{m-1}{2}\right]+\phi_0, & \text{(where } m \text{ is an even number)} \end{cases} \quad \text{(Expressions 55)}$$

Here, δ is a positive number equal to or greater than 1. Phase rotation amounts $\varphi_n$ given by Expressions 55 are applied. The setting of δ causes Doppler shift amount $DOP_n^{odd}$ for each odd-numbered transmission period Tr and Doppler shift amount $DOP_n^{even}$ for each even-numbered transmission period Tr to be different from each other. In other words, the Doppler shift amount is variably set for each transmission period Tr. Accordingly, the assignment of Doppler multiplexing for transmission antennas 105 is variably set for each transmission period Tr.

Note that phase rotation amounts $\varphi_n$ are not limited to the values given by Expressions 55, and may the phase rotations that cause the positions (in other words, assignments) of Doppler shift amount $DOP_n^{odd}$ and Doppler shift amount $DOP_n^{even}$ to be different from each other.

By way of example, in a case where Nt=3, $\Delta\varphi_0=0$, $\varphi_0=0$, A=1, δ=1, and $N_C$ is a multiple of 4 in Expressions 55, phase rotation amounts $\varphi_n(m)$ given by the following expressions are applied to the radar transmission signals.

[49]

$$\{\phi_1(1), \phi_1(2), \ldots, \phi_1(22), \ldots\} = \left\{0, 0, 0, \frac{\pi}{2}, 0, \pi, 0, \frac{3\pi}{2}, 0, 0, 0, \frac{\pi}{2}, 0, \pi, 0, \frac{3\pi}{2}, 0, 0, 0, \frac{\pi}{2}, 0, \pi, \ldots\right\} \quad \text{(Expression 56)}$$

[50]

$$\{\phi_2(1), \phi_2(2), \ldots, \phi_2(22), \ldots\} = \left\{0, 0, \frac{\pi}{2}, \pi, \pi, 0, \frac{3\pi}{2}, \pi, 0, 0, \frac{\pi}{2}, \pi, \pi, 0, \frac{3\pi}{2}, \pi, 0, 0, \frac{\pi}{2}, \pi, \pi, 0, \ldots\right\} \quad \text{(Expression 57)}$$

[51]

$$\{\phi_3(1), \phi_3(2), \ldots, \phi_3(22), \ldots\} = \left\{0, 0, \pi, \frac{3\pi}{2}, 0, \pi, \pi, \frac{\pi}{2}, 0, 0, \pi, \frac{3\pi}{2}, 0, \pi, \pi, \frac{\pi}{2}, 0, 0, \pi, \frac{3\pi}{2}, \ldots\right\} \quad \text{(Expression 58)}$$

Further, in a case where Doppler analyzer 209 performs the FFT processing given by Expressions 51, the Doppler shift amounts are represented by $DOP_1^{odd}=0$, $DOP_1^{even}=1/(8Tr)$, $DOP_2^{odd}=1/(8Tr)$, $DOP_2^{even}=1/(4Tr)$, $DOP_3^{odd}=1/(4Tr)$, and $DOP_3^{even}=-1/(8Tr)$.

Figure 14:
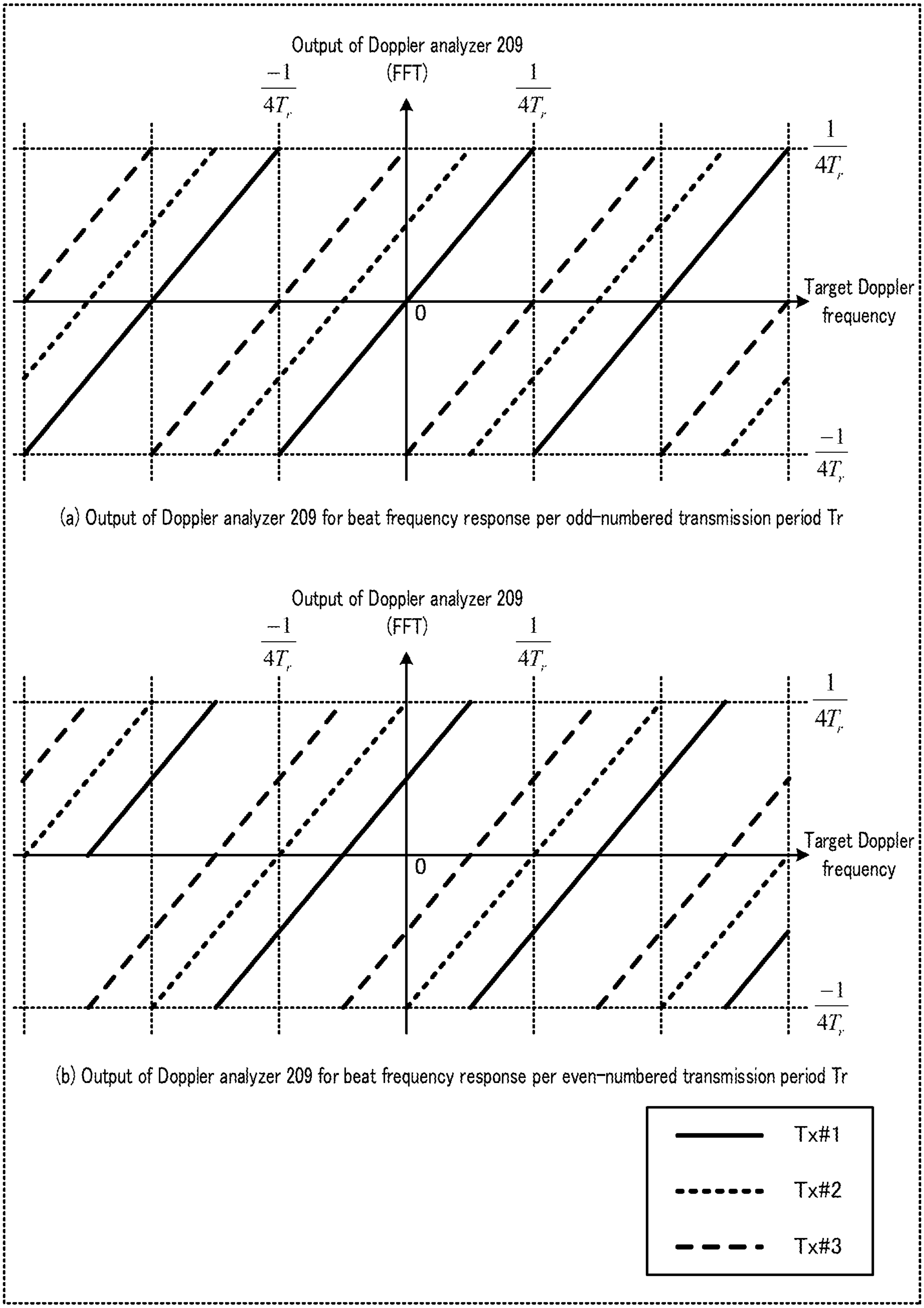
FIG. 14 illustrates exemplary Doppler peaks according to Variation 8.

When such Doppler shift amounts are used, for example, as illustrated in FIG. 14, Nt (three in FIG. 14) Doppler peaks are generated for single target Doppler frequency $f_{d\_TargetDoppler}$ to be measured. Note that FIG. 14 illustrates the change in the Doppler peaks in the case where Nt=3, with the horizontal axis indicating the target Doppler frequency and the vertical axis indicating the output of Doppler analyzer 209 (FFT).

Section (a) of FIG. 14 illustrates an exemplary output of Doppler analyzer 209 for the beat frequency response for each odd-numbered transmission period Tr, and Section (b) of FIG. 14 illustrates an exemplary output of Doppler analyzer 209 for the beat frequency response for each even-numbered transmission period Tr.

In (a) and (b) of FIG. 14, Nt Doppler peaks (three in FIG. 14) are generated for single target Doppler frequency $f_{d\_TargetDoppler}$ to be measured, but the positions of the Doppler peaks are different from each other. For example, the output of Doppler analyzer 209 illustrated in (a) of FIG. 14 and the output of Doppler analyzer 209 illustrated in (b) of FIG. 14 are shifted by ⅛Tr in the Doppler domain.

Thus, even in a case where a colored interference component is present in the Doppler domain at the same distance index $f_b$ (in other words, in a case where an interference component is generated in a limited part of the Doppler domain) and a Doppler peak is generated in the part of the Doppler domain where the interference component is present in either one of the odd-numbered transmission period or the even-numbered transmission period, for example, a Doppler peak is more likely to be generated in the Doppler domain other than the part of the Doppler domain where the interference component is generated in the other transmission period. This makes it easier for Doppler demultiplexer 211 to perform demultiplexing and detection in a single radar observation without being affected by the interference.

Figure 15:
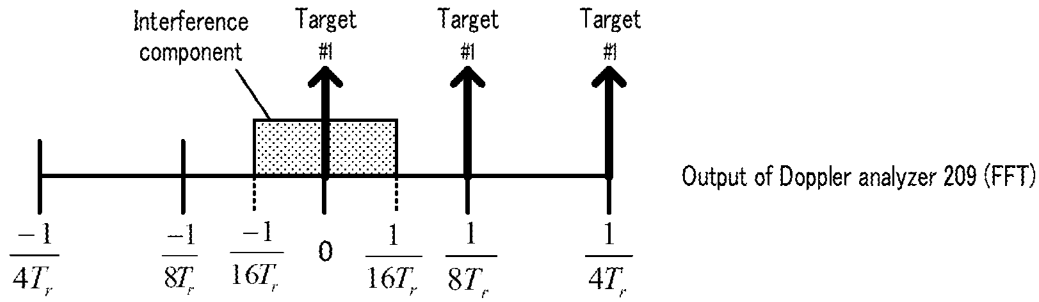
FIG. 15 illustrates exemplary Doppler demultiplexing processing according to Variation 8.
Figure 15:
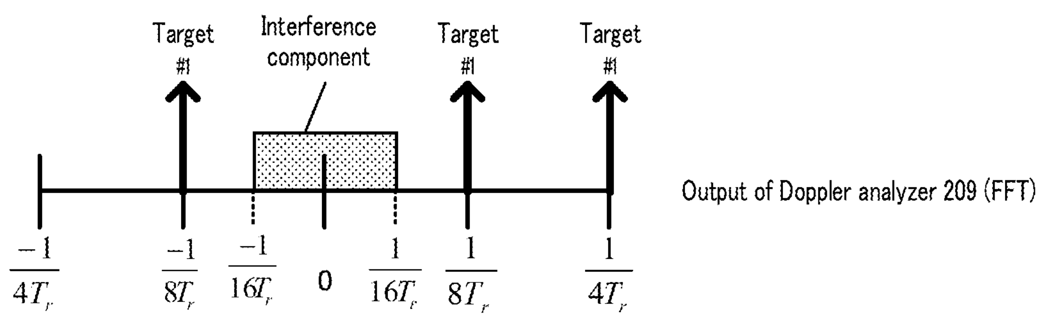

For example, a description will be given of a case where the colored interference component is present in the Doppler frequency range of −1/(16Tr) to 1/(16Tr) in the Doppler domain at the same distance index $f_b$, as illustrated in FIG. 15. In FIG. 15, the Doppler frequency of target #1 is 0, by way of example.

In this case, as illustrated in (a) of FIG. 15 for example, part of the Doppler peaks of target #1 overlaps with the colored interference component in the output of Doppler analyzer 209 for the beat frequency response for each odd-numbered transmission period Tr, and this makes it difficult for Doppler demultiplexer 211 to demultiplex the signal of target #1.

In contrast, as illustrated in (b) of FIG. 15 for example, the Doppler peaks of target #1 do not overlap with the colored interference component in the output of Doppler analyzer 209 for the beat frequency response for each even-numbered transmission period Tr, and this makes it easier for Doppler demultiplexer 211 to demultiplex the signal of target #1.

As described above, radar apparatus 10 is more likely to be able to demultiplex signals corresponding to a plurality of targets in either one of transmission periods Tr in which the Doppler shift amounts (in other words, positions in the Doppler frequency range) are different from each other. This makes it easier for radar apparatus 10 to demultiplex targets even when a colored interference component is present in the Doppler domain in a single radar observation As described above, radar apparatus 10 variably sets the Doppler shift amount for each transmission period Tr in Variation 8. Accordingly, the positions of Doppler peaks corresponding to a plurality of transmission antennas 105 for a single target are different in each transmission period, and this makes it easier for radar apparatus 10 to demultiplex targets in a single radar observation even when a colored interference component is present in the Doppler domain.

Variation 8 has been described, thus far. Note that Variations 7 and 8 may be combined. That is, the Doppler shift amounts (in other words, phase rotation amounts) may be set so that the intervals and the positions of Doppler peaks corresponding to a plurality of transmission antennas 105 for a single target are different in each transmission period Tr.

In the radar apparatus according to an exemplary embodiment of the present disclosure, the radar transmitter and the radar receiver may be individually arranged in physically separate locations. Further, in the radar receiver according to an exemplary embodiment of the present disclosure, the direction estimator and the other components may be individually arranged in physically separate locations.

Further, the values used in an exemplary embodiment of the present disclosure, such as number Nt of transmission antennas, number Na of reception antennas, number $N_{DM}$ of Doppler multiplexing, values related to a phase rotation (δ, $\varphi_0$, δ, $\Delta\varphi_0$, $dp_n$, etc.), are merely examples, and the present disclosure is not limited to those values.

The radar apparatus according to an exemplary embodiment of the present disclosure includes, for example, a central processing unit (CPU), a storage medium such as a read only memory (ROM) that stores a control program, and a work memory such as a random access memory (RAM), which are not illustrated. In this case, the functions of the above-described sections are implemented by the CPU executing the control program. The hardware configuration of the radar apparatus, however, is not limited to that in this example. For example, the functional sections of the radar apparatus may be implemented as an integrated circuit (IC). Each functional section may be formed as an individual chip, or some or all of them may be formed into a single chip.

While various embodiments have been described with reference to the drawings herein above, the present disclosure is obviously not limited to these examples. Obviously, a person skilled in the art would conceive variations and modification examples within the scope described in the claims, and it is to be appreciated that these variations and modifications naturally fall within the technical scope of the present disclosure. Each constituent element of the above-mentioned embodiments may be combined optionally without departing from the spirit of the disclosure.

In the description of each embodiment described above, " . . . er (or)" or " . . . section" used for each component may be replaced with another term such as " . . . circuit (circuitry)", " . . . device", " . . . unit" or " . . . module".

Although the above embodiments have been described with an example of a configuration using hardware, the present disclosure can be realized by software, hardware, or software in cooperation with hardware.

Each functional block used in the description of each embodiment described above is typically realized by an LSI, which is an integrated circuit. The integrated circuit controls each functional block used in the description of the above embodiments and may include an input terminal and an output terminal. The LSI may be individually formed as chips, or one chip may be formed so as to include a part or all of the functional blocks. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

SUMMARY OF DISCLOSURE

A radar apparatus according to an embodiment of the present disclosure includes: a plurality of transmission antennas, which in operation, each transmit a transmission signal; and circuitry, which, in operation, applies a Doppler shift amount to the transmission signal transmitted from each of the plurality of transmission antennas, wherein, a plurality of the Doppler shift amounts have intervals set by unequally dividing a Doppler frequency range subject to Doppler analysis.

In an embodiment of the present disclosure, the intervals of the plurality of Doppler shift amounts are set by dividing the Doppler frequency range by a value resulting from adding an integer equal to or greater than 1 to a number of the plurality of transmission antennas.

In an embodiment of the present disclosure, the intervals of the plurality of Doppler shift amounts are set by adding an offset to intervals resulting from dividing the Doppler frequency range by a number of the plurality of transmission antennas.

In an embodiment of the present disclosure, the Doppler shift amount is variably set for each frame in which the transmission signal is transmitted.

In an embodiment of the present disclosure, the Doppler shift amount is variably set for each transmission period in which the transmission signal is transmitted.

In an embodiment of the present disclosure, the intervals of the plurality of Doppler shift amounts are variably set for each transmission period in which the transmission signal is transmitted.

In an embodiment of the present disclosure, the circuitry multiplies the transmission signal by a pseudo-random code sequence.

In an embodiment of the present disclosure, the plurality of transmission antennas have a sub-array configuration.

In an embodiment of the present disclosure, the circuitry applies the same Doppler shift amount to the transmission signal transmitted from each of the plurality of transmission antennas with the sub-array configuration.

In an embodiment of the present disclosure, the circuitry transmits the transmission signal by further applying at least one of time division transmission and/or code division transmission.

In an embodiment of the present disclosure, the intervals of the plurality of Doppler shift amounts are set by dividing the Doppler frequency range by a value equal to or less than a number of the plurality of transmission antennas.

In an embodiment of the present disclosure, the circuitry transmits the transmission signal by further applying code division transmission, and the intervals of the plurality of Doppler shift amounts are set by dividing the Doppler frequency range by an integer value resulting from adding 1 or more to a value resulting from dividing a number of the plurality of transmission antennas by a number of code multiplexing.

In an embodiment of the present disclosure, the circuitry transmits the transmission signal by further applying code division transmission, and a number of code division multiplexing applied to the transmission signal is different among a plurality of the transmission signals transmitted from the plurality of transmission antennas.

In an embodiment of the present disclosure, the circuitry transmits the transmission signal by further applying time division transmission, and the intervals of the plurality of Doppler shift amounts are set by dividing the Doppler frequency range by an integer value resulting from adding 1 or more to a value resulting from dividing a number of the plurality of transmission antennas by a number of time divisions.

In an embodiment of the present disclosure, the circuitry transmits the transmission signal by further applying time division transmission, and a number of time division multiplexing applied to the transmission signal is different among a plurality of the transmission signals transmitted from the plurality of transmission antennas.

In an embodiment of the present disclosure, the radar apparatus further includes: a plurality of reception antennas, which in operation, each receive a reflected wave signal that is the transmission signal reflected from a target; and reception circuitry, which, in operation, detects a peak of the reflected wave signal using a threshold for a power addition value resulting from adding received power of a plurality of the reflected wave signals in ranges, within the Doppler frequency range, respectively corresponding to the intervals of the plurality of Doppler shift amounts.

In an embodiment of the present disclosure, the intervals of the plurality of Doppler shift amounts are intervals resulting from dividing the Doppler frequency range by a number greater than a number of Doppler multiplexing, and wherein, in a case where there is a difference equal to or greater than a threshold between reception levels corresponding to first peaks, a number of which corresponds to the number of Doppler multiplexing in descending order of the received power, and a reception level corresponding to a second peak other than the first peaks, the reception circuitry demultiplexes a plurality of the transmission signals respectively from the plurality of reflected wave signals based on the first peaks, the first peaks and the second peak being a plurality of the peaks detected in the Doppler frequency range.

In an embodiment of the present disclosure, the reception circuitry demultiplexes a plurality of the transmission signals respectively from the plurality of reflected wave signals based on a relation between each of the plurality of transmission antennas and the Doppler shift amount applied to the transmission signal transmitted from each of the plurality of transmission antennas.

The disclosure of Japanese Patent Application No. 2019-115492, filed on Jun. 21, 2019, including the specification, drawings and abstract, is incorporated herein by reference in its entirety.

INDUSTRIAL APPLICABILITY

The present disclosure is suitable as a radar apparatus for wide-angle range sensing.

REFERENCE SIGNS LIST

10, 10*b*, 10*c*, 10*e* Radar apparatus
100, 100*a*, 100*b*, 100*c*, 100*d*, 100*e* Radar transmitter
101 Radar transmission signal generator
102 Modulation signal generator
103 VCO
104 Doppler shifter
105 Transmission antenna
106 Beam weight generator
107 Beam weight multiplier
108 Random code generator
109, 213 Random code multiplier
200, 200*b*, 200*c*, 200*e* Radar receiver
201 Antenna system processor
202 Reception antenna
203 Reception radio
204 Mixer
205 LPF
206, 206*b*, 206*c*, 206*e* Signal processor
207 AD converter
208 Beat frequency analyzer
209 Doppler analyzer
210, 210*c*, 210*e* CFAR section
211, 211*c*, 211*e* Doppler demultiplexer
212, 212*c*, 212*e* Direction estimator
301 Orthogonal code generator
302 Orthogonal code multiplier
303 Doppler shift and orthogonal code generator
304 Multiplier
401, 601 Output switcher
402 Code demultiplexer
501 Transmission switch controller
502 Transmission switcher

The invention claimed is:

1. A radar apparatus, comprising:
a plurality of transmission antennas, which in operation, each transmits a transmission signal; and
circuitry, which, in operation, applies a Doppler shift amount to the transmission signal transmitted from each of the plurality of transmission antennas, wherein,
a plurality of the Doppler shift amounts has intervals set by unequally dividing a Doppler frequency range subject to Doppler analysis, and
the intervals of the plurality of Doppler shift amounts are set by adding an offset to each of equal intervals determined by dividing the Doppler frequency range by a number of the plurality of transmission antennas.

2. The radar apparatus according to claim 1, wherein the Doppler shift amount is variably set for each frame in which the transmission signal is transmitted.

3. The radar apparatus according to claim 1, wherein the Doppler shift amount is variably set for each transmission period in which the transmission signal is transmitted.

4. The radar apparatus according to claim 1, wherein the intervals of the plurality of Doppler shift amounts are variably set for each transmission period in which the transmission signal is transmitted.

5. The radar apparatus according to claim 1, wherein the circuitry multiplies the transmission signal by a pseudo-random code sequence.

6. The radar apparatus according to claim 1, wherein the plurality of transmission antennas have a sub-array configuration.

7. The radar apparatus according to claim 6, wherein the circuitry applies the same Doppler shift amount to the transmission signal transmitted from each of the plurality of transmission antennas with the sub-array configuration.

8. The radar apparatus according to claim 1, wherein the circuitry applies at least one of time division transmission or code division transmission to the transmission signal transmitted from each of the plurality of transmission antennas.

9. The radar apparatus according to claim 1, wherein,
the circuitry applies code division transmission to the transmission signal transmitted from each of the plurality of transmission antennas, and a number of code division multiplexing applied to the transmission signal is different among a plurality of the transmission signals transmitted from the plurality of transmission antennas.

10. The radar apparatus according to claim 1, wherein, the circuitry applies time division transmission to the transmission signal transmitted from each of the plurality of transmission antennas, and a number of time division multiplexing applied to the transmission signal is different among a plurality of the transmission signals transmitted from the plurality of transmission antennas.

11. The radar apparatus according to claim 1, further comprising:

a plurality of reception antennas, which in operation, each receive a reflected wave signal that is the transmission signal reflected from a target; and reception circuitry, which, in operation, detects a peak of the reflected wave signal using a threshold for a power addition value resulting from adding received power of a plurality of the reflected wave signals in ranges, within the Doppler frequency range, respectively corresponding to the intervals of the plurality of Doppler shift amounts.

12. The radar apparatus according to claim 11, wherein the reception circuitry demultiplexes a plurality of the transmission signals respectively from the plurality of reflected wave signals based on a relation between each of the plurality of transmission antennas and the Doppler shift amount applied to the transmission signal transmitted from each of the plurality of transmission antennas.

13. A radar apparatus, comprising:

a plurality of transmission antennas, which in operation, each transmits a transmission signal; and circuitry, which, in operation, applies code division transmission and a Doppler shift amount to the transmission signal transmitted from each of the plurality of transmission antennas, wherein a plurality of the Doppler shift amounts has intervals set by unequally dividing a Doppler frequency range subject to Doppler analysis, and the intervals of the plurality of Doppler shift amounts are set by dividing the Doppler frequency range by an integer value resulting from adding 1 or more to a value resulting from dividing a number of the plurality of transmission antennas by a number of code multiplexing.

14. A radar apparatus, comprising:

a plurality of transmission antennas, which in operation, each transmits a transmission signal; and circuitry, which, in operation, applies time division transmission and a Doppler shift amount to the transmission signal transmitted from each of the plurality of transmission antennas, wherein a plurality of the Doppler shift amounts has intervals set by unequally dividing a Doppler frequency range subject to Doppler analysis, and the intervals of the plurality of Doppler shift amounts are set by dividing the Doppler frequency range by an integer value resulting from adding 1 or more to a value resulting from dividing a number of the plurality of transmission antennas by a number of time divisions.

15. A radar signal generating apparatus, comprising:

a signal generating circuitry, which, in operation, generates a transmission signal; and transmission circuitry, which, in operation, generates a plurality of Doppler-shifted transmission signals by applying a plurality of Doppler shift amounts to the transmission signal, and transmits the plurality of Doppler-shifted transmission signals from each of a plurality of transmission antennas, wherein, the plurality of the Doppler shift amounts has intervals set by unequally dividing a Doppler frequency range subject to Doppler analysis, and the intervals of the plurality of Doppler shift amounts are set by adding an offset to each of equal intervals determined by dividing the Doppler frequency range by a number of the plurality of transmission antennas.

16. A radar signal generating method, comprising:

generating a transmission signal;

generating a plurality of Doppler-shifted transmission signals by applying a plurality of Doppler shift amounts to the transmission signal; and transmitting the plurality of Doppler-shifted transmission signals from each of a plurality of transmission antennas, wherein, the plurality of the Doppler shift amounts has intervals set by unequally dividing a Doppler frequency range subject to Doppler analysis, and the intervals of the plurality of Doppler shift amounts are set by adding an offset to each of equal intervals determined by dividing the Doppler frequency range by a number of the plurality of transmission antennas.

* * * * *